United States Patent
Hannuksela

(10) Patent No.: US 12,088,847 B2
(45) Date of Patent: Sep. 10, 2024

(54) APPARATUS, A METHOD AND A COMPUTER PROGRAM FOR VIDEO ENCODING AND DECODING

(71) Applicant: Nokia Technologies Oy, Espoo (FI)

(72) Inventor: Miska Hannuksela, Tampere (FI)

(73) Assignee: Nokia Technologies Oy, Espoo (FI)

( * ) Notice: Subject to any disclaimer, the term of this patent is extended or adjusted under 35 U.S.C. 154(b) by 286 days.

(21) Appl. No.: 17/616,541

(22) PCT Filed: May 20, 2020

(86) PCT No.: PCT/FI2020/050340
§ 371 (c)(1),
(2) Date: Dec. 3, 2021

(87) PCT Pub. No.: WO2020/254720
PCT Pub. Date: Dec. 24, 2020

(65) Prior Publication Data
US 2022/0239949 A1    Jul. 28, 2022

Related U.S. Application Data

(60) Provisional application No. 62/864,371, filed on Jun. 20, 2019.

(51) Int. Cl.
*H04N 19/70* (2014.01)
*H04N 19/105* (2014.01)
(Continued)

(52) U.S. Cl.
CPC .......... *H04N 19/70* (2014.11); *H04N 19/105* (2014.11); *H04N 19/172* (2014.11); *H04N 19/1883* (2014.11)

(58) Field of Classification Search
CPC .... H04N 19/70; H04N 19/105; H04N 19/172; H04N 19/1883; H04N 19/597; H04N 21/435; H04N 21/23424
See application file for complete search history.

(56) References Cited

U.S. PATENT DOCUMENTS

| 2013/0294500 A1 | 11/2013 | Wang |
| 2014/0086303 A1* | 3/2014 | Wang .................. H04N 19/136 375/240.02 |

(Continued)

FOREIGN PATENT DOCUMENTS

| CN | 104396265 A | 3/2015 |
| CN | 105379285 A | 3/2016 |

(Continued)

OTHER PUBLICATIONS

"Versatile Video Coding", Series H: Audiovisual and Multimedia Systems Infrastructure of audiovisual services—Coding of moving video, Recommendation ITU-T H.266, Aug. 2020, 516 pages.

(Continued)

*Primary Examiner* — Kathleen V Nguyen
(74) *Attorney, Agent, or Firm* — Harrington & Smith

(57) ABSTRACT

There is disclosed a method, an apparatus and a computer program product for video encoding and decoding. In accordance with an embodiment the method for encoding comprises concluding that a coded video sequence starts at particular position in a bitstream, wherein the coded video sequence is a sequence of coded pictures in decoding order that is independently decodable and is followed by another coded video sequence or the end of the bitstream, and wherein the bitstream comprises access units, and an access unit comprises coded video data for a single time instance and associated other data, and an access unit comprises one or more network abstraction layer (NAL) units; and indicating in an access unit delimiter to treat the NAL unit(s) associated with the access unit delimiter as a start of a coded video sequence.

20 Claims, 15 Drawing Sheets

(51) Int. Cl.
H04N 19/169 (2014.01)
H04N 19/172 (2014.01)

(56) References Cited

U.S. PATENT DOCUMENTS

| | | | | |
|---|---|---|---|---|
| 2015/0373337 | A1* | 12/2015 | Wang | H04N 19/513 |
| | | | | 375/240.25 |
| 2016/0165252 | A1 | 6/2016 | Deshpande | |
| 2017/0006300 | A1 | 1/2017 | Tsukuba et al. | |
| 2018/0184098 | A1 | 6/2018 | Denoual et al. | |
| 2019/0058895 | A1 | 2/2019 | Deshpande | |

FOREIGN PATENT DOCUMENTS

| | | |
|---|---|---|
| CN | 106170981 A | 11/2016 |
| CN | 106416260 A | 2/2017 |
| EP | 3107299 A1 | 12/2016 |
| EP | 3158764 A1 | 4/2017 |
| JP | 2016-518763 A | 6/2016 |
| KR | 2015-0140777 A | 12/2015 |
| KR | 2016-0132089 A | 11/2016 |
| RU | 2656827 C2 | 6/2018 |
| RU | 2017125451 A3 | 2/2019 |
| WO | 2014/010192 A1 | 1/2014 |
| WO | 2014/167817 A1 | 10/2014 |
| WO | 2015/137237 A1 | 9/2015 |
| WO | 2015/196031 A1 | 12/2015 |
| WO | 2020/141248 A1 | 7/2020 |
| WO | 2020/141258 A1 | 7/2020 |
| WO | 2020/245497 A1 | 12/2020 |

OTHER PUBLICATIONS

U.S. Appl. No. 62/813,612, "An Apparatus, A Method and a Computer Program for Delivering Constituent Bitstreams", filed on Mar. 4, 2019, pp. 1-108.
Hannuksela, "AHG12/AHG17: Merging IRAP and non-IRAP VCL NAL units into the same coded picture", Joint Video Experts Team (JVET) of ITU-T SG 16 WP 3 and ISO/IEC JTC 1/SC 29/WG 11, JVET-N0047, 14th Meeting, Mar. 19-27, 2019, pp. 1-8.
Wang, "AHG12: Allowing mixed IRAP and non-IRAP NAL unit types within a picture", Joint Video Experts Team (JVET) of ITU-T SG 16 WP 3 and ISO/IEC JTC 1/SC 29/WG 11, JVET-N0108-v1, 14th Meeting, Mar. 19-27, 2019, pp. 1-3.
"Advanced Video Coding for Generic Audiovisual services", Series H: Audiovisual and Multimedia Systems, Infrastructure of audiovisual services—Coding of moving Video, Recommendation ITU-T H.264, Apr. 2017, 812 pages.
"High Efficiency Video Coding", Series H: Audiovisual and Multimedia Systems, Infrastructure of audiovisual services—Coding of moving video, Recommendation ITU-T H.265, Feb. 2018, 692 pages.
"Parameter Values for Ultra-High Definition Television Systems for Production and International Programme Exchange", Recommendation ITU-R BT.2020, Aug. 2012, 7 pages.
"Parameter Values for the HDTV Standards for Production and International Programme Exchange", Recommendation ITU-R BT.709-6, Jun. 2015, 19 pages.
"Information Technology—Coding of Audio-Visual Objects—Part 12: ISO Base Media File Format", ISO/IEC 14496-12, Fifth edition, Dec. 15, 2015, 248 pages.
"Information Technology—Coding of Audio-Visual Objects—Part 14: MP4 File Format", ISO/IEC 14496-14, First edition, Nov. 15, 2003, 18 pages.
"Information Technology—Coding of Audio-Visual Objects—Part 15: Advanced Video Coding (AVC) File Format", ISO/IEC 14496-15, First edition, Apr. 15, 2004, 29 pages.
"3rd Generation Partnership Project; Technical Specification Group Services and System Aspects; Transparent end-to-end packet switched streaming service (PSS); 3GPP file format (3GP) (Release 15)", 3GPP TS 26.244, V15.0.0, Jun. 2018, pp. 1-67.
"3rd Generation Partnership Project; Technical Specification Group Services and System Aspects; Transparent end-to-end Packet-switched Streaming Service (PSS); Protocols and codecs (Release 15)", 3GPP TS 26.234, V15.1.0, Sep. 2018, pp. 1-174.
"Information Technology—Dynamic Adaptive Streaming over HTTP (DASH)—Part 1: Media Presentation Description and Segment Formats", ISO/IEC 23009-1, Second Edition, May 15, 2014, 152 pages.
"3rd Generation Partnership Project; Technical Specification Group Services and System Aspects; Transparent end-to-end Packet-switched Streaming Service (PSS); Progressive Download and Dynamic Adaptive Streaming over HTTP (3GP-DASH) (Release 16)", 3GPP TS 26.247, V16.1.0, Dec. 2018, pp. 1-138.
"Information technology—Coded representation of immersive media (MPEG-I)—Part 2: Omnidirectional media format", ISO/IEC JTC 1/SC 29/WG 11, ISO/IEC FDIS 23090-2:201x (E), Apr. 26, 2018, 181 pages.
Mammou, "PCC Test Model Category 2 v0", ISO/IEC JTC1/SC29/WG11 N17248, 3DG, Oct. 2017, 11 pages.
Hannuksela, "AHG9: On target OLS and sublayers for decoding", Joint Video Experts Team (JVET) of ITU-T SG 16 WP 3 and ISO/IEC JTC 1/SC 29/WG 11, JVET-Sxxxx, 19th Meeting, Jun. 22-Jul. 1, 2020, pp. 1-4.
International Search Report and Written Opinion received for corresponding Patent Cooperation Treaty Application No. PCT/FI2020/050340, dated Aug. 26, 2020, 15 pages.
Hannuksela et al., "AHG12: Sub-picture layers for realizing independently coded picture regions", Joint Video Experts Team (JVET) of ITU-T SG 16 WP 3 and ISO/IEC JTC 1/SC 29/WG 11, JVET-N0045, 14th Meeting, Mar. 19-27, 2019, pp. 1-13.
Office action received for corresponding Indian Patent Application No. 202247002897, dated Apr. 25, 2022, 5 pages.
Office action received for corresponding Canadian Patent Application No. 3143885, dated Jan. 26, 2023, 4 pages.
Office action received for corresponding Japanese Patent Application No. 2021-576016, dated Apr. 6, 2023, 4 pages of office action and 6 pages of translation available.
Bross et al., "Versatile Video Coding (Draft 5)", Editors, Joint Video Experts Team (JVET) of ITU-T SG 16 WP 3 and ISO/IEC JTC 1/SC 29/WG 11, JVET-N1001-v10, 14th Meeting, Mar. 19-27, 2019, 407 pages.
Fujibayashi et al., "MaxDpbSize setting based on the picture size", NTT Docomo Inc, Joint Video Experts Team (JVET) of ITU-T SG 16 WP 3 and ISO/IEC JTC 1/SC 29/WG 11, JCTVC-J0210_r2, 10th Meeting, Jul. 11-20, 2012, pp. 1-8.
Extended European Search Report received for corresponding European Patent Application No. 20826399.6, dated May 19, 2023, 10 pages.
Office action received for corresponding Chinese Patent Application No. 202080044882.5, dated Feb. 21, 2023, 8 pages of office action and no page of translation available.
Office action received for corresponding Vietnamese Patent Application No. 1-2021-08421, dated Feb. 24, 2022, 1 pages of office action and 1 pages of Translation available.
Office action received for corresponding Russian Patent Application No. 2021139750, dated Jun. 2, 2022, 7 pages of office action and 2 pages of Translation available.
Hannuksela et al., "Corrections on Sub-Sequence SEI Messages", Joint Video Team (JVT) of ISO/IEC MPEG & ITU-T VCEG (ISO/IEC JTC1/SC29/WG11 and ITU-T SG16 Q.6), JVT-F049r1, Dec. 5-13, 2002, pp. 1-5.
Office action received for corresponding Chinese Patent Application No. 202080044882.5, dated Sep. 8, 2023, 6 pages of office action and 4 pages of translation available.
Decision of Final Rejection received for corresponding Japanese Patent Application No. 2021-576016, dated Oct. 16, 2023, 3 pages of Decision of Final Rejection and 4 pages of translation available.
Office action received for corresponding Canadian Patent Application No. 3143885, dated Nov. 7, 2023, 4 pages.

* cited by examiner

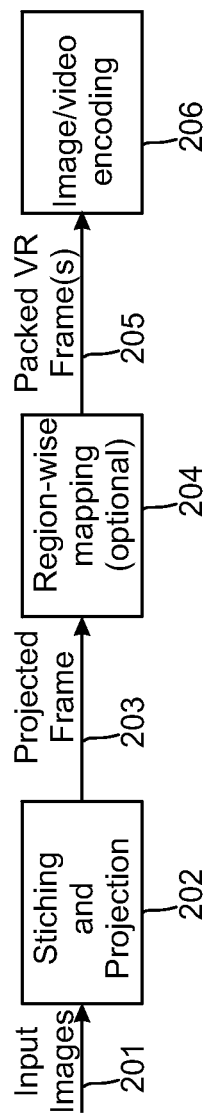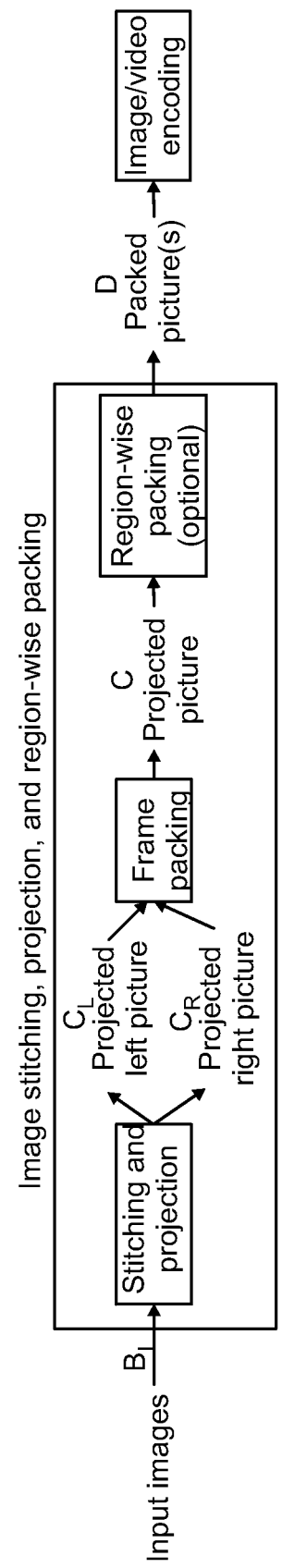

APPARATUS, A METHOD AND A COMPUTER PROGRAM FOR VIDEO ENCODING AND DECODING

RELATED APPLICATION

This application claims priority to PCT Application No. PCT/FI2020/050340, filed on May 20, 2020, which claims priority to U.S. Application No. 62/864,371, filed on Jun. 20, 2019, each of which is incorporated herein by reference in its entirety.

TECHNICAL FIELD

The present invention relates to an apparatus, a method and a computer program for video coding and decoding.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

A video coding system may comprise an encoder that transforms an input video into a compressed representation suited for storage/transmission and a decoder that can uncompress the compressed video representation back into a viewable form. The encoder may discard some information in the original video sequence in order to represent the video in a more compact form, for example, to enable the storage/transmission of the video information at a lower bitrate than otherwise might be needed.

Video coding standards and specifications typically allow encoders to divide, or partition, a coded picture to subsets. In video coding, a partitioning may be defined as a division of a picture or a subregion of a picture into subsets (blocks) such that each element of the picture or the subregion of the picture is in exactly one of the subsets (blocks). For example, H.265/HEVC introduced a concept of a coding tree unit (CTU) having a size of 64×64 pixels by default. A CTU can either contain a single coding unit (CU) or be recursively split into multiple smaller CUs, at minimum 8×8 pixels, based on the quadtree structure. H.265/HEVC also acknowledges tiles, which are rectangular and contain an integer number of CTUs, and slices, which are defined based on slice segments containing an integer number of coding tree units ordered consecutively in the tile scan and contained in a single NAL unit. In the HEVC standard, the partitioning to tiles forms a grid that may be characterized by a list of tile column widths (in CTUs) and a list of tile row heights (in CTUs). Tiles are ordered in the bitstream consecutively in the raster scan order of the tile grid. A tile may contain an integer number of slices.

Images can be split into independently codable and decodable image segments or picture regions (e.g. slices or tiles or tile groups). Such image segments may enable parallel processing, "Slices" in this description may refer to image segments constructed of certain number of basic coding units that are processed in default coding or decoding order, while "tiles" may refer to image segments that have been defined as rectangular image regions. A tile group may be defined as a group of one or more tiles. Image segments may be coded as separate units in the bitstream, such as VCL NAL units in H.264/AVC and HEVC. Coded image segments may comprise a header and a payload, wherein the header contains parameter values needed for decoding the payload.

Merging of independently coded picture regions from one or more source bitstreams into a merged bitstream requires rewriting of parameter sets. In other words, the parameter sets in the source bitstream(s) are not applicable as such. For example, the picture width, the picture height, and/or the picture partitioning to tiles and bricks in the merged bitstream might differ from those of any of the source bitstreams.

SUMMARY

Now in order to at least alleviate the above problems, an enhanced encoding method is introduced herein. In some embodiments there is provided a method, apparatus and computer program product for video coding and decoding.

In an embodiment, a client device for merging independently decodable picture regions comprises a player or any other entity that merges independently decodable picture regions into a single (merged) bitstream; and a decoder that decodes the merged bitstream. The player may pass the merged bitstream to the decoder e.g. one access unit at a time, one coded video sequence at a time or the whole bitstream at a time.

In an embodiment, to create a merged bitstream from the available sequences of independently decodable picture regions, the player carries out the following:

The player creates or receives one or more parameter sets that are suitable for its decoding capabilities. The one or more parameter sets are indicative of a partitioning of a picture into image segments, such as into tiles, bricks, and rectangular slices.

The player selects which subset of independently decodable picture region sequences is received.

The player obtains identifier values of the independently decodable picture region sequences of the subset. The identifier values may for example be identifier values of rectangular slices, wherein an identifier value is included in the slice header syntax.

The player creates a separate data unit into the merged bitstream, the separate data unit comprising a list of the identifier values of the independently decodable picture region sequences of the subset in an order that they appear for each coded picture in the merged bitstream. The data unit may for example be a decoding control NAL unit.

The player receives data units, such as VCL NAL units, of the selected independently decodable picture regions and arranges them in a decoding order into the merged bitstream, subsequent to the separate data unit.

The above steps from the selection to receiving can be repeated whenever a new selection of the independently decodable picture regions is needed e.g. as a response to a viewing orientation change.

In an embodiment, an entity encapsulates and/or describes encoded content comprising independently coded picture regions. The entity may, for example, be a file writer that creates a container file encapsulating one or more bitstreams comprising independently coded picture regions. In another embodiment, the entity is a streaming manifest generator that creates a streaming manifest from the information in a container file containing one or more bitstreams and/or from the bitstreams themselves.

In an embodiment, the entity carries out one or more of the following:

The entity obtains one or more bitstreams comprising independently decodable picture region sequences as input.

The entity extracts independently decodable picture region sequences from the bitstreams and makes them accessible individually in a media presentation description. For example, a file writer can encapsulate each independently decodable picture region sequence as a separate track in one or more container files, in which case the file metadata, such as the MovieBox and all boxes contained therein, can be regarded as the media presentation description. In another example, a streaming manifest generator announces each independently decodable picture region sequence as a Representation or alike in DASH MPD or alike. In yet another example, a streaming manifest generator includes, in the media presentation description, information indicative of resource identifier(s), such as HTTP URL(s), which can be used to identify and/or request transmission segments (e.g. Media Segments of DASH).

The entity assigns identifier values to the independently decodable picture region sequences in the media presentation description.

In an example, a file writer includes the identifier value of an independently coded picture region sequence into one or more of the following containers:
Sample entry
Decoder configuration record
Sample group description entry In another example, a streaming manifest generator includes the identifier value of an independently coded picture region sequence with one or more of the following:
As a value of a specific attribute e.g. at Representation or Sub-Representation level
In a specific element, such as a specific descriptor element, included e.g. at Representation or Sub-Representation level The entity may obtain the identifier values of an independently coded picture region sequences from the one or more bitstreams, e.g. from parameter sets and/or slice headers therein.

In an embodiment, which may be applied independently of or together with other embodiments, the entity carries out one or more of the following:

The entity determines characteristics for targeted merged bitstreams, such as target picture sizes and/or picture partitionings to image segments, such as to tiles, bricks, and/or rectangular slices.

The entity creates parameter set(s) for each targeted merged bitstream. The parameter sets may be directly suitable for video decoding or may be templates that need to be appended or filled in to be suitable for video decoding. For example, the profile-tier-level information may be omitted from the template parameter sets. The parameter sets comprise syntax elements indicative of a partitioning of a picture into image segments (such as tiles, bricks, and/or rectangular slices), wherein spatial sizes of the image segments in a parameter set match spatial sizes of the independently decodable picture region sequences.

The parameter sets are made available in or through the media presentation description. Options of how the parameter sets are made available include but are not limited to the following:

A file creator creates a base track in a container file. Parameter sets are included in the sample entry or the sample entries of the base track, and/or in the sample(s) of the base track and/or in a parameter set track associated with the base track. The tracks containing suitable independently coded picture region sequences to be included in a merged bitstream are indicated with track references, including but not limited to the following options:

A specific track reference from the base track to track IDs of the tracks containing independently coded picture region sequences. The specific track reference may be indicative that any of the tracks identified by the track IDs is suitable to be merged at any location available for an independently coded picture region as indicated in the parameter set(s).

A specific track reference from the base track to track IDs or track group IDs, where each track ID or track group ID entry corresponds to an independent coded picture region in decoding order within a coded picture. The track reference specifies that a coded picture in the merged bitstream can be generated by selecting any track from a track group identified by its track group ID, and then ordering the samples from the identified or selected tracks in the order listed in the track reference.

A streaming manifest generator creates a main Adaptation Set of a Preselection in a DASH MPD. The main Adaptation Set contains a Representation carrying a base track as explained above. Parameter sets are included in the Initialization Segment of the Representation (within the sample entry), and/or in a specific attribute of the Representation, and/or in a specific element, such as a specific descriptor element, of the Representation.

A method according to a first aspect comprises:
concluding that a coded video sequence starts at particular position in a bitstream, wherein the coded video sequence is a sequence of coded pictures in decoding order that is independently decodable and is followed by another coded video sequence or the end of the bitstream, and wherein the bitstream comprises access units, and an access unit comprises coded video data for a single time instance and associated other data, and an access unit comprises one or more network abstraction layer (NAL) units;
indicating in an access unit delimiter to treat the NAL unit(s) associated with the access unit delimiter as a start of a coded video sequence.

An apparatus according to a second aspect comprises at least one processor and at least one memory including computer program code, the memory and the computer program code configured to, with the at least one processor, cause the apparatus to perform at least the following:
conclude that a coded video sequence starts at particular position in a bitstream, wherein the coded video sequence is a sequence of coded pictures in decoding order that is independently decodable and is followed by another coded video sequence or the end of the bitstream, and wherein the bitstream comprises access units, and an access unit comprises coded video data for a single time instance and associated other data, and an access unit comprises one or more network abstraction layer (NAL) units;
indicate in an access unit delimiter to treat the NAL unit(s) associated with the access unit delimiter as a start of a coded video sequence.

A computer program product according to a third aspect comprises computer program code configured to, when executed on at least one processor, cause an apparatus or a system to: conclude that a coded video sequence starts at particular position in a bitstream, wherein the coded video sequence is a sequence of coded pictures in decoding order that is independently decodable and is followed by another coded video sequence or the end of the bitstream, and wherein the bitstream comprises access units, and an access unit comprises coded video data for a single time instance and associated other data, and an access unit comprises one or more network abstraction layer (NAL) units;

indicate in an access unit delimiter to treat the NAL unit(s) associated with the access unit delimiter as a start of a coded video sequence.

An apparatus according to a fourth aspect comprises means for:

concluding that a coded video sequence starts at particular position in a bitstream, wherein the coded video sequence is a sequence of coded pictures in decoding order that is independently decodable and is followed by another coded video sequence or the end of the bitstream, and wherein the bitstream comprises access units, and an access unit comprises coded video data for a single time instance and associated other data, and an access unit comprises one or more network abstraction layer (NAL) units;

indicating in an access unit delimiter to treat the NAL unit(s) associated with the access unit delimiter as a start of a coded video sequence.

A method according to a fifth aspect comprises:

decoding from an access unit delimiter to treat the NAL unit(s) associated with the access unit delimiter as a start of a coded video sequence, wherein the coded video sequence is a sequence of coded pictures in decoding order that is independently decodable and is followed by another coded video sequence or the end of a bitstream, and wherein the bitstream comprises access units, and an access unit comprises coded video data for a single time instance and associated other data, and an access unit comprises one or more network abstraction layer (NAL) units.

An apparatus according to a sixth aspect comprises at least one processor and at least one memory including computer program code, the memory and the computer program code configured to, with the at least one processor, cause the apparatus to perform at least the following:

decode from an access unit delimiter to treat the NAL unit(s) associated with the access unit delimiter as a start of a coded video sequence, wherein the coded video sequence is a sequence of coded pictures in decoding order that is independently decodable and is followed by another coded video sequence or the end of a bitstream, and wherein the bitstream comprises access units, and an access unit comprises coded video data for a single time instance and associated other data, and an access unit comprises one or more network abstraction layer (NAL) units.

A computer program product according to a seventh aspect comprises computer program code configured to, when executed on at least one processor, cause an apparatus or a system to: decode from an access unit delimiter to treat the NAL unit(s) associated with the access unit delimiter as a start of a coded video sequence, wherein the coded video sequence is a sequence of coded pictures in decoding order that is independently decodable and is followed by another coded video sequence or the end of a bitstream, and wherein the bitstream comprises access units, and an access unit comprises coded video data for a single time instance and associated other data, and an access unit comprises one or more network abstraction layer (NAL) units.

An apparatus according to an eighth aspect comprises means for:

decoding from an access unit delimiter to treat the NAL unit(s) associated with the access unit delimiter as a start of a coded video sequence, wherein the coded video sequence is a sequence of coded pictures in decoding order that is independently decodable and is followed by another coded video sequence or the end of a bitstream, and wherein the bitstream comprises access units, and an access unit comprises coded video data for a single time instance and associated other data, and an access unit comprises one or more network abstraction layer (NAL) units.

The further aspects relate to apparatuses and computer readable storage media stored with code thereon, which are arranged to carry out the above methods and one or more of the embodiments related thereto.

BRIEF DESCRIPTION OF THE DRAWINGS

For better understanding of the present invention, reference will now be made by way of example to the accompanying drawings in which:

FIG. 2 shows an example of image stitching, projection and region-wise packing;

FIG. 3 shows another example of image stitching, projection and region-wise packing;

DETAILED DESCRIPTION OF SOME EXAMPLE EMBODIMENTS

Figure 1:
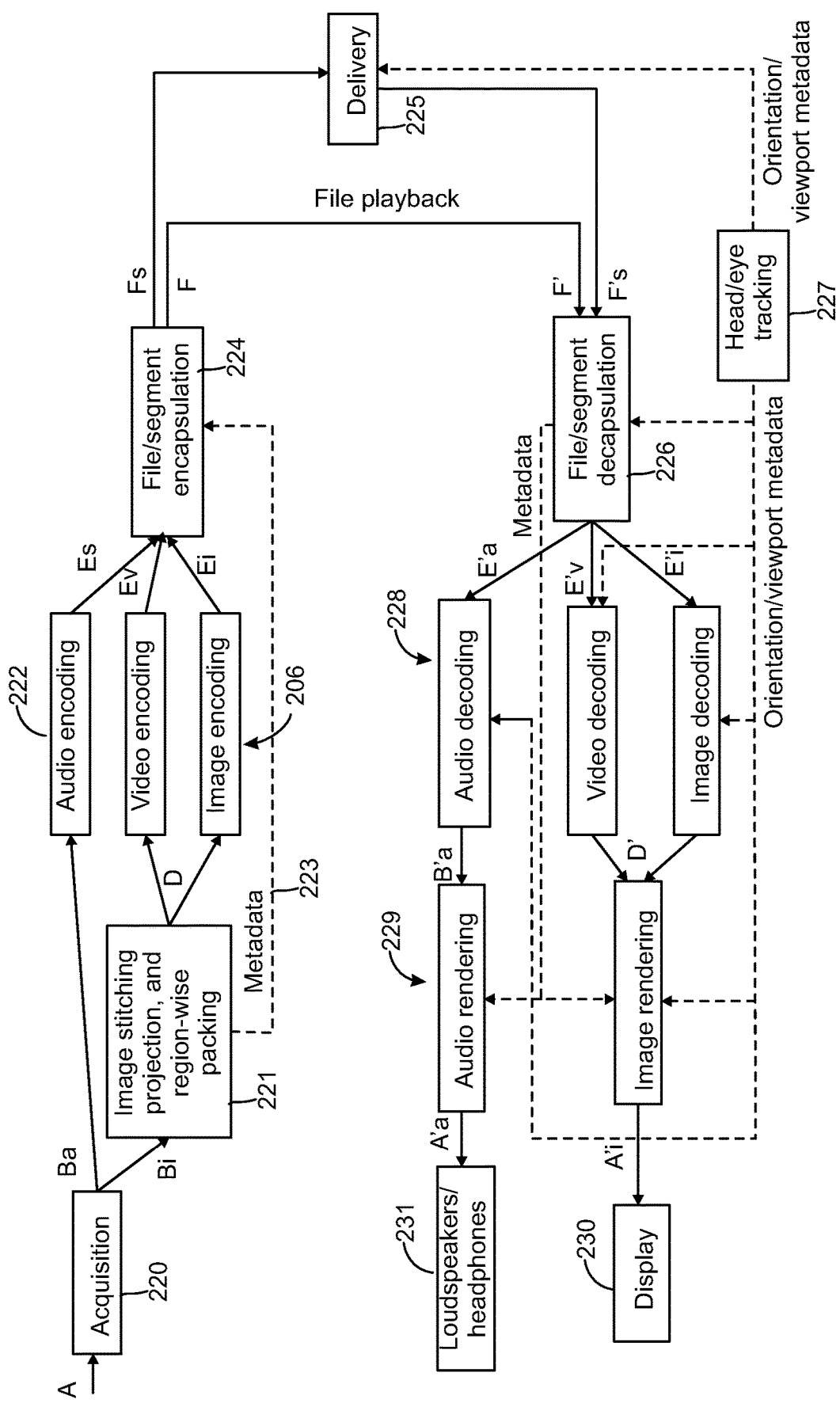
FIG. 1 shows an example of MPEG Omnidirectional Media Format (OMAF)

In the following, several embodiments will be described in the context of one video coding arrangement. It is to be noted, however, that the invention is not limited to this particular arrangement. For example, the invention may be applicable to video coding systems like streaming system, DVD (Digital Versatile Disc) players, digital television receivers, personal video recorders, systems and computer programs on personal computers, handheld computers and communication devices, as well as network elements such as transcoders and cloud computing arrangements where video data is handled.

In the following, several embodiments are described using the convention of referring to (de)coding, which indicates that the embodiments may apply to decoding and/or encoding.

The Advanced Video Coding standard (which may be abbreviated AVC or H.264/AVC) was developed by the Joint Video Team (JVT) of the Video Coding Experts Group (VCEG) of the Telecommunications Standardization Sector of International Telecommunication Union (ITU-T) and the Moving Picture Experts Group (MPEG) of International Organization for Standardization (ISO)/International Electrotechnical Commission (IEC). The H.264/AVC standard is published by both parent standardization organizations, and it is referred to as ITU-T Recommendation H.264 and ISO/IEC International Standard 14496-10, also known as MPEG-4 Part 10 Advanced Video Coding (AVC). There have been multiple versions of the H.264/AVC standard, each integrating new extensions or features to the specification. These extensions include Scalable Video Coding (SVC) and Multiview Video Coding (MVC).

The High Efficiency Video Coding standard (which may be abbreviated HEVC or H.265/HEVC) was developed by the Joint Collaborative Team-Video Coding (JCT-VC) of VCEG and MPEG. The standard is published by both parent standardization organizations, and it is referred to as ITU-T Recommendation H.265 and ISO/IEC International Standard 23008-2, also known as MPEG-H Part 2 High Efficiency Video Coding (HEVC). Extensions to H.265/HEVC include scalable, multiview, three-dimensional, and fidelity range extensions, which may be referred to as SHVC, MV-HEVC, 3D-HEVC, and REXT, respectively. The references in this description to H.265/HEVC, SHVC, MV-HEVC, 3D-HEVC and REXT that have been made for the purpose of understanding definitions, structures or concepts of these standard specifications are to be understood to be references to the latest versions of these standards that were available before the date of this application, unless otherwise indicated.

The Versatile Video Coding standard (VVC, H.266, or H.266/VVC) is presently under development by the Joint Video Experts Team (JVET), which is a collaboration between the ISO/IEC MPEG and ITU-T VCEG.

Some key definitions, bitstream and coding structures, and concepts of H.264/AVC and HEVC and some of their extensions are described in this section as an example of a video encoder, decoder, encoding method, decoding method, and a bitstream structure, wherein the embodiments may be implemented. Some of the key definitions, bitstream and coding structures, and concepts of H.264/AVC are the same as in HEVC standard—hence, they are described below jointly. The aspects of various embodiments are not limited to H.264/AVC or HEVC or their extensions, but rather the description is given for one possible basis on top of which the present embodiments may be partly or fully realized.

Video codec may comprise an encoder that transforms the input video into a compressed representation suited for storage/transmission and a decoder that can uncompress the compressed video representation back into a viewable form. The compressed representation may be referred to as a bitstream or a video bitstream. A video encoder and/or a video decoder may also be separate from each other, i.e. need not form a codec. The encoder may discard some information in the original video sequence in order to represent the video in a more compact form (that is, at lower bitrate).

Hybrid video codecs, for example ITU-T H.264, may encode the video information in two phases. At first, pixel values in a certain picture area (or "block") are predicted for example by motion compensation means (finding and indicating an area in one of the previously coded video frames that corresponds closely to the block being coded) or by spatial means (using the pixel values around the block to be coded in a specified manner). Then, the prediction error, i.e. the difference between the predicted block of pixels and the original block of pixels, is coded. This may be done by transforming the difference in pixel values using a specified transform (e.g. Discreet Cosine Transform (DCT) or a variant of it), quantizing the coefficients and entropy coding the quantized coefficients. By varying the fidelity of the quantization process, encoder can control the balance between the accuracy of the pixel representation (picture quality) and size of the resulting coded video representation (file size or transmission bitrate).

In temporal prediction, the sources of prediction are previously decoded pictures (a.k.a. reference pictures). In intra block copy (IBC; a.k.a. intra-block-copy prediction or current picture referencing), prediction is applied similarly to temporal prediction, but the reference picture is the current picture and only previously decoded samples can be referred in the prediction process. Inter-layer or inter-view prediction may be applied similarly to temporal prediction, but the reference picture is a decoded picture from another scalable layer or from another view, respectively. In some cases, inter prediction may refer to temporal prediction only, while in other cases inter prediction may refer collectively to temporal prediction and any of intra block copy, inter-layer prediction, and inter-view prediction provided that they are performed with the same or similar process than temporal prediction. Inter prediction or temporal prediction may sometimes be referred to as motion compensation or motion-compensated prediction.

Intra prediction utilizes the fact that adjacent pixels within the same picture are likely to be correlated. Intra prediction can be performed in spatial or transform domain, i.e., either sample values or transform coefficients can be predicted. Intra prediction is typically exploited in intra coding, where no inter prediction is applied.

One outcome of the coding procedure is a set of coding parameters, such as motion vectors and quantized transform coefficients. Many parameters can be entropy-coded more efficiently if they are predicted first from spatially or temporally neighboring parameters. For example, a motion vector may be predicted from spatially adjacent motion vectors and only the difference relative to the motion vector predictor may be coded. Prediction of coding parameters and intra prediction may be collectively referred to as in-picture prediction.

Entropy coding/decoding may be performed in many ways. For example, context-based coding/decoding may be applied, where in both the encoder and the decoder modify the context state of a coding parameter based on previously coded/decoded coding parameters. Context-based coding may for example be context adaptive binary arithmetic coding (CABAC) or context-based variable length coding (CAVLC) or any similar entropy coding Entropy coding/decoding may alternatively or additionally be performed using a variable length coding scheme, such as Huffman coding/decoding or Exp-Golomb coding/decoding. Decoding of coding parameters from an entropy-coded bitstream or codewords may be referred to as parsing.

Video coding standards may specify the bitstream syntax and semantics as well as the decoding process for error-free bitstreams, whereas the encoding process might not be specified, but encoders may just be required to generate conforming bitstreams. Bitstream and decoder conformance can be verified with the Hypothetical Reference Decoder (HRD). The standards may contain coding tools that help in coping with transmission errors and losses, but the use of the tools in encoding may be optional and decoding process for erroneous bitstreams might not have been specified.

A syntax element may be defined as an element of data represented in the bitstream. A syntax structure may be defined as zero or more syntax elements present together in the bitstream in a specified order.

An elementary unit for the input to an encoder and the output of a decoder, respectively, is typically a picture. A picture given as an input to an encoder may also be referred to as a source picture, and a picture decoded by a decoded may be referred to as a decoded picture or a reconstructed picture.

The source and decoded pictures are each comprised of one or more sample arrays, such as one of the following sets of sample arrays:
  Luma (Y) only (monochrome).
  Luma and two chroma (YCbCr or YCgCo).
  Green, Blue and Red (GBR, also known as RGB).
  Arrays representing other unspecified monochrome or tri-stimulus color samplings (for example, YZX, also known as XYZ).

In the following, these arrays may be referred to as luma (or L or Y) and chroma, where the two chroma arrays may be referred to as Cb and Cr; regardless of the actual color representation method in use. The actual color representation method in use can be indicated e.g. in a coded bitstream e.g. using the Video Usability Information (VUI) syntax of HEVC or alike. A component may be defined as an array or single sample from one of the three sample arrays (luma and two chroma) or the array or a single sample of the array that compose a picture in monochrome format.

A picture may be defined to be either a frame or a field. A frame comprises a matrix of luma samples and possibly the corresponding chroma samples. A field is a set of alternate sample rows of a frame and may be used as encoder input, when the source signal is interlaced. Chroma sample arrays may be absent (and hence monochrome sampling may be in use) or chroma sample arrays may be subsampled when compared to luma sample arrays.

Some chroma formats may be summarized as follows:
  In monochrome sampling there is only one sample array, which may be nominally considered the luma array.
  In 4:2:0 sampling, each of the two chroma arrays has half the height and half the width of the luma array.
  In 4:2:2 sampling, each of the two chroma arrays has the same height and half the width of the luma array.
  In 4:4:4 sampling when no separate color planes are in use, each of the two chroma arrays has the same height and width as the luma array.

Coding formats or standards may allow to code sample arrays as separate color planes into the bitstream and respectively decode separately coded color planes from the bitstream. When separate color planes are in use, each one of them is separately processed (by the encoder and/or the decoder) as a picture with monochrome sampling.

When chroma subsampling is in use (e.g. 4:2:0 or 4:2:2 chroma sampling), the location of chroma samples with respect to luma samples may be determined in the encoder side (e.g. as pre-processing step or as part of encoding). The chroma sample positions with respect to luma sample positions may be pre-defined for example in a coding standard, such as H.264/AVC or HEVC, or may be indicated in the bitstream for example as part of VUI of H.264/AVC or HEVC.

Generally, the source video sequence(s) provided as input for encoding may either represent interlaced source content or progressive source content. Fields of opposite parity have been captured at different times for interlaced source content. Progressive source content contains captured frames. An encoder may encode fields of interlaced source content in two ways: a pair of interlaced fields may be coded into a coded frame or a field may be coded as a coded field. Likewise, an encoder may encode frames of progressive source content in two ways: a frame of progressive source content may be coded into a coded frame or a pair of coded fields. A field pair or a complementary field pair may be defined as two fields next to each other in decoding and/or output order, having opposite parity (i.e. one being a top field and another being a bottom field) and neither belonging to any other complementary field pair. Some video coding standards or schemes allow mixing of coded frames and coded fields in the same coded video sequence. Moreover, predicting a coded field from a field in a coded frame and/or predicting a coded frame for a complementary field pair (coded as fields) may be enabled in encoding and/or decoding.

Partitioning may be defined as a division of a set into subsets such that each element of the set is in exactly one of the subsets. In video coding, a partitioning may be defined as a division of a picture or a subregion of a picture into subsets such that each element of the picture or the subregion of the picture is in exactly one of the subsets. For example, in partitioning relating to HEVC encoding and/or decoding, and/or to VVC encoding and/or decoding the following terms may be used. A coding block may be defined as an N×N block of samples for some value of N such that the division of a coding tree block into coding blocks is a partitioning. A coding tree block (CTB) may be defined as an N×N block of samples for some value of N such that the division of a component into coding tree blocks is a partitioning. A coding tree unit (CTU) may be defined as a coding tree block of luma samples, two corresponding coding tree blocks of chroma samples of a picture that has three sample arrays, or a coding tree block of samples of a monochrome picture or a picture that is coded using three separate color planes and syntax structures used to code the samples. A coding unit (CU) may be defined as a coding block of luma samples, two corresponding coding blocks of chroma samples of a picture that has three sample arrays, or a coding block of samples of a monochrome picture or a picture that is coded using three separate color planes and syntax structures used to code the samples. A CU with the maximum allowed size may be named as LCU (largest coding unit) or coding tree unit (CTU) and the video picture is divided into non-overlapping LCUs.

In HEVC, a CU consists of one or more prediction units (PU) defining the prediction process for the samples within the CU and one or more transform units (TU) defining the prediction error coding process for the samples in the said CU. Typically, a CU consists of a square block of samples with a size selectable from a predefined set of possible CU sizes. Each PU and TU can be further split into smaller PUs and TUs in order to increase granularity of the prediction and prediction error coding processes, respectively. Each PU has prediction information associated with it defining what kind of a prediction is to be applied for the pixels within that PU (e.g. motion vector information for inter predicted PUs and intra prediction directionality information for intra predicted PUs).

Each TU can be associated with information describing the prediction error decoding process for the samples within the said TU (including e.g. DCT coefficient information). It is typically signalled at CU level whether prediction error coding is applied or not for each CU. In the case there is no prediction error residual associated with the CU, it can be considered there are no TUs for the said CU. The division of the image into CUs, and division of CUs into PUs and TUs is typically signalled in the bitstream allowing the decoder to reproduce the intended structure of these units.

In a draft version of H.266/VVC, the following partitioning applies. It is noted that what is described here might still evolve in later draft versions of H.266/VVC until the standard is finalized. Pictures are partitioned into CTUs similarly to HEVC, although the maximum CTU size has been increased to 128×128. A coding tree unit (CTU) is first partitioned by a quaternary tree (a.k.a. quadtree) structure. Then the quaternary tree leaf nodes can be further partitioned by a multi-type tree structure. There are four splitting types in multi-type tree structure, vertical binary splitting, horizontal binary splitting, vertical ternary splitting, and horizontal ternary splitting. The multi-type tree leaf nodes are called coding units (CUs). CU, PU and TU have the same block size, unless the CU is too large for the maximum transform length. A segmentation structure for a CTU is a quadtree with nested multi-type tree using binary and ternary splits, i.e. no separate CU, PU and TU concepts are in use except when needed for CUs that have a size too large for the maximum transform length. A CU can have either a square or rectangular shape.

An elementary unit for the output of encoders of some coding formats, such as VVC, and the input of decoders of some coding formats, such as VVC, is a Network Abstraction Layer (NAL) unit. For transport over packet-oriented networks or storage into structured files, NAL units may be encapsulated into packets or similar structures.

A byte stream format may be specified for NAL unit streams for transmission or storage environments that do not provide framing structures. The byte stream format separates NAL units from each other by attaching a start code in front of each NAL unit. To avoid false detection of NAL unit boundaries, encoders run a byte-oriented start code emulation prevention algorithm, which adds an emulation prevention byte to the NAL unit payload if a start code would have occurred otherwise. In order to enable straightforward gateway operation between packet- and stream-oriented systems, start code emulation prevention may always be performed regardless of whether the byte stream format is in use or not.

A NAL unit may be defined as a syntax structure containing an indication of the type of data to follow and bytes containing that data in the form of an RBSP interspersed as necessary with emulation prevention bytes. A raw byte sequence payload (RBSP) may be defined as a syntax structure containing an integer number of bytes that is encapsulated in a NAL unit. An RBSP is either empty or has the form of a string of data bits containing syntax elements followed by an RBSP stop bit and followed by zero or more subsequent bits equal to 0.

NAL units consist of a header and payload. The NAL unit header indicates the type of the NAL unit among other things.

NAL units can be categorized into Video Coding Layer (VCL) NAL units and non-VCL NAL units. VCL NAL units are typically coded slice NAL units.

A non-VCL NAL unit may be for example one of the following types: a sequence parameter set, a picture parameter set, a supplemental enhancement information (SEI) NAL unit, an access unit delimiter, an end of sequence NAL unit, an end of bitstream NAL unit, or a filler data NAL unit. Parameter sets may be needed for the reconstruction of decoded pictures, whereas many of the other non-VCL NAL units are not necessary for the reconstruction of decoded sample values.

Some coding formats specify parameter sets that may carry parameter values needed for the decoding or reconstruction of decoded pictures. A parameter may be defined as a syntax element of a parameter set. A parameter set may be defined as a syntax structure that contains parameters and that can be referred to from or activated by another syntax structure for example using an identifier.

Some types of parameter sets are briefly described in the following but it needs to be understood that other types of parameter sets may exist and that embodiments may be applied but are not limited to the described types of parameter sets. Parameters that remain unchanged through a coded video sequence may be included in a sequence parameter set (SPS). In addition to the parameters that may be needed by the decoding process, the sequence parameter set may optionally contain video usability information (VUI), which includes parameters that may be important for buffering, picture output timing, rendering, and resource reservation. A picture parameter set (PPS) contains such parameters that are likely to be unchanged in several coded pictures. A picture parameter set may include parameters that can be referred to by the coded image segments of one or more coded pictures. A header parameter set (HPS) has been proposed to contain such parameters that may change on picture basis.

A bitstream may be defined as a sequence of bits, which may in some coding formats or standards be in the form of a NAL unit stream or a byte stream, that forms the representation of coded pictures and associated data forming one or more coded video sequences. A first bitstream may be followed by a second bitstream in the same logical channel, such as in the same file or in the same connection of a communication protocol. An elementary stream (in the context of video coding) may be defined as a sequence of one or more bitstreams. In some coding formats or standards, the end of the first bitstream may be indicated by a specific NAL unit, which may be referred to as the end of bitstream (EOB) NAL unit and which is the last NAL unit of the bitstream.

A bitstream portion may be defined as a contiguous subset of a bitstream. In some contexts, it may be required that a bitstream portion consists of one or more entire syntax structures and no incomplete syntax structures. In other contexts, a bitstream portion may comprise any contiguous section of a bitstream and may contain incomplete syntax structure(s).

The phrase along the bitstream (e.g. indicating along the bitstream) or along a coded unit of a bitstream (e.g. indicating along a coded tile) may be used in claims and described embodiments to refer to transmission, signaling, or storage in a manner that the "out-of-band" data is associated with but not included within the bitstream or the coded unit, respectively. The phrase decoding along the bitstream or along a coded unit of a bitstream or alike may refer to decoding the referred out-of-band data (which may be obtained from out-of-band transmission, signaling, or storage) that is associated with the bitstream or the coded unit, respectively. For example, the phrase along the bitstream may be used when the bitstream is contained in a container file, such as a file conforming to the ISO Base Media File Format, and certain file metadata is stored in the file in a manner that associates the metadata to the bitstream, such as boxes in the sample entry for a track containing the bitstream, a sample group for the track containing the bitstream, or a timed metadata track associated with the track containing the bitstream.

A coded video sequence (CVS) may be defined as such a sequence of coded pictures in decoding order that is independently decodable and is followed by another coded video sequence or the end of the bitstream. A coded video sequence may additionally or alternatively be specified to end, when a specific NAL unit, which may be referred to as an end of sequence (EOS) NAL unit, appears in the bitstream.

Images can be split into independently codable and decodable image segments (e.g. slices and/or tiles and/or tile groups). Such image segments may enable parallel processing, "Slices" in this description may refer to image segments constructed of certain number of basic coding units that are processed in default coding or decoding order, while "tiles" may refer to image segments that have been defined as rectangular image regions along a tile grid. A tile group may be defined as a group of one or more tiles. Image segments may be coded as separate units in the bitstream, such as VCL NAL units in H.264/AVC and HEVC and VVC. Coded image segments may comprise a header and a payload, wherein the header contains parameter values needed for decoding the payload. The payload of a slice may be referred to as slice data.

In HEVC, a picture can be partitioned in tiles, which are rectangular and contain an integer number of LCUs. In HEVC, the partitioning to tiles forms a regular grid, where heights and widths of tiles differ from each other by one LCU at the maximum. In HEVC, a slice is defined to be an integer number of coding tree units contained in one independent slice segment and all subsequent dependent slice segments (if any) that precede the next independent slice segment (if any) within the same access unit. In HEVC, a slice segment is defined to be an integer number of coding tree units ordered consecutively in the tile scan and contained in a single NAL unit. The division of each picture into slice segments is a partitioning. In HEVC, an independent slice segment is defined to be a slice segment for which the values of the syntax elements of the slice segment header are not inferred from the values for a preceding slice segment, and a dependent slice segment is defined to be a slice segment for which the values of some syntax elements of the slice segment header are inferred from the values for the preceding independent slice segment in decoding order. In HEVC, a slice header is defined to be the slice segment header of the independent slice segment that is a current slice segment or is the independent slice segment that precedes a current dependent slice segment, and a slice segment header is defined to be a part of a coded slice segment containing the data elements pertaining to the first or all coding tree units represented in the slice segment. The CUs are scanned in the raster scan order of LCUs within tiles or within a picture, if tiles are not in use. Within an LCU, the CUs have a specific scan order.

Accordingly, video coding standards and specifications may allow encoders to divide a coded picture to coded slices or alike. In-picture prediction is typically disabled across slice boundaries. Thus, slices can be regarded as a way to split a coded picture to independently decodable pieces. In H.264/AVC and HEVC, in-picture prediction may be disabled across slice boundaries. Thus, slices can be regarded as a way to split a coded picture into independently decodable pieces, and slices are therefore often regarded as elementary units for transmission. In many cases, encoders may indicate in the bitstream which types of in-picture prediction are turned off across slice boundaries, and the decoder operation takes this information into account for example when concluding which prediction sources are available. For example, samples from a neighboring CU may be regarded as unavailable for intra prediction, if the neighboring CU resides in a different slice.

In the latest draft version of VVC, i.e. VVC Draft 5, the partitioning of pictures into slices, tiles and bricks is defined as follows.

A picture is divided into one or more tile rows and one or more tile columns. The partitioning of a picture to tiles forms a tile grid that may be characterized by a list of tile column widths (in CTUs) and a list of tile row heights (in CTUs).

A tile is a sequence of coding tree units (CTUs) that covers one "cell" in the tile grid, i.e., a rectangular region of a picture. A tile is divided into one or more bricks, each of which consisting of a number of CTU rows within the tile. A tile that is not partitioned into multiple bricks is also referred to as a brick. However, a brick that is a true subset of a tile is not referred to as a tile.

A slice either contains a number of tiles of a picture or a number of bricks of a tile. A slice is a VCL NAL unit, which comprises a slice header and slice data.

Two modes of slices are supported, namely the raster-scan slice mode and the rectangular slice mode. In the raster-scan slice mode, a slice contains a sequence of tiles in a tile raster scan of a picture. In the rectangular slice mode, a slice contains a number of bricks of a picture that collectively form a rectangular region of the picture. The bricks within a rectangular slice are in the order of brick raster scan of the slice.

A brick scan may be defined as a specific sequential ordering of CTUs partitioning a picture in which the CTUs are ordered consecutively in CTU raster scan in a brick, bricks within a tile are ordered consecutively in a raster scan of the bricks of the tile, and tiles in a picture are ordered consecutively in a raster scan of the tiles of the picture. It may be required e.g. in a coding standard that the coded slice NAL units shall be in the order of increasing CTU address in brick scan order for the first CTU of each coded slice NAL unit, wherein the CTU address may be defined to be increasing in CTU raster scan within a picture. Raster scan may be defined as a mapping of a rectangular two-dimensional pattern to a one-dimensional pattern such that the first entries in the one-dimensional pattern are from the first top row of the two-dimensional pattern scanned from left to right, followed similarly by the second, third, etc., rows of the pattern (going down) each scanned from left to right.

In VVC Draft 5, the slice header comprises a slice_address syntax element, which is directly or indirectly indicative of the slice address of the slice, where the slice address may be regarded as a spatial location or position within the picture. When raster-scan-order slices are in use, the slice_address syntax element indicates the tile index in picture raster scan order. When rectangular slices are in use and no explicit slice_address ordering is indicated in PPS, the slice_address indicates the brick index in a scan order of bricks of the first brick of the slice. When rectangular slices are in use and explicit slice_address ordering is indicated in PPS, a list of slice_address values (a.k.a. slice ID values) is provided in PPS in a pre-defined scan order indicative of the spatial position of the slices with those slice_address values within the picture.

Figure 13A:
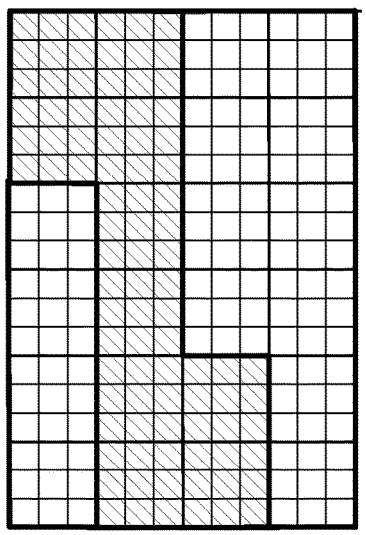
FIGS. 13a, 13b, 13c show some examples of partitioning a picture into coding tree units (CTU), tiles, bricks and slices.
Figure 13B:
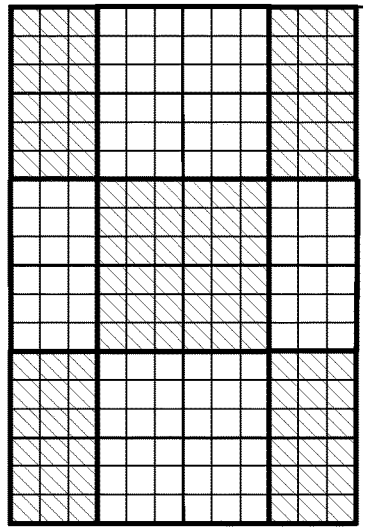
Figure 13C:
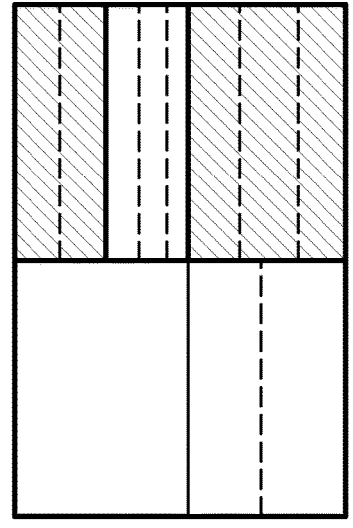

FIG. 13a shows an example of raster-scan slice partitioning of a picture, where the picture is divided into 12 tiles and 3 raster-scan slices. FIG. 13b shows an example of rectangular slice partitioning of a picture (with 18 by 12 CTUs), where the picture is divided into 24 tiles (6 tile columns and 4 tile rows) and 9 rectangular slices. FIG. 13c shows an example of a picture partitioned into tiles, bricks, and rectangular slices, where the picture is divided into 4 tiles (2 tile columns and 2 tile rows), 11 bricks (the top-left tile contains 1 brick, the top-right tile contains 5 bricks, the bottom-left tile contains 2 bricks, and the bottom-right tile contain 3 bricks), and 4 rectangular slices.

In VVC Draft 5, partitioning to tiles, bricks, and rectangular slices is specified in the picture parameter set (PPS). The following syntax and semantics provide examples of syntax elements that may be used in different embodiments. In an embodiment, an encoder determines to include the partitioning to tiles, bricks, and rectangular slices in sequence-level (e.g. in SPS) or in picture-level (e.g. in PPS), and indicates the syntax structure containing the partitioning in sequence-level (e.g. in SPS). In an embodiment, a decoder decodes an indication which syntax structure contains the partitioning to tiles, bricks, and rectangular slices from a sequence-level syntax structure (e.g. from SPS), and accordingly decodes the partitioning to tiles, bricks, and rectangular slices from the indicated sequence-level (e.g. SPS) or picture-level (e.g. PPS) syntax structure. The indication may for example be like the sps_tile_brickrectslice_present_flag described below. In an embodiment, an encoder creates a PPS or parts thereof according to the syntax and semantics below, and/or a decoder decodes a PPS or parts thereof according to the syntax and semantics below, the PPS including the partitioning to tiles, bricks, and rectangular slices. In an embodiment, an encoder creates an SPS or parts thereof according to the syntax and semantics below, and/or a decoder decodes a SPS or parts thereof according to the syntax and semantics below, the SPS including the partitioning to tiles, bricks, and rectangular slices.

TABLE 1

| | Descriptor |
|---|---|
| tile_brick_rect_slice( ) { | |
|   single_tile_in_pic_flag | u(1) |
|   if( !single_tile_in_pic_flag ) { | |
|     uniform_tile_spacing_flag | u(1) |
|     if( uniform_tile_spacing_flag ) { | |
|       tile_cols_width_minus1 | ue(v) |
|       tile_rows_height_minus1 | ue(v) |
|     } else { | |
|       num_tile_columns_minus1 | ue(v) |
|       num_tile_rows_minus1 | ue(v) |
|       for( i = 0; i < num_tile_columns_minus1; i++ ) | |
|         tile_column_width_minus1[ i ] | ue(v) |
|       for( i = 0; i < num_tile_rows_minus1; i++ ) | |
|         tile_row_height_minus1[ i ] | ue(v) |
|     } | |
|     brick_splitting_present_flag | u(1) |
|     for( i = 0; brick_splitting_present_flag && i < NumTilesInPic; i++ ) { | |
|       brick_split_flag[ i ] | u(1) |
|       if( brick_split_flag[ i ] ) { | |
|         uniform_brick_spacing_flag[ i ] | u(1) |
|         if( uniform_brick_spacing_flag[ i ] ) | |
|           brick_height_minus1[ i ] | ue(v) |
|         else { | |
|           num_brick_rows_minus1[ i ] | ue(v) |
|           for( j = 0; j < num_brick_rows_minus1[ i ]; j++ ) | |
|             brick_row_height_minus1[ i ][ j ] | ue(v) |
|         } | |
|       } | |
|     } | |
|     single_brick_per_slice_flag | u(1) |
|     if( !single_brick_per_slice_flag ) | |
|       rect_slice_flag | u(1) |
|     if( rect_slice_flag && !single_brick_per_slice_flag ) { | |

TABLE 1-continued

|  | Descriptor |
|---|---|
| num_slices_in_pic_minus1 | ue(v) |
| for( i = 0; i <= num_slices_in_pic_minus1; i++ ) { |  |
|   if( i > 0 ) | 0) |
|     top_left_brick_idx[ i ] | u(v) |
|     bottom_right_brick_idx_delta[ i ] | u(v) |
|   } |  |
| } |  |
| if( rect_slice_flag ) |  |
|   for( i = 0; i <= num_slices_in_pic_minus1; i++ ) |  |
|     slice_treated_as_pic_flag[ i ] | u(1) |
| loop_filter_across_bricks_enabled_flag | u(1) |
| if( loop_filter_across_bricks_enabled_flag ) |  |
|   loop_filter_across_slices_enabled_flag | u(1) |
| } |  |
| if( rect_slice_flag ) { |  |
|   slice_id_len_flag | u(1) |
|   if(slice_id_len_flag ) |  |
|     signalled_slice_id_length_minus1 | ue(v) |
| } |  |
| } |  |

TABLE 2

|  | Descriptor |
|---|---|
| seq_parameter_set_rbsp( ) { |  |
|   ... |  |
|   sps_tile_brick_rect_slice_present_flag | u(1) |
|   if( sps_tile_brick_rect_slice_present_flag ) |  |
|     tile_brick_rect_slice( ) |  |
|   ... |  | sps_tile_brick_rect_slice_present_flag equal to 0 specifies that tile_brick_rect_slice( ) is present in PPSs referencing this SPS. sps_tile_brickrectslice_present_flag equal to 1 specifies that tile_brick_rect_slice( ) is present in the SPS RBSP syntax.

TABLE 3

|  | Descriptor |
|---|---|
| pic_parameter_set_rbsp( ) { |  |
|   pps_pic_parameter_set_id | ue(v) |
|   pps_seq_parameter_set_id | ue(v) |
|   output_flag_present_flag | u(1) |
|   if( !sps_tile_brick_rect_slice_present_flag ) |  |
|     tile_brick_rect_slice( ) |  |
|   entropy_coding_sync_enabled_flag | u(1) |
|   cabac_init_present_flag | u(1) |
|   ... |  | single_tile_in_pic_flag equal to 1 specifies that there is only one tile in each picture referring to the PPS. single_tile_in_pic_flag equal to 0 specifies that there is more than one tile in each picture referring to the PPS. NOTE—In absence of further brick splitting within a tile, the whole tile is referred to as a brick. When a picture contains only a single tile without further brick splitting, it is referred to as a single brick. It is a requirement of bitstream conformance that the value of single_tile_in_pic_flag shall be the same for all PPSs that are activated within a CVS.

uniform_tile_spacing_flag equal to 1 specifies that tile column boundaries and likewise tile row boundaries are distributed uniformly across the picture and signalled using the syntax elements tile_cols_width_minus1 and tile_rows_height_minus1. uniform_tile_spacing_flag equal to 0 specifies that tile column boundaries and likewise tile row boundaries may or may not be distributed uniformly across the picture and signalled using the syntax elements num_tile_columns_minus1 and num_tilerows_minus1 and a list of syntax element pairs tile_column_width_minus1[i] and tile_row_height_minus1[i]. When not present, the value of uniform_tile_spacing_flag is inferred to be equal to 1.

tile_cols_width_minus1 plus 1 specifies the width of the tile columns excluding the right-most tile column of the picture in units of CTBs when uniform_tile_spacing_flag is equal to 1. The value of tile_cols_width_minus1 shall be in the range of 0 to PicWidthInCtbsY−1, inclusive. When not present, the value of tile_cols_width_minus1 is inferred to be equal to PicWidthInCtbsY−1.

tile_rows_height_minus1 plus 1 specifies the height of the tile rows excluding the bottom tile row of the picture in units of CTBs when uniform_tile_spacing_flag is equal to 1. The value of tile_rows_height_minus1 shall be in the range of 0 to PicHeightInCtbsY−1, inclusive. When not present, the value of tile_rows_height_minus1 is inferred to be equal to PicHeightInCtbsY−1.

num_tile_columns_minus1 plus 1 specifies the number of tile columns partitioning the picture when uniform_tile_spacing_flag is equal to 0. The value of num_tile_columns_minus1 shall be in the range of 0 to PicWidthInCtbsY−1, inclusive. If single_tile_in_pic_flag is equal to 1, the value of num_tile_columns_minus1 is inferred to be equal to 0. Otherwise, when uniform_tile_spacing_flag is equal to 1, the value of num_tile_columns_minus1 is inferred as specified in the CTB raster scanning, tile scanning, and brick scanning process.

num_tile_rows_minus1 plus 1 specifies the number of tile rows partitioning the picture when uniform_tile_spacing_flag is equal to 0. The value of num_tile_rows_minus1 shall be in the range of 0 to PicHeightInCtbsY−1, inclusive. If single_tile_in_pic_flag is equal to 1, the value of num_tile_rows_minus1 is inferred to be equal to 0. Otherwise, when uniform_tile_spacing_flag is equal to 1, the value of num_tile_rows_minus1 is inferred as specified in the CTB raster scanning, tile scanning, and brick scanning process. The variable NumTilesInPic is set equal to (num_tile_columns_minus1+1)*(num_tile_rows_minus1+1). When single_tile_in_pic_flag is equal to 0, NumTilesInPic shall be greater than 1.

tile_column_width_minus1[i] plus 1 specifies the width of the i-th tile column in units of CTBs.

tile_row_height_minus1[i] plus 1 specifies the height of the i-th tile row in units of CTBs.

brick_splitting_present_flag equal to 1 specifies that one or more tiles of pictures referring to the PPS may be divided into two or more bricks. brick_splitting_present_flag equal to 0 specifies that no tiles of pictures referring to the PPS are divided into two or more bricks.

brick_split_flag[i] equal to 1 specifies that the i-th tile is divided into two or more bricks. brick_split_flag[i] equal to 0 specifies that the i-th tile is not divided into two or more bricks. When not present, the value of brick_split_flag[i] is inferred to be equal to 0.

uniform_brick_spacing_flag[i] equal to 1 specifies that horizontal brick boundaries are distributed uniformly across the i-th tile and signalled using the syntax element brick_height_minus1[i]. uniform_brick_spacing_flag[i] equal to 0 specifies that horizontal brick boundaries may or may not be distributed uniformly across i-th tile and signalled using the syntax element num_brick_rows_minus1[i] and a list of syntax elements brick_row_height_minus1[i][j]. When not present, the value of uniform_brick_spacing_flag[i] is inferred to be equal to 1.

brick_height_minus1[i] plus 1 specifies the height of the brick rows excluding the bottom brick in the i-th tile in units of CTBs when uniform_brick_spacing_flag[i] is equal to 1. When present, the value of brick_height_minus1 shall be in the range of 0 to RowHeight[i]−2, inclusive. When not present, the value of brick_height_minus1[i] is inferred to be equal to RowHeight[i]−1.

num_brick_rows_minus1[i] plus 1 specifies the number of bricks partitioning the i-th tile when uniform_brick_spacing_flag[i] is equal to 0. When present, the value of num_brick_rows_minus1[i] shall be in the range of 1 to RowHeight[i]−1, inclusive. If brick_split_flag[i] is equal to 0, the value of num_brick_rows_minus1[i] is inferred to be equal to 0. Otherwise, when uniform_brick_spacing_flag[i] is equal to 1, the value of num_brick_rows_minus1[i] is inferred as specified in the CTB raster scanning, tile scanning, and brick scanning process.

brick_row_height_minus1[i][j] plus 1 specifies the height of the j-th brick in the i-th tile in units of CTBs when uniform_tile_spacing_flag is equal to 0.

The following variables are derived, and, when uniform_tile_spacing_flag is equal to 1, the values of num_tile_columns_minus1 and num_tile_rows_minus1 are inferred, and, for each i ranging from 0 to NumTilesInPic−1, inclusive, when uniform_brick_spacing_flag[i] is equal to 1, the value of num_brick_rows_minus1[i] is inferred, by invoking the CTB raster scanning, tile scanning, and brick scanning process:

the list RowHeight[j] for j ranging from 0 to num_tile_rows_minus1, inclusive, specifying the height of the j-th tile row in units of CTBs, the list CtbAddrRsToBs[ctbAddrRs] for ctbAddrRs ranging from 0 to PicSizeInCtbsY−1, inclusive, specifying the conversion from a CTB address in the CTB raster scan of a picture to a CTB address in the brick scan, the list CtbAddrBsToRs[ctbAddrBs] for ctbAddrBs ranging from 0 to PicSizeInCtbsY−1, inclusive, specifying the conversion from a CTB address in the brick scan to a CTB address in the CTB raster scan of a picture, the list BrickId[ctbAddrBs] for ctbAddrBs ranging from 0 to PicSizeInCtbsY−1, inclusive, specifying the conversion from a CTB address in brick scan to a brick ID, the list NumCtusInBrick[brickIdx] for brickIdx ranging from 0 to NumBricksInPic−1, inclusive, specifying the conversion from a brick index to the number of CTUs in the brick, the list FirstCtbAddrBs[brickIdx] for brickIdx ranging from 0 to NumBricksInPic−1, inclusive, specifying the conversion from a brick ID to the CTB address in brick scan of the first CTB in the brick.

single_brick_per_slice_flag equal to 1 specifies that each slice that refers to this PPS includes one brick. single_brick_per_slice_flag equal to 0 specifies that a slice that refers to this PPS may include more than one brick. When not present, the value of single_brick_per_slice_flag is inferred to be equal to 1.

rect_slice_flag equal to 0 specifies that bricks within each slice are in raster scan order and the slice information is not signalled in PPS. rect_slice_flag equal to 1 specifies that bricks within each slice cover a rectangular region of the picture and the slice information is signalled in the PPS. When single_brick_per_slice_flag is equal to 1, rect_slice_flag is inferred to be equal to 1.

num_slices_in_pic_minus1 plus 1 specifies the number of slices in each picture referring to the PPS. The value of num_slices_in_pic_minus1 shall be in the range of 0 to NumBricksInPic−1, inclusive. When not present and single_brick_per_slice_flag is equal to 1, the value of num_slices_in_pic_minus1 is inferred to be equal to NumBricksInPic−1.

top_left_brick_idx[i] specifies the brick index of the brick located at the top-left corner of the i-th slice. The value of top_left_brick_idx[i] shall not be equal to the value of top_left_brick_idx[j] for any i not equal to j. When not present, the value of top_left_brick_idx[i] is inferred to be equal to i. The length of the top_left_brick_idx[i] syntax element is Ceil(Log 2(NumBricksInPic) bits.

bottom_right_brick_idx_delta[i] specifies the difference between the brick index of the brick located at the bottom-right corner of the i-th slice and top_left_brick_idx[i]. When single_brick_per_slice_flag is equal to 1, the value of bottom_right_brick_idx_delta[i] is inferred to be equal to 0. The length of the bottom_right_brick_idx_delta[i] syntax element is Ceil(Log 2(NumBricksInPic−top_left_brick_idx[i])) bits.

It is a requirement of bitstream conformance that a slice shall include either a number of complete tiles or only a consecutive sequence of complete bricks of one tile. The variable NumBricksInSlice[i] and BricksToSliceMap[j], which specify the number of bricks in the i-th slice and the mapping of bricks to slices, are derived as follows:

```
NumBricksInSlice[ i ] = 0
botRightBkIdx = top_left_brick_idx[ i ] +
bottom_right_brick_idx_delta[ i ]
for( j = 0; j < NumBricksInPic; j++) {
  if( BrickColBd[ j ] >= BrickColBd[ top_left_brick_idx[ i ] ] &&
      BrickColBd[ j ] <= BrickColBd[ botRightBkIdx ] &&
      BrickRowBd[ j ] >= BrickRowBd[ top_left_brick_idx[ i ] ] &&
      BrickRowBd[ j ] <= BrickColBd[ botRightBkIdx ] ) {
    NumBricksInSlice[ i ]++
    BricksToSliceMap[ j ] = i
  }
}
```

The decoder reconstructs the output video by applying prediction means similar to the encoder to form a predicted representation of the pixel blocks (using the motion or spatial information created by the encoder and stored in the compressed representation) and prediction error decoding (inverse operation of the prediction error coding recovering the quantized prediction error signal in spatial pixel domain). After applying prediction and prediction error decoding means the decoder sums up the prediction and prediction error signals (pixel values) to form the output video frame. The decoder (and encoder) can also apply additional filtering means to improve the quality of the output video before passing it for display and/or storing it as prediction reference for the forthcoming frames in the video sequence.

The filtering may for example include one more of the following: deblocking, sample adaptive offset (SAO), and/or adaptive loop filtering (ALF).

The deblocking loop filter may include multiple filtering modes or strengths, which may be adaptively selected based on the features of the blocks adjacent to the boundary, such as the quantization parameter value, and/or signaling included by the encoder in the bitstream. For example, the deblocking loop filter may comprise a normal filtering mode and a strong filtering mode, which may differ in terms of the number of filter taps (i.e. number of samples being filtered on both sides of the boundary) and/or the filter tap values. For example, filtering of two samples along both sides of the boundary may be performed with a filter having the impulse response of (3 7 9−3)/16, when omitting the potential impact of a clipping operation.

The motion information may be indicated with motion vectors associated with each motion compensated image block in video codecs. Each of these motion vectors represents the displacement of the image block in the picture to be coded (in the encoder side) or decoded (in the decoder side) and the prediction source block in one of the previously coded or decoded pictures. In order to represent motion vectors efficiently those may be coded differentially with respect to block specific predicted motion vectors. The predicted motion vectors may be created in a predefined way, for example calculating the median of the encoded or decoded motion vectors of the adjacent blocks. Another way to create motion vector predictions is to generate a list of candidate predictions from adjacent blocks and/or co-located blocks in temporal reference pictures and signaling the chosen candidate as the motion vector predictor. In addition to predicting the motion vector values, the reference index of previously coded/decoded picture can be predicted. The reference index may be predicted from adjacent blocks and/or co-located blocks in temporal reference picture. Moreover, high efficiency video codecs may employ an additional motion information coding/decoding mechanism, often called merging/merge mode, where all the motion field information, which includes motion vector and corresponding reference picture index for each available reference picture list, is predicted and used without any modification/correction. Similarly, predicting the motion field information is carried out using the motion field information of adjacent blocks and/or co-located blocks in temporal reference pictures and the used motion field information is signaled among a list of motion field candidate list filled with motion field information of available adjacent/co-located blocks.

Video codecs may support motion compensated prediction from one source image (uni-prediction) and two sources (bi-prediction). In the case of uni-prediction a single motion vector is applied whereas in the case of bi-prediction two motion vectors are signaled and the motion compensated predictions from two sources are averaged to create the final sample prediction. In the case of weighted prediction, the relative weights of the two predictions can be adjusted, or a signaled offset can be added to the prediction signal.

In addition to applying motion compensation for inter picture prediction, similar approach can be applied to intra picture prediction. In this case the displacement vector indicates where from the same picture a block of samples can be copied to form a prediction of the block to be coded or decoded. This kind of intra block copying methods can improve the coding efficiency substantially in presence of repeating structures within the frame—such as text or other graphics.

The prediction residual after motion compensation or intra prediction may be first transformed with a transform kernel (like DCT) and then coded. The reason for this is that often there still exists some correlation among the residual and transform can in many cases help reduce this correlation and provide more efficient coding.

Video encoders may utilize Lagrangian cost functions to find optimal coding modes, e.g. the desired Macroblock mode and associated motion vectors. This kind of cost function uses a weighting factor $\lambda$ to tie together the (exact or estimated) image distortion due to lossy coding methods and the (exact or estimated) amount of information that is required to represent the pixel values in an image area:

$$C = D + \lambda R \tag{Eq. 1}$$

where C is the Lagrangian cost to be minimized, D is the image distortion (e.g. Mean Squared Error) with the mode and motion vectors considered, and R the number of bits needed to represent the required data to reconstruct the image block in the decoder (including the amount of data to represent the candidate motion vectors).

Some codecs use a concept of picture order count (POC). A value of POC is derived for each picture and is non-decreasing with increasing picture position in output order. POC therefore indicates the output order of pictures. POC may be used in the decoding process for example for implicit scaling of motion vectors and for reference picture list initialization. Furthermore, POC may be used in the verification of output order conformance.

In video coding standards, a compliant bit stream must be able to be decoded by a hypothetical reference decoder that may be conceptually connected to the output of an encoder and consists of at least a pre-decoder buffer, a decoder and an output/display unit. This virtual decoder may be known as the hypothetical reference decoder (HRD) or the video buffering verifier (VBV). A stream is compliant if it can be decoded by the HRD without buffer overflow or, in some cases, underflow. Buffer overflow happens if more bits are to be placed into the buffer when it is full. Buffer underflow happens if some bits are not in the buffer when said bits are to be fetched from the buffer for decoding/playback. One of the motivations for the HRD is to avoid so-called evil bitstreams, which would consume such a large quantity of resources that practical decoder implementations would not be able to handle.

HRD models typically include instantaneous decoding, while the input bitrate to the coded picture buffer (CPB) of HRD may be regarded as a constraint for the encoder and the bitstream on decoding rate of coded data and a requirement for decoders for the processing rate. An encoder may include a CPB as specified in the HRD for verifying and controlling that buffering constraints are obeyed in the encoding. A decoder implementation may also have a CPB that may but does not necessarily operate similarly or identically to the CPB specified for HRD.

A Decoded Picture Buffer (DPB) may be used in the encoder and/or in the decoder. There may be two reasons to buffer decoded pictures, for references in inter prediction and for reordering decoded pictures into output order. Some coding formats, such as HEVC, provide a great deal of flexibility for both reference picture marking and output reordering, separate buffers for reference picture buffering and output picture buffering may waste memory resources. Hence, the DPB may include a unified decoded picture buffering process for reference pictures and output reordering. A decoded picture may be removed from the DPB when it is no longer used as a reference and is not needed for output. An HRD may also include a DPB. DPBs of an HRD and a decoder implementation may but do not need to operate identically.

Output order may be defined as the order in which the decoded pictures are output from the decoded picture buffer (for the decoded pictures that are to be output from the decoded picture buffer).

A decoder and/or an HRD may comprise a picture output process. The output process may be considered to be a process in which the decoder provides decoded and cropped pictures as the output of the decoding process. The output process is typically a part of video coding standards, typically as a part of the hypothetical reference decoder specification. In output cropping, lines and/or columns of samples may be removed from decoded pictures according to a cropping rectangle to form output pictures. A cropped decoded picture may be defined as the result of cropping a decoded picture based on the conformance cropping window specified e.g. in the sequence parameter set that is referred to by the corresponding coded picture.

One or more syntax structures for (decoded) reference picture marking may exist in a video coding system. An encoder generates an instance of a syntax structure e.g. in each coded picture, and a decoder decodes an instance of the syntax structure e.g. from each coded picture. For example, the decoding of the syntax structure may cause pictures to be adaptively marked as "used for reference" or "unused for reference".

A reference picture set (RPS) syntax structure of HEVC is an example of a syntax structure for reference picture marking. A reference picture set valid or active for a picture includes all the reference pictures that may be used as reference for the picture and all the reference pictures that are kept marked as "used for reference" for any subsequent pictures in decoding order. The reference pictures that are kept marked as "used for reference" for any subsequent pictures in decoding order but that are not used as reference picture for the current picture or image segment may be considered inactive. For example, they might not be included in the initial reference picture list(s).

In some coding formats and codecs, a distinction is made between so-called short-term and long-term reference pictures. This distinction may affect some decoding processes such as motion vector scaling. Syntax structure(s) for marking reference pictures may be indicative of marking a picture as "used for long-term reference" or "used for short-term reference".

In some coding formats, reference picture for inter prediction may be indicated with an index to a reference picture list. In some codecs, two reference picture lists (reference picture list 0 and reference picture list 1) are generated for each bi-predictive (B) slice, and one reference picture list (reference picture list 0) is formed for each inter-coded (P) slice.

A reference picture list, such as the reference picture list 0 and the reference picture list 1, may be constructed in two steps: First, an initial reference picture list is generated. The initial reference picture list may be generated using an algorithm pre-defined in a standard. Such an algorithm may use e.g. POC and/or temporal sub-layer, as the basis. The algorithm may process reference pictures with particular marking(s), such as "used for reference", and omit other reference pictures, i.e. avoid inserting other reference pictures into the initial reference picture list. An example of such other reference picture is a reference picture marked as "unused for reference" but still residing in the decoded picture buffer waiting to be output from the decoder. Second, the initial reference picture list may be reordered through a specific syntax structure, such as reference picture list reordering (RPLR) commands of H.264/AVC or reference picture list modification syntax structure of HEVC or anything alike. Furthermore, the number of active reference pictures may be indicated for each list, and the use of the pictures beyond the active ones in the list as reference for inter prediction is disabled. One or both the reference picture list initialization and reference picture list modification may process only active reference pictures among those reference pictures that are marked as "used for reference" or alike.

Scalable video coding refers to coding structure where one bitstream can contain multiple representations of the content at different bitrates, resolutions or frame rates. In these cases, the receiver can extract the desired representation depending on its characteristics (e.g. resolution that matches best the display device). Alternatively, a server or a network element can extract the portions of the bitstream to be transmitted to the receiver depending on e.g. the network characteristics or processing capabilities of the receiver. A scalable bitstream may include a "base layer" providing the lowest quality video available and one or more enhancement layers that enhance the video quality when received and decoded together with the lower layers. In order to improve coding efficiency for the enhancement layers, the coded representation of that layer may depend on the lower layers. E.g. the motion and mode information of the enhancement layer can be predicted from lower layers. Similarly, the pixel data of the lower layers can be used to create prediction for the enhancement layer.

A scalable video codec for quality scalability (also known as Signal-to-Noise or SNR) and/or spatial scalability may be implemented as follows. For a base layer, a conventional non-scalable video encoder and decoder is used. The reconstructed/decoded pictures of the base layer are included in the reference picture buffer for an enhancement layer. In H.264/AVC, HEVC, and similar codecs using reference picture list(s) for inter prediction, the base layer decoded pictures may be inserted into a reference picture list(s) for coding/decoding of an enhancement layer picture similarly to the decoded reference pictures of the enhancement layer. Consequently, the encoder may choose a base-layer reference picture as inter prediction reference and indicate its use e.g. with a reference picture index in the coded bitstream. The decoder decodes from the bitstream, for example from a reference picture index, that a base-layer picture is used as inter prediction reference for the enhancement layer. When a decoded base-layer picture is used as prediction reference for an enhancement layer, it is referred to as an inter-layer reference picture.

Scalability modes or scalability dimensions may include but are not limited to the following:

Quality scalability: Base layer pictures are coded at a lower quality than enhancement layer pictures, which may be achieved for example using a greater quantization parameter value (i.e., a greater quantization step size for transform coefficient quantization) in the base layer than in the enhancement layer.

Spatial scalability: Base layer pictures are coded at a lower resolution (i.e. have fewer samples) than enhancement layer pictures. Spatial scalability and quality scalability may sometimes be considered the same type of scalability.

Bit-depth scalability: Base layer pictures are coded at lower bit-depth (e.g. 8 bits) than enhancement layer pictures (e.g. 10 or 12 bits).

Dynamic range scalability: Scalable layers represent a different dynamic range and/or images obtained using a different tone mapping function and/or a different optical transfer function.

Chroma format scalability: Base layer pictures provide lower spatial resolution in chroma sample arrays (e.g. coded in 4:2:0 chroma format) than enhancement layer pictures (e.g. 4:4:4 format).

Color gamut scalability: enhancement layer pictures have a richer/broader color representation range than that of the base layer pictures—for example the enhancement layer may have UHDTV (ITU-R BT.2020) color gamut and the base layer may have the ITU-R BT.709 color gamut.

Region-of-interest (ROI) scalability: An enhancement layer represents of spatial subset of the base layer. ROI scalability may be used together with other types of scalability, e.g. quality or spatial scalability so that the enhancement layer provides higher subjective quality for the spatial subset.

View scalability, which may also be referred to as multiview coding. The base layer represents a first view, whereas an enhancement layer represents a second view.

Depth scalability, which may also be referred to as depth-enhanced coding. A layer or some layers of a bitstream may represent texture view(s), while other layer or layers may represent depth view(s).

In all of the above scalability cases, base layer information could be used to code enhancement layer to minimize the additional bitrate overhead.

Scalability can be enabled in two basic ways. Either by introducing new coding modes for performing prediction of pixel values or syntax from lower layers of the scalable representation or by placing the lower layer pictures to the reference picture buffer (decoded picture buffer, DPB) of the higher layer. The first approach is more flexible and thus can provide better coding efficiency in most cases. However, the second, reference frame-based scalability, approach can be implemented very efficiently with minimal changes to single layer codecs while still achieving majority of the coding efficiency gains available. Essentially a reference frame-based scalability codec can be implemented by utilizing the same hardware or software implementation for all the layers, just taking care of the DPB management by external means.

A sender, a gateway, or alike may select the transmitted layers and/or sub-layers of a scalable video bitstream, or likewise a receiver, a client, a player, or alike may request transmission of selected layers and/or sub-layers of a scalable video bitstream. Terms layer extraction, extraction of layers, or layer down-switching may refer to transmitting fewer layers than what is available in the bitstream. Layer up-switching may refer to transmitting additional layer(s) compared to those transmitted prior to the layer up-switching, i.e. restarting the transmission of one or more layers whose transmission was ceased earlier in layer down-switching. Similarly to layer down-switching and/or up-switching, down- and/or up-switching of temporal sub-layers may be performed. Both layer and sub-layer down-switching and/or up-switching may be performed similarly. Layer and sub-layer down-switching and/or up-switching may be carried out in the same access unit or alike (i.e. virtually simultaneously) or may be carried out in different access units or alike (i.e. virtually at distinct times). Layer up-switching may take place at a random-access picture (e.g. IRAP picture in HEVC). Sub-layer up-switching may take place at a picture of a particular type (e.g. STSA or TSA picture in HEVC).

An elementary unit for the output of encoders of some coding formats, such as HEVC, and the input of decoders of some coding formats, such as HEVC, is a Network Abstraction Layer (NAL) unit. For transport over packet-oriented networks or storage into structured files, NAL units may be encapsulated into packets or similar structures.

A bytestream format may be specified for NAL unit streams for transmission or storage environments that do not provide framing structures. The bytestream format separates NAL units from each other by attaching a start code in front of each NAL unit. To avoid false detection of NAL unit boundaries, encoders run a byte-oriented start code emulation prevention algorithm, which adds an emulation prevention byte to the NAL unit payload if a start code would have occurred otherwise. In order to enable straightforward gateway operation between packet- and stream-oriented systems, start code emulation prevention may always be performed regardless of whether the bytestream format is in use or not.

A NAL unit may be defined as a syntax structure containing an indication of the type of data to follow and bytes containing that data in the form of a raw byte sequence payload (RBSP) interspersed as necessary with emulation prevention bytes. A RBSP may be defined as a syntax structure containing an integer number of bytes that is encapsulated in a NAL unit. An RBSP is either empty or has the form of a string of data bits containing syntax elements followed by an RBSP stop bit and followed by zero or more subsequent bits equal to 0.

NAL units consist of a header and payload. In HEVC, a two-byte NAL unit header is used for all specified NAL unit types, while in other codecs NAL unit header may be similar to that in HEVC.

In HEVC, the NAL unit header contains one reserved bit, a six-bit NAL unit type indication, a three-bit temporal_id_plus1 indication for temporal level or sub-layer (may be required to be greater than or equal to 1) and a six-bit nuh_layer_id syntax element. The temporal_id_plus1 syntax element may be regarded as a temporal identifier for the NAL unit, and a zero-based TemporalId variable may be derived as follows: TemporalId=temporal_id_plus1−1. The abbreviation TID may be used to interchangeably with the TemporalId variable. TemporalId equal to 0 corresponds to the lowest temporal level. The value of temporal_id_plus1 is required to be non-zero in order to avoid start code emulation involving the two NAL unit header bytes. The bitstream created by excluding all VCL NAL units having a TemporalId greater than or equal to a selected value and including all other VCL NAL units remains conforming. Consequently, a picture having TemporalId equal to tid_value does not use any picture having a TemporalId greater than tid_value as inter prediction reference. A sub-layer or a temporal sub-layer may be defined to be a temporal scalable layer (or a temporal layer, TL) of a temporal scalable bitstream. Such temporal scalable layer may comprise VCL NAL units with a particular value of the TemporalId variable and the associated non-VCL NAL units. nuh_layer_id can be understood as a scalability layer identifier.

NAL units can be categorized into Video Coding Layer (VCL) NAL units and non-VCL NAL units. VCL NAL units are typically coded slice NAL units. In HEVC, VCL NAL units contain syntax elements representing one or more CU. In HEVC, the NAL unit type within a certain range indicates a VCL NAL unit, and the VCL NAL unit type indicates a picture type.

Images can be split into independently codable and decodable image segments (e.g. slices or tiles or tile groups). Such image segments may enable parallel processing, "Slices" in this description may refer to image segments constructed of certain number of basic coding units that are processed in default coding or decoding order, while "tiles" may refer to image segments that have been defined as rectangular image regions. A tile group may be defined as a group of one or more tiles. Image segments may be coded as separate units in the bitstream, such as VCL NAL units in H.264/AVC and HEVC. Coded image segments may comprise a header and a payload, wherein the header contains parameter values needed for decoding the payload.

An independently coded picture region may be defined as a picture region such that the decoding of the independently coded picture region does not depend on sample values outside the independently coded picture region or variables derived from other coded picture regions of the same coded picture. An independently coded picture region may be predicted from respective independently coded picture region in reference pictures but not from other coded picture regions in the reference pictures.

An independently coded picture region sequence may be defined as a sequence of respective independently coded picture regions. The respective independently coded picture regions may be indicated, e.g. using sub-picture sequence identifier or alike, or may be inferred e.g. of being the collocated image segments in a picture sequence.

In some contexts, the term independently coded picture region is used only when it is a part of an independently coded picture region sequence. For example, a rectangular slice may be decodable independently of other rectangular slices of the same picture, but if the rectangular slice uses sample values from areas outside the corresponding rectangular slice in a reference picture, the rectangular slice might not be regarded as an independently coded picture region.

The term constituent bitstream may be used for an independently coded picture region sequence. However, a constituent bitstream may also be used for other purposes; for example, a texture video bitstream and a depth video bitstream that are multiplexed into the same bitstream (e.g. as separate independent layers) may be regarded as constituent bitstreams.

The terms independently decodable picture region and independently coded picture region may be used interchangeably. There may be many methods to realize an independently coded picture region and/or an independently coded picture region sequence in encoding and/or decoding, and it needs to be understood that the embodiments are not limited to any single method but may be applied to any method. Some examples of independently coded picture regions and independently coded picture region sequences are described in the following paragraphs.

A motion-constrained tile set (MCTS) is an example realization of an independently coded picture region, and similarly an MCTS sequence is an example of an independently coded picture region sequence. A motion-constrained tile set (MCTS) is such that the inter prediction process is constrained in encoding such that no sample value outside the motion-constrained tile set, and no sample value at a fractional sample position that is derived using one or more sample values outside the motion-constrained tile set, is used for inter prediction of any sample within the motion-constrained tile set. Additionally, the encoding of an MCTS is constrained in a manner that neither variables nor any decoding results that are derived from blocks outside the MCTS are used in any decoding processes within the MCTS. For example, the encoding of an MCTS is constrained in a manner that motion vector candidates are not derived from blocks outside the MCTS. This may be enforced by turning off temporal motion vector prediction of HEVC, or by disallowing the encoder to use the TMVP candidate or any motion vector prediction candidate following the TMVP candidate in the merge or AMVP candidate list for PUs located directly left of the right tile boundary of the MCTS except the last one at the bottom right of the MCTS. In general, an MCTS may be defined to be a tile set that is independent of any sample values and coded data, such as motion vectors, that are outside the MCTS. An MCTS sequence may be defined as a sequence of respective MCTSs in one or more coded video sequences or alike. In some cases, an MCTS may be required to form a rectangular area. It should be understood that depending on the context, an MCTS may refer to the tile set within a picture or to the respective tile set in a sequence of pictures. The respective tile set may be, but in general need not be, collocated in the sequence of pictures. A motion-constrained tile set may be regarded as an independently coded tile set, since it may be decoded without the other tile sets.

It is appreciated that sample locations used in inter prediction may be saturated so that a location that would be outside the picture otherwise is saturated to point to the corresponding boundary sample of the picture. Hence, in some use cases, if a tile boundary is also a picture boundary, motion vectors may effectively cross that boundary or a motion vector may effectively cause fractional sample interpolation that would refer to a location outside that boundary, since the sample locations are saturated onto the boundary. In other use cases, specifically if a coded tile may be extracted from a bitstream where it is located on a position adjacent to a picture boundary to another bitstream where the tile is located on a position that is not adjacent to a picture boundary, encoders may constrain the motion vectors on picture boundaries similarly to any MCTS boundaries.

A rectangular slice whose boundaries are treated like picture boundaries is another example realization of an independently coded picture region. Treating slice boundaries like picture boundaries may include but might not be limited to one or more of the following:

In the derivation process for temporal luma motion vector prediction, motion vectors outside the slice boundaries in the reference picture(s) are considered unavailable. This may be realized e.g. by replacing the right and bottom picture boundary positions used in the process, with the right and the bottom boundary positions, respectively, of the slice, in units of luma samples.

In the luma and chroma sample interpolation process, sample values that would conventionally originate from sample locations outside the slice boundaries are replaced by samples values at the sample locations on the slice boundary. This may be realized e.g. by replacing the left, right, top, and bottom picture boundary positions used in the process with the left, right, top, and bottom boundary positions, respectively, of the slices, respectively.

A sub-picture as described later in this specification is another example realization of an independently coded picture region, and respectively a sub-picture sequence may be regarded as an example of an independently coded picture region sequence.

It needs to be understood that while examples and embodiments may be described with reference to particular terms, such as MCTS, they apply similarly to any type of independently coded picture region.

The temporal motion-constrained tile sets SEI (Supplemental Enhancement Information) message of HEVC can be used to indicate the presence of motion-constrained tile sets in the bitstream.

A non-VCL NAL unit may be for example one of the following types: a sequence parameter set, a picture parameter set, a supplemental enhancement information (SEI) NAL unit, an access unit delimiter, an end of sequence NAL unit, an end of bitstream NAL unit, or a filler data NAL unit. Parameter sets may be needed for the reconstruction of decoded pictures, whereas many of the other non-VCL NAL units are not necessary for the reconstruction of decoded sample values.

Some coding formats specify parameter sets that may carry parameter values needed for the decoding or reconstruction of decoded pictures. Parameters that remain unchanged through a coded video sequence may be included in a sequence parameter set (SPS). In addition to the parameters that may be needed by the decoding process, the sequence parameter set may optionally contain video usability information (VUI), which includes parameters that may be important for buffering, picture output timing, rendering, and resource reservation. A picture parameter set (PPS) contains such parameters that are likely to be unchanged in several coded pictures. A picture parameter set may include parameters that can be referred to by the coded image segments of one or more coded pictures. A header parameter set (HPS) has been proposed to contain such parameters that may change on picture basis.

A video parameter set (VPS) may be defined as a syntax structure containing syntax elements that apply to zero or more entire coded video sequences. VPS may provide information about the dependency relationships of the layers in a bitstream, as well as many other information that are applicable to all slices across all layers in the entire coded video sequence. In HEVC, VPS may be considered to comprise two parts, the base VPS and a VPS extension, where the VPS extension may be optionally present. A video parameter set RBSP may include parameters that can be referred to by one or more sequence parameter set RBSPs.

A parameter set may be activated when it is referenced e.g. through its identifier. For example, a header of an image segment, such as a slice header, may contain an identifier of the PPS that is activated for decoding the coded picture containing the image segment. A PPS may contain an identifier of the SPS that is activated, when the PPS is activated. An activation of a parameter set of a particular type may cause the deactivation of the previously active parameter set of the same type.

The relationship and hierarchy between VPS, SPS, and PPS may be described as follows. VPS resides one level above SPS in the parameter set hierarchy VPS may include parameters that are common for all image segments across all layers in the entire coded video sequence. SPS includes the parameters that are common for all image segments in a particular layer in the entire coded video sequence and may be shared by multiple layers. PPS includes the parameters that are common for all image segments in a coded picture and are likely to be shared by all image segments in multiple coded pictures.

Instead of or in addition to parameter sets at different hierarchy levels (e.g. sequence and picture), video coding formats may include header syntax structures, such as a sequence header or a picture header. A sequence header may precede any other data of the coded video sequence in the bitstream order. A picture header may precede any coded video data for the picture in the bitstream order.

The phrase along the bitstream (e.g. indicating along the bitstream) or along a coded unit of a bitstream (e.g. indicating along a coded tile) may be used in claims and described embodiments to refer to transmission, signaling, or storage in a manner that the "out-of-band" data is associated with but not included within the bitstream or the coded unit, respectively. The phrase decoding along the bitstream or along a coded unit of a bitstream or alike may refer to decoding the referred out-of-band data (which may be obtained from out-of-band transmission, signaling, or storage) that is associated with the bitstream or the coded unit, respectively. For example, the phrase along the bitstream may be used when the bitstream is contained in a container file, such as a file conforming to the ISO Base Media File Format, and certain file metadata is stored in the file in a manner that associates the metadata to the bitstream, such as boxes in the sample entry for a track containing the bitstream, a sample group for the track containing the bitstream, or a timed metadata track associated with the track containing the bitstream.

A coded picture is a coded representation of a picture.

A Random Access Point (RAP) picture, which may also be referred to as an intra random access point (IRAP) picture, may comprise only intra-coded image segments. Furthermore, a RAP picture may constrain subsequence pictures in output order to be such that they can be correctly decoded without performing the decoding process of any pictures that precede the RAP picture in decoding order.

An access unit may comprise coded video data for a single time instance and associated other data. In HEVC, an access unit (AU) may be defined as a set of NAL units that are associated with each other according to a specified classification rule, are consecutive in decoding order, and contain at most one picture with any specific value of nuh_layer_id. In addition to containing the VCL NAL units of the coded picture, an access unit may also contain non-VCL NAL units. Said specified classification rule may for example associate pictures with the same output time or picture output count value into the same access unit.

It may be required that coded pictures appear in certain order within an access unit. For example, a coded picture with nuh_layer_id equal to nuhLayerIdA may be required to precede, in decoding order, all coded pictures with nuh_layer_id greater than nuhLayerIdA in the same access unit.

A bitstream may be defined as a sequence of bits, which may in some coding formats or standards be in the form of a NAL unit stream or a byte stream, that forms the representation of coded pictures and associated data forming one or more coded video sequences. A first bitstream may be followed by a second bitstream in the same logical channel, such as in the same file or in the same connection of a communication protocol. An elementary stream (in the context of video coding) may be defined as a sequence of one or more bitstreams. In some coding formats or standards, the end of the first bitstream may be indicated by a specific NAL unit, which may be referred to as the end of bitstream (EOB) NAL unit and which is the last NAL unit of the bitstream.

A coded video sequence (CVS) may be defined as such a sequence of coded pictures in decoding order that is independently decodable and is followed by another coded video sequence or the end of the bitstream. A coded video sequence may additionally or alternatively be specified to end, when a specific NAL unit, which may be referred to as an end of sequence (EOS) NAL unit, appears in the bitstream. In HEVC, an EOS NAL unit with nuh_layer_id equal to 0 ends a coded video sequence.

Bitstreams or coded video sequences can be encoded to be temporally scalable as follows. Each picture may be assigned to a particular temporal sub-layer. Temporal sub-layers may be enumerated e.g. from 0 upwards. The lowest temporal sub-layer, sub-layer 0, may be decoded independently. Pictures at temporal sub-layer 1 may be predicted from reconstructed pictures at temporal sub-layers 0 and 1. Pictures at temporal sub-layer 2 may be predicted from reconstructed pictures at temporal sub-layers 0, 1, and 2, and so on. In other words, a picture at temporal sub-layer N does not use any picture at temporal sub-layer greater than N as a reference for inter prediction. The bitstream created by excluding all pictures greater than or equal to a selected sub-layer value and including pictures remains conforming.

A sub-layer access picture may be defined as a picture from which the decoding of a sub-layer can be started correctly, i.e. starting from which all pictures of the sub-layer can be correctly decoded. In HEVC there are two picture types, the temporal sub-layer access (TSA) and step-wise temporal sub-layer access (STSA) picture types, that can be used to indicate temporal sub-layer switching points. If temporal sub-layers with TemporalId up to N had been decoded until the TSA or STSA picture (exclusive) and the TSA or STSA picture has TemporalId equal to N+1, the TSA or STSA picture enables decoding of all subsequent pictures (in decoding order) having TemporalId equal to N+1. The TSA picture type may impose restrictions on the TSA picture itself and all pictures in the same sub-layer that follow the TSA picture in decoding order. None of these pictures is allowed to use inter prediction from any picture in the same sub-layer that precedes the TSA picture in decoding order. The TSA definition may further impose restrictions on the pictures in higher sub-layers that follow the TSA picture in decoding order. None of these pictures is allowed to refer a picture that precedes the TSA picture in decoding order if that picture belongs to the same or higher sub-layer as the TSA picture. TSA pictures have TemporalId greater than 0. The STSA is similar to the TSA picture but does not impose restrictions on the pictures in higher sub-layers that follow the STSA picture in decoding order and hence enable up-switching only onto the sub-layer where the STSA picture resides.

The following may be used to specify the parsing process of syntax elements.
  u(n): unsigned integer using n bits. When n is "v" in the syntax table, the number of bits varies in a manner dependent on the value of other syntax elements. The paring process for this descriptor is specified by n next bits from the bitstream interpreted as a binary representation of an unsigned integer with the most significant bit written first.
  ue(v): unsigned integer Exponential-Golomb-coded (a.k.a. exp-Golomb coded) syntax element with the left bit first.

An Exponential-Golomb bit string may be converted to a code number (codeNum) for example using the following table:

| Bit string | codeNum |
|---|---|
| 1 | 0 |
| 0 1 0 | 1 |
| 0 1 1 | 2 |
| 0 0 1 0 0 | 3 |
| 0 0 1 0 1 | 4 |
| 0 0 1 1 0 | 5 |
| 0 0 1 1 1 | 6 |
| 0 0 0 1 0 0 0 | 7 |
| 0 0 0 1 0 0 1 | 8 |
| 0 0 0 1 0 1 0 | 9 |
| . . . | . . . |

Available media file format standards include ISO base media file format (ISO/IEC 14496-12, which may be abbreviated ISOBMFF), MPEG-4 file format (ISO/IEC 14496-14, also known as the MP4 format), file format for NAL unit structured video (ISO/IEC 14496-15) and 3GPP file format (3GPP TS 26.244, also known as the 3GP format). The ISO file format is the base for derivation of all the above mentioned file formats (excluding the ISO file format itself). These file formats (including the ISO file format itself) are generally called the ISO family of file formats.

Some concepts, structures, and specifications of ISOBMFF are described below as an example of a container file format, based on which the embodiments may be implemented. The aspects of the invention are not limited to ISOBMFF, but rather the description is given for one possible basis on top of which the invention may be partly or fully realized.

A basic building block in the ISO base media file format is called a box. Each box has a header and a payload. The box header indicates the type of the box and the size of the box in terms of bytes. A box may enclose other boxes, and the ISO file format specifies which box types are allowed within a box of a certain type. Furthermore, the presence of some boxes may be mandatory in each file, while the presence of other boxes may be optional. Additionally, for some box types, it may be allowable to have more than one box present in a file. Thus, the ISO base media file format may be considered to specify a hierarchical structure of boxes.

According to the ISO family of file formats, a file includes media data and metadata that are encapsulated into boxes. Each box is identified by a four character code (4CC) and starts with a header which informs about the type and size of the box.

In files conforming to the ISO base media file format, the media data may be provided in a media data 'mdat' box and the movie 'moov' box may be used to enclose the metadata. In some cases, for a file to be operable, both of the 'mdat' and 'moov' boxes may be required to be present. The movie 'moov' box may include one or more tracks, and each track may reside in one corresponding TrackBox ('trak'). A track may be one of the many types, including a media track that refers to samples formatted according to a media compression format (and its encapsulation to the ISO base media file format). A track may be regarded as a logical channel.

Movie fragments may be used e.g. when recording content to ISO files e.g. in order to avoid losing data if a recording application crashes, runs out of memory space, or some other incident occurs. Without movie fragments, data loss may occur because the file format may require that all metadata, e.g., the movie box, be written in one contiguous area of the file. Furthermore, when recording a file, there may not be sufficient amount of memory space (e.g., random access memory RAM) to buffer a movie box for the size of the storage available, and re-computing the contents of a movie box when the movie is closed may be too slow. Moreover, movie fragments may enable simultaneous recording and playback of a file using a regular ISO file parser. Furthermore, a smaller duration of initial buffering may be required for progressive downloading, e.g., simultaneous reception and playback of a file when movie fragments are used and the initial movie box is smaller compared to a file with the same media content but structured without movie fragments.

The movie fragment feature may enable splitting the metadata that otherwise might reside in the movie box into multiple pieces. Each piece may correspond to a certain period of time of a track. In other words, the movie fragment feature may enable interleaving file metadata and media data. Consequently, the size of the movie box may be limited and the use cases mentioned above be realized.

In some examples, the media samples for the movie fragments may reside in an mdat box, if they are in the same file as the moov box. For the metadata of the movie fragments, however, a moof box may be provided. The moof box may include the information for a certain duration of playback time that would previously have been in the moov box. The moov box may still represent a valid movie on its own, but in addition, it may include an mvex box indicating that movie fragments will follow in the same file. The movie fragments may extend the presentation that is associated to the moov box in time.

Within the movie fragment there may be a set of track fragments, including anywhere from zero to a plurality per track. The track fragments may in turn include anywhere from zero to a plurality of track runs (a.k.a. track fragment runs), each of which document is a contiguous run of samples for that track. Within these structures, many fields are optional and can be defaulted. The metadata that may be included in the moof box may be limited to a subset of the metadata that may be included in a moov box and may be coded differently in some cases. Details regarding the boxes that can be included in a moof box may be found from the ISO base media file format specification. A self-contained movie fragment may be defined to consist of a moof box and an mdat box that are consecutive in the file order and where the mdat box contains the samples of the movie fragment (for which the moof box provides the metadata) and does not contain samples of any other movie fragment (i.e. any other moof box).

The track reference mechanism can be used to associate tracks with each other. The TrackReferenceBox includes box(es), each of which provides a reference from the containing track to a set of other tracks. These references are labeled through the box type (i.e. the four-character code of the box) of the contained box(es).

TrackGroupBox, which is contained in TrackBox, enables indication of groups of tracks where each group shares a particular characteristic or the tracks within a group have a particular relationship. The box contains zero or more boxes, and the particular characteristic or the relationship is indicated by the box type of the contained boxes. The contained boxes include an identifier, which can be used to conclude the tracks belonging to the same track group. The tracks that contain the same type of a contained box within the TrackGroupBox and have the same identifier value within these contained boxes belong to the same track group.

A uniform resource identifier (URI) may be defined as a string of characters used to identify a name of a resource. Such identification enables interaction with representations of the resource over a network, using specific protocols. A URI is defined through a scheme specifying a concrete syntax and associated protocol for the URI. The uniform resource locator (URL) and the uniform resource name (URN) are forms of URI. A URL may be defined as a URI that identifies a web resource and specifies the means of acting upon or obtaining the representation of the resource, specifying both its primary access mechanism and network location. A URN may be defined as a URI that identifies a resource by name in a particular namespace. A URN may be used for identifying a resource without implying its location or how to access it.

Recently, Hypertext Transfer Protocol (HTTP) has been widely used for the delivery of real-time multimedia content over the Internet, such as in video streaming applications. Unlike the use of the Real-time Transport Protocol (RTP) over the User Datagram Protocol (UDP), HTTP is easy to configure and is typically granted traversal of firewalls and network address translators (NAT), which makes it attractive for multimedia streaming applications.

Several commercial solutions for adaptive streaming over HTTP, such as Microsoft® Smooth Streaming, Apple® Adaptive HTTP Live Streaming and Adobe® Dynamic Streaming, have been launched as well as standardization projects have been carried out. Adaptive HTTP streaming (AHS) was first standardized in Release 9 of 3rd Generation Partnership Project (3GPP) packet-switched streaming (PSS) service (3GPP TS 26.234 Release 9: "Transparent end-to-end packet-switched streaming service (PSS); protocols and codecs"). MPEG took 3GPP AHS Release 9 as a starting point for the MPEG DASH standard (ISO/IEC 23009-1: "Dynamic adaptive streaming over HTTP (DASH)-Part 1: Media presentation description and segment formats," International Standard, 2nd Edition, 2014). 3GPP continued to work on adaptive HTTP streaming in communication with MPEG and published 3GP-DASH (Dynamic Adaptive Streaming over HTTP; 3GPP TS 26.247: "Transparent end-to-end packet-switched streaming Service (PSS); Progressive download and dynamic adaptive Streaming over HTTP (3GP-DASH)". MPEG DASH and 3GP-DASH are technically close to each other and may therefore be collectively referred to as DASH. Some concepts, formats, and operations of DASH are described below as an example of a video streaming system, wherein the embodiments may be implemented. The aspects of the invention are not limited to DASH, but rather the description is given for one possible basis on top of which the invention may be partly or fully realized.

In DASH, the multimedia content may be stored on an HTTP server and may be delivered using HTTP. The content may be stored on the server in two parts: Media Presentation Description (MPD), which describes a manifest of the available content, its various alternatives, their URL addresses, and other characteristics; and segments, which contain the actual multimedia bitstreams in the form of chunks, in a single file or multiple files. The MDP provides the necessary information for clients to establish a dynamic adaptive streaming over HTTP. The MPD contains information describing media presentation, such as an HTTP-uniform resource locator (URL) of each Segment to make GET Segment request. To play the content, the DASH client may obtain the MPD e.g. by using HTTP, email, thumb drive, broadcast, or other transport methods. By parsing the MPD, the DASH client may become aware of the program timing, media-content availability, media types, resolutions, minimum and maximum bandwidths, and the existence of various encoded alternatives of multimedia components, accessibility features and required digital rights management (DRM), media-component locations on the network, and other content characteristics. Using this information, the DASH client may select the appropriate encoded alternative and start streaming the content by fetching the segments using e.g. HTTP GET requests. After appropriate buffering to allow for network throughput variations, the client may continue fetching the subsequent segments and also monitor the network bandwidth fluctuations. The client may decide how to adapt to the available bandwidth by fetching segments of different alternatives (with lower or higher bitrates) to maintain an adequate buffer.

In DASH, hierarchical data model is used to structure media presentation as follows. A media presentation consists of a sequence of one or more Periods, each Period contains one or more Groups, each Group contains one or more Adaptation Sets, each Adaptation Sets contains one or more Representations, each Representation consists of one or more Segments. A Representation is one of the alternative choices of the media content or a subset thereof typically differing by the encoding choice, e.g. by bitrate, resolution, language, codec, etc. The Segment contains certain duration of media data, and metadata to decode and present the included media content. A Segment is identified by a URI and can typically be requested by a HTTP GET request. A Segment may be defined as a unit of data associated with an HTTP-URL and optionally a byte range that are specified by an MPD.

The DASH MPD complies with Extensible Markup Language (XML) and is therefore specified through elements and attributes as defined in XML.

In DASH, all descriptor elements are structured in the same way, namely they contain a @schemeIdUri attribute that provides a URI to identify the scheme and an optional attribute @value and an optional attribute @id. The semantics of the element are specific to the scheme employed. The URI identifying the scheme may be a URN or a URL.

In DASH, an independent representation may be defined as a representation that can be processed independently of any other representations. An independent representation may be understood to comprise an independent bitstream or an independent layer of a bitstream. A dependent representation may be defined as a representation for which Segments from its complementary representations are necessary for presentation and/or decoding of the contained media content components. A dependent representation may be understood to comprise e.g. a predicted layer of a scalable bitstream. A complementary representation may be defined as a representation which complements at least one dependent representation. A complementary representation may be an independent representation or a dependent representation. Dependent Representations may be described by a Representation element that contains a @dependencyId attribute. Dependent Representations can be regarded as regular Representations except that they depend on a set of complementary Representations for decoding and/or presentation. The @dependencyId contains the values of the @id attribute of all the complementary Representations, i.e. Representations that are necessary to present and/or decode the media content components contained in this dependent Representation.

Track references of ISOBMFF can be reflected in the list of four-character codes in the @associationType attribute of DASH MPD that is mapped to the list of Representation@id values given in the @associationId in a one to one manner. These attributes may be used for linking media Representations with metadata Representations.

A DASH service may be provided as on-demand service or live service. In the former, the MPD is a static and all Segments of a Media Presentation are already available when a content provider publishes an MPD. In the latter, however, the MPD may be static or dynamic depending on the Segment URLs construction method employed by a MPD and Segments are created continuously as the content is produced and published to DASH clients by a content provider. Segment URLs construction method may be either template-based Segment URLs construction method or the Segment list generation method. In the former, a DASH client is able to construct Segment URLs without updating an MPD before requesting a Segment. In the latter, a DASH client has to periodically download the updated MPDs to get Segment URLs. For live service, hence, the template-based Segment URLs construction method is superior to the Segment list generation method.

An Initialization Segment may be defined as a Segment containing metadata that is necessary to present the media streams encapsulated in Media Segments. In ISOBMFF based segment formats, an Initialization Segment may comprise the Movie Box ('moov') which might not include metadata for any samples, i.e. any metadata for samples is provided in 'moof' boxes.

A Media Segment contains certain duration of media data for playback at a normal speed, such duration is referred as Media Segment duration or Segment duration. The content producer or service provider may select the Segment duration according to the desired characteristics of the service. For example, a relatively short Segment duration may be used in a live service to achieve a short end-to-end latency. The reason is that Segment duration is typically a lower bound on the end-to-end latency perceived by a DASH client since a Segment is a discrete unit of generating media data for DASH. Content generation is typically done such a manner that a whole Segment of media data is made available for a server. Furthermore, many client implementations use a Segment as the unit for GET requests. Thus, in typical arrangements for live services a Segment can be requested by a DASH client only when the whole duration of Media Segment is available as well as encoded and encapsulated into a Segment. For on-demand service, different strategies of selecting Segment duration may be used.

A Segment may be further partitioned into Subsegments e.g. to enable downloading segments in multiple parts. Subsegments may be required to contain complete access units. Subsegments may be indexed by Segment Index box (a.k.a. SegmentIndexBox), which contains information to map presentation time range and byte range for each Subsegment. The Segment Index box may also describe subsegments and stream access points in the segment by signaling their durations and byte offsets. A DASH client may use the information obtained from Segment Index box(es) to make a HTTP GET request for a specific Subsegment using byte range HTTP request. If relatively long Segment duration is used, then Subsegments may be used to keep the size of HTTP responses reasonable and flexible for bitrate adaptation. The indexing information of a segment may be put in the single box at the beginning of that segment, or spread among many indexing boxes in the segment. Different methods of spreading are possible, such as hierarchical, daisy chain, and hybrid. This technique may avoid adding a large box at the beginning of the segment and therefore may prevent a possible initial download delay.

The notation (Sub)segment refers to either a Segment or a Subsegment. If Segment Index boxes are not present, the notation (Sub)segment refers to a Segment. If Segment Index boxes are present, the notation (Sub)segment may refer to a Segment or a Subsegment, e.g. depending on whether the client issues requests on Segment or Subsegment basis.

MPEG-DASH defines segment-container formats for both ISO Base Media File Format and MPEG-2 Transport Streams. Other specifications may specify segment formats based on other container formats. For example, a segment format based on Matroska container file format has been proposed.

DASH supports rate adaptation by dynamically requesting Media Segments from different Representations within an Adaptation Set to match varying network bandwidth. When a DASH client switches up/down Representation, coding dependencies within Representation have to be taken into account. A Representation switch may happen at a random access point (RAP), which is typically used in video coding techniques such as H.264/AVC. In DASH, a more general concept named Stream Access Point (SAP) is introduced to provide a codec-independent solution for accessing a Representation and switching between Representations. In DASH, a SAP is specified as a position in a Representation that enables playback of a media stream to be started using only the information contained in Representation data starting from that position onwards (preceded by initialising data in the Initialisation Segment, if any). Hence, Representation switching can be performed in SAP.

In DASH the automated selection between Representations in the same Adaptation Set have been performed based on the width and height (@width and @height); the frame rate (@frameRate); the bitrate (@bandwidth); indicated quality ordering between the Representations (@qualityRanking). The semantics of @qualityRanking are specified as follows: specifies a quality ranking of the Representation relative to other Representations in the same Adaptation Set. Lower values represent higher quality content. If not present, then no ranking is defined.

Several types of SAP have been specified, including the following. SAP Type 1 corresponds to what is known in some coding schemes as a "Closed GOP random access point" (in which all pictures, in decoding order, can be correctly decoded, resulting in a continuous time sequence of correctly decoded pictures with no gaps) and in addition the first picture in decoding order is also the first picture in presentation order. SAP Type 2 corresponds to what is known in some coding schemes as a "Closed GOP random access point" (in which all pictures, in decoding order, can be correctly decoded, resulting in a continuous time sequence of correctly decoded pictures with no gaps), for which the first picture in decoding order may not be the first picture in presentation order. SAP Type 3 corresponds to what is known in some coding schemes as an "Open GOP random access point", in which there may be some pictures in decoding order that cannot be correctly decoded and have presentation times less than intra-coded picture associated with the SAP.

In some video coding standards, such as MPEG-2, each intra picture has been a random access point in a coded sequence. The capability of flexible use of multiple reference pictures for inter prediction in some video coding standards, such as H.264/AVC and H.265/HEVC, has a consequence that an intra picture may not be sufficient for random access. Therefore, pictures may be marked with respect to their random access point functionality rather than inferring such functionality from the coding type; for example an IDR picture as specified in the H.264/AVC standard can be used as a random access point. A closed group of pictures (GOP) is such a group of pictures in which all pictures can be correctly decoded. For example, in H.264/AVC, a closed GOP may start from an IDR access unit.

An open group of pictures (GOP) is such a group of pictures in which pictures preceding the initial intra picture in output order may not be correctly decodable but pictures following the initial intra picture in output order are correctly decodable. Such an initial intra picture may be indicated in the bitstream and/or concluded from the indications from the bitstream, e.g. by using the CRA NAL unit type in HEVC. The pictures preceding the initial intra picture starting an open GOP in output order and following the initial intra picture in decoding order may be referred to as leading pictures. There are two types of leading pictures: decodable and non-decodable. Decodable leading pictures, such as RADL pictures of HEVC, are such that can be correctly decoded when the decoding is started from the initial intra picture starting the open GOP. In other words, decodable leading pictures use only the initial intra picture or subsequent pictures in decoding order as reference in inter prediction. Non-decodable leading pictures, such as RASL pictures of HEVC, are such that cannot be correctly decoded when the decoding is started from the initial intra picture starting the open GOP.

A DASH Preselection defines a subset of media components of an MPD that are expected to be consumed jointly by a single decoder instance, wherein consuming may comprise decoding and rendering. The Adaptation Set that contains the main media component for a Preselection is referred to as main Adaptation Set. In addition, each Preselection may include one or multiple partial Adaptation Sets. Partial Adaptation Sets may need to be processed in combination with the main Adaptation Set. A main Adaptation Set and partial Adaptation Sets may be indicated by one of the two means: a preselection descriptor or a Preselection element.

Virtual reality is a rapidly developing area of technology in which image or video content, sometimes accompanied by audio, is provided to a user device such as a user headset (a.k.a. head-mounted display). As is known, the user device may be provided with a live or stored feed from a content source, the feed representing a virtual space for immersive output through the user device. Currently, many virtual reality user devices use so-called three degrees of freedom (3DoF), which means that the head movement in the yaw, pitch and roll axes are measured and determine what the user sees, i.e. to determine the viewport. It is known that rendering by taking the position of the user device and changes of the position into account can enhance the immersive experience. Thus, an enhancement to 3DoF is a six degrees-of-freedom (6DoF) virtual reality system, where the user may freely move in Euclidean space as well as rotate their head in the yaw, pitch and roll axes. Six degrees-of-freedom virtual reality systems enable the provision and consumption of volumetric content. Volumetric content comprises data representing spaces and/or objects in three-dimensions from all angles, enabling the user to move fully around the space and/or objects to view them from any angle. Such content may be defined by data describing the geometry (e.g. shape, size, position in a three-dimensional space) and attributes such as colour, opacity and reflectance. The data may also define temporal changes in the geometry and attributes at given time instances, similar to frames in two-dimensional video.

Terms 360-degree video or virtual reality (VR) video may sometimes be used interchangeably. They may generally refer to video content that provides such a large field of view (FOV) that only a part of the video is displayed at a single point of time in displaying arrangements. For example, VR video may be viewed on a head-mounted display (HMD) that may be capable of displaying e.g. about 100-degree field of view. The spatial subset of the VR video content to be displayed may be selected based on the orientation of the HMD. In another example, a flat-panel viewing environment is assumed, wherein e.g. up to 40-degree field-of-view may be displayed. When displaying wide-FOV content (e.g. fisheye) on such a display, it may be preferred to display a spatial subset rather than the entire picture.

MPEG Omnidirectional Media Format (ISO/IEC 23090-2) is a virtual reality (VR) system standard. OMAF defines a media format (comprising both file format derived from ISOBMFF and streaming formats for DASH and MPEG Media Transport). OMAF version 1 supports 360° video, images, and audio, as well as the associated timed text and facilitates three degrees of freedom (3DoF) content consumption, meaning that a viewport can be selected with any azimuth and elevation range and tilt angle that are covered by the omnidirectional content but the content is not adapted to any translational changes of the viewing position. The viewport-dependent streaming scenarios described further below have also been designed for 3DoF although could potentially be adapted to a different number of degrees of freedom.

OMAF is discussed with reference to FIG. 1. A real-world audio-visual scene (A) may be captured 220 by audio sensors as well as a set of cameras or a camera device with multiple lenses and sensors. The acquisition results in a set of digital image/video (Bi) and audio (Ba) signals. The cameras/lenses may cover all directions around the center point of the camera set or camera device, thus the name of 360-degree video.

Audio can be captured using many different microphone configurations and stored as several different content formats, including channel-based signals, static or dynamic (i.e. moving through the 3D scene) object signals, and scene-based signals (e.g., Higher Order Ambisonics). The channel-based signals may conform to one of the loudspeaker layouts defined in CICP (Coding-Independent Code-Points). In an omnidirectional media application, the loudspeaker layout signals of the rendered immersive audio program may be binaraulized for presentation via headphones.

The images (Bi) of the same time instance are stitched, projected, and mapped 221 onto a packed picture (D).

For monoscopic 360-degree video, the input images of one time instance may be stitched to generate a projected picture representing one view. An example of image stitching, projection, and region-wise packing process for monoscopic content is illustrated with FIG. 3. Input images (Bi) are stitched and projected 202 onto a three-dimensional projection structure that may for example be a unit sphere. The projection structure may be considered to comprise one or more surfaces, such as plane(s) or part(s) thereof. A projection structure may be defined as three-dimensional structure consisting of one or more surface(s) on which the captured VR image/video content is projected, and from which a respective projected picture can be formed. The image data on the projection structure is further arranged onto a two-dimensional projected picture (CL for left eye, CR for right eye) 203. The term projection may be defined as a process by which a set of input images are projected onto a projected picture. There may be a pre-defined set of representation formats of the projected picture, including for example an equirectangular projection (ERP) format and a cube map projection (CMP) format. It may be considered that the projected picture covers the entire sphere.

Optionally, a region-wise packing 204 is then applied to map the projected picture 203 (C) onto a packed picture 205 (D). If the region-wise packing is not applied, the packed picture is identical to the projected picture, and this picture is given as input to image/video encoding 206. Otherwise, regions of the projected picture (C) are mapped onto a packed picture (D) by indicating the location, shape, and size of each region in the packed picture, and the packed picture (D) is given as input to image/video encoding. The term region-wise packing may be defined as a process by which a projected picture is mapped to a packed picture. The term packed picture may be defined as a picture that results from region-wise packing of a projected picture.

In the case of stereoscopic 360-degree video, the input images of one time instance are stitched to generate a projected picture representing two views (CL, CR), one for each eye. Both views (CL, CR) can be mapped onto the same packed picture (D), and encoded by a traditional 2D video encoder. Alternatively, each view of the projected picture can be mapped to its own packed picture, in which case the image stitching, projection, and region-wise packing is performed as illustrated in FIG. 2. A sequence of packed pictures of either the left view or the right view can be independently coded or, when using a multiview video encoder, predicted from the other view.

The image stitching, projection, and region-wise packing process can be carried out multiple times for the same source images to create different versions of the same content, e.g. for different orientations of the projection structure. Similarly, the region-wise packing process can be performed multiple times from the same projected picture to create more than one sequence of packed pictures to be encoded.

Figure 4:
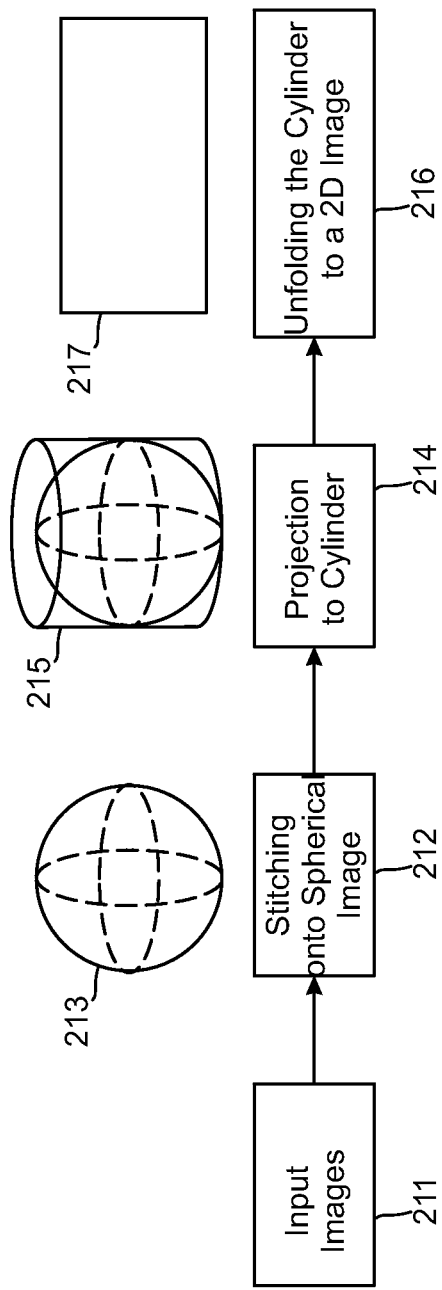
FIG. 4 shows an example of a process of forming a monoscopic equirectangular panorama picture.

360-degree panoramic content (i.e., images and video) cover horizontally the full 360-degree field-of-view around the capturing position of an imaging device. The vertical field-of-view may vary and can be e.g. 180 degrees. Panoramic image covering 360-degree field-of-view horizontally and 180-degree field-of-view vertically can be represented by a sphere that has been mapped to a two-dimensional image plane using equirectangular projection (ERP). In this case, the horizontal coordinate may be considered equivalent to a longitude, and the vertical coordinate may be considered equivalent to a latitude, with no transformation or scaling applied. The process of forming a monoscopic equirectangular panorama picture is illustrated in FIG. 4. A set of input images 211, such as fisheye images of a camera array or a camera device with multiple lenses and sensors, is stitched 212 onto a spherical image 213. The spherical image is further projected 214 onto a cylinder 215 (without the top and bottom faces). The cylinder is unfolded 216 to form a two-dimensional projected picture 217. In practice one or more of the presented steps may be merged; for example, the input images may be directly projected onto a cylinder without an intermediate projection onto a sphere. The projection structure for equirectangular panorama may be considered to be a cylinder that comprises a single surface.

In general, 360-degree content can be mapped onto different types of solid geometrical structures, such as polyhedron (i.e. a three-dimensional solid object containing flat polygonal faces, straight edges and sharp corners or vertices, e.g., a cube or a pyramid), cylinder (by projecting a spherical image onto the cylinder, as described above with the equirectangular projection), cylinder (directly without projecting onto a sphere first), cone, etc. and then unwrapped to a two-dimensional image plane.

In some cases panoramic content with 360-degree horizontal field-of-view but with less than 180-degree vertical field-of-view may be considered special cases of equirectangular projection, where the polar areas of the sphere have not been mapped onto the two-dimensional image plane. In some cases a panoramic image may have less than 360-degree horizontal field-of-view and up to 180-degree vertical field-of-view, while otherwise has the characteristics of equirectangular projection format.

Region-wise packing information may be encoded as metadata in or along the bitstream. For example, the packing information may comprise a region-wise mapping from a pre-defined or indicated source format to the packed picture format, e.g. from a projected picture to a packed picture, as described earlier.

Rectangular region-wise packing metadata may be described as follows:

For each region, the metadata defines a rectangle in a projected picture, the respective rectangle in the packed picture, and an optional transformation of rotation by 90, 180, or 270 degrees and/or horizontal and/or vertical mirroring. Rectangles may, for example, be indicated by the locations of the top-left corner and the bottom-right corner. The mapping may comprise resampling. As the sizes of the respective rectangles can differ in the projected and packed pictures, the mechanism infers region-wise resampling.

Among other things, region-wise packing provides signalling for the following usage scenarios:
1) Additional compression for viewport-independent projections is achieved by densifying sampling of different regions to achieve more uniformity across the sphere. For example, the top and bottom parts of ERP are oversampled, and region-wise packing can be applied to down-sample them horizontally.
2) Arranging the faces of plane-based projection formats, such as cube map projection, in an adaptive manner
3) Generating viewport-dependent bitstreams that use viewport-independent projection formats. For example, regions of ERP or faces of CMP can have different sampling densities and the underlying projection structure can have different orientations.
4) Indicating regions of the packed pictures represented by an extractor track. This is needed when an extractor track collects tiles from bitstreams of different resolutions.

A guard band may be defined as an area in a packed picture that is not rendered but may be used to improve the rendered part of the packed picture to avoid or mitigate visual artifacts such as seams.

Referring again to FIG. 1, the OMAF allows the omission of image stitching, projection, and region-wise packing and encode the image/video data in their captured format. In this case, images (D) are considered the same as images (Bi) and a limited number of fisheye images per time instance are encoded.

For audio, the stitching process is not needed, since the captured signals are inherently immersive and omnidirectional.

The stitched images (D) are encoded 206 as coded images (Ei) or a coded video bitstream (Ev). The captured audio (Ba) is encoded 222 as an audio bitstream (Ea). The coded images, video, and/or audio are then composed 224 into a media file for file playback (F) or a sequence of an initialization segment and media segments for streaming (Fs), according to a particular media container file format. In this specification, the media container file format is the ISO base media file format. The file encapsulator 224 also includes metadata into the file or the segments, such as projection and region-wise packing information assisting in rendering the decoded packed pictures.

The metadata in the file may include:
the projection format of the projected picture,
fisheye video parameters,
the area of the spherical surface covered by the packed picture,
the orientation of the projection structure corresponding to the projected picture relative to the global coordinate axes,
region-wise packing information, and
region-wise quality ranking (optional).

Region-wise packing information may be encoded as metadata in or along the bitstream, for example as region-wise packing SEI message(s) and/or as region-wise packing boxes in a file containing the bitstream. For example, the packing information may comprise a region-wise mapping from a pre-defined or indicated source format to the packed picture format, e.g. from a projected picture to a packed picture, as described earlier. The region-wise mapping information may for example comprise for each mapped region a source rectangle (a.k.a. projected region) in the projected picture and a destination rectangle (a.k.a. packed region) in the packed picture, where samples within the source rectangle are mapped to the destination rectangle and rectangles may for example be indicated by the locations of the top-left corner and the bottom-right corner. The mapping may comprise resampling. Additionally or alternatively, the packing information may comprise one or more of the following: the orientation of the three-dimensional projection structure relative to a coordinate system, indication which projection format is used, region-wise quality ranking indicating the picture quality ranking between regions and/or first and second spatial region sequences, one or more transformation operations, such as rotation by 90, 180, or 270 degrees, horizontal mirroring, and vertical mirroring. The semantics of packing information may be specified in a manner that they are indicative for each sample location within packed regions of a decoded picture which is the respective spherical coordinate location.

The segments (Fs) may be delivered 225 using a delivery mechanism to a player.

The file that the file encapsulator outputs (F) is identical to the file that the file decapsulator inputs (F'). A file decapsulator 226 processes the file (F') or the received segments (F's) and extracts the coded bitstreams (E'a, E'v, and/or E'i) and parses the metadata. The audio, video, and/or images are then decoded 228 into decoded signals (B'a for audio, and D' for images/video). The decoded packed pictures (D') are projected 229 onto the screen of a head-mounted display or any other display device 230 based on the current viewing orientation or viewport and the projection, spherical coverage, projection structure orientation, and region-wise packing metadata parsed from the file. Likewise, decoded audio (B'a) is rendered 229, e.g. through headphones 231, according to the current viewing orientation. The current viewing orientation is determined by the head tracking and possibly also eye tracking functionality 227. Besides being used by the renderer 229 to render the appropriate part of decoded video and audio signals, the current viewing orientation may also be used the video and audio decoders 228 for decoding optimization.

The process described above is applicable to both live and on-demand use cases.

At any point of time, a video rendered by an application on a HMD or on another display device renders a portion of the 360-degree video. This portion may be defined as a viewport. A viewport may be understood as a window on the 360-degree world represented in the omnidirectional video displayed via a rendering display. According to another definition, a viewport may be defined as a part of the spherical video that is currently displayed. A viewport may be characterized by horizontal and vertical field of views (FOV or FoV).

A viewpoint may be defined as the point or space from which the user views the scene; it usually corresponds to a camera position. Slight head motion does not imply a different viewpoint. A viewing position may be defined as the position within a viewing space from which the user views the scene. A viewing space may be defined as a 3D space of viewing positions within which rendering of image and video is enabled and VR experience is valid.

Typical representation formats for volumetric content include triangle meshes, point clouds and voxels. Temporal information about the content may comprise individual capture instances, i.e. frames or the position of objects as a function of time.

Advances in computational resources and in three-dimensional acquisition devices enable reconstruction of highly-detailed volumetric representations. Infrared, laser, time-of-flight and structured light technologies are examples of how such content may be constructed. The representation of volumetric content may depend on how the data is to be used. For example, dense voxel arrays may be used to represent volumetric medical images. In three-dimensional graphics, polygon meshes are extensively used. Point clouds, on the other hand, are well suited to applications such as capturing real-world scenes where the topology of the scene is not necessarily a two-dimensional surface or manifold. Another method is to code three-dimensional data to a set of texture and depth maps. Closely related to this is the use of elevation and multi-level surface maps. For the avoidance of doubt, embodiments herein are applicable to any of the above technologies.

"Voxel" of a three-dimensional world corresponds to a pixel of a two-dimensional world. Voxels exist in a three-dimensional grid layout. An octree is a tree data structure used to partition a three-dimensional space. Octrees are the three-dimensional analog of quadtrees. A sparse voxel octree (SVO) describes a volume of a space containing a set of solid voxels of varying sizes. Empty areas within the volume are absent from the tree, which is why it is called "sparse".

A three-dimensional volumetric representation of a scene may be determined as a plurality of voxels on the basis of input streams of at least one multicamera device. Thus, at least one but preferably a plurality (i.e. 2, 3, 4, 5 or more) of multicamera devices may be used to capture 3D video representation of a scene. The multicamera devices are distributed in different locations in respect to the scene, and therefore each multicamera device captures a different 3D video representation of the scene. The 3D video representations captured by each multicamera device may be used as input streams for creating a 3D volumetric representation of the scene, said 3D volumetric representation comprising a plurality of voxels. Voxels may be formed from the captured 3D points e.g. by merging the 3D points into voxels comprising a plurality of 3D points such that for a selected 3D point, all neighbouring 3D points within a predefined threshold from the selected 3D point are merged into a voxel without exceeding a maximum number of 3D points in a voxel.

Voxels may also be formed through the construction of the sparse voxel octree. Each leaf of such a tree represents a solid voxel in world space; the root node of the tree represents the bounds of the world. The sparse voxel octree construction may have the following steps: 1) map each input depth map to a world space point cloud, where each pixel of the depth map is mapped to one or more 3D points; 2) determine voxel attributes such as colour and surface normal vector by examining the neighbourhood of the source pixel(s) in the camera images and the depth map; 3) determine the size of the voxel based on the depth value from the depth map and the resolution of the depth map; 4) determine the SVO level for the solid voxel as a function of its size relative to the world bounds; 5) determine the voxel coordinates on that level relative to the world bounds; 6) create new and/or traversing existing SVO nodes until arriving at the determined voxel coordinates; 7) insert the solid voxel as a leaf of the tree, possibly replacing or merging attributes from a previously existing voxel at those coordinates. Nevertheless, the size of voxel within the 3D volumetric representation of the scene may differ from each other. The voxels of the 3D volumetric representation thus represent the spatial locations within the scene.

A volumetric video frame may be regarded as a complete sparse voxel octree that models the world at a specific point in time in a video sequence. Voxel attributes contain information like colour, opacity, surface normal vectors, and surface material properties. These are referenced in the sparse voxel octrees (e.g. colour of a solid voxel), but can also be stored separately.

Point clouds are commonly used data structures for storing volumetric content. Compared to point clouds, sparse voxel octrees describe a recursive subdivision of a finite volume with solid voxels of varying sizes, while point clouds describe an unorganized set of separate points limited only by the precision of the used coordinate values.

In technologies such as dense point clouds and voxel arrays, there may be tens or even hundreds of millions of points. In order to store and transport such content between entities, such as between a server and a client over an IP network, compression is usually required.

User's position can be detected relative to content provided within the volumetric virtual reality content, e.g. so that the user can move freely within a given virtual reality space, around individual objects or groups of objects, and can view the objects from different angles depending on the movement (e.g. rotation and location) of their head in the real world. In some examples, the user may also view and explore a plurality of different virtual reality spaces and move from one virtual reality space to another one.

The angular extent of the environment observable or hearable through a rendering arrangement, such as with a head-mounted display, may be called the visual field of view (FOV). The actual FOV observed or heard by a user depends on the inter-pupillary distance and on the distance between the lenses of the virtual reality headset and the user's eyes, but the FOV can be considered to be approximately the same for all users of a given display device when the virtual reality headset is being worn by the user.

When viewing volumetric content from a single viewing position, a portion (often half) of the content may not be seen because it is facing away from the user. This portion is sometimes called "back facing content".

A volumetric image/video delivery system may comprise providing a plurality of patches representing part of a volumetric scene, and providing, for each patch, patch visibility information indicative of a set of directions from which a forward surface of the patch is visible. A volumetric image/video delivery system may further comprise providing one or more viewing positions associated with a client device, and processing one or more of the patches dependent on whether the patch visibility information indicates that the forward surface of the one or more patches is visible from the one or more viewing positions.

Patch visibility information is data indicative of where in the volumetric space the forward surface of the patch can be seen. For example, patch visibility information may comprise a visibility cone, which may comprise a visibility cone direction vector (X, Y, Z) and an opening angle (A). The opening angle (A) defines a set of spatial angles from which the forward surface of the patch can be seen. In another example, the patch visibility metadata may comprise a definition of a bounding sphere surface and sphere region metadata, identical or similar to that specified by the omnidirectional media format (OMAF) standard (ISO/IEC 23090-2). The bounding sphere surface may for example be defined by a three-dimensional location of the centre of the sphere, and the radius of the sphere. When the viewing position collocates with the bounding sphere surface, the patch may be considered visible within the indicated sphere region. In general, the geometry of the bounding surface may also be something other than a sphere, such as cylinder, cube, or cuboid. Multiple sets of patch visibility metadata may be defined for the same three-dimensional location of the centre of the bounding surface, but with different radii (or information indicative of the distance of the bounding surface from the three-dimensional location). Indicating several pieces of patch visibility metadata may be beneficial to handle occlusions.

A volumetric image/video delivery system may comprise one or more patch culling modules. One patch culling module may be configured to determine which patches are transmitted to a user device, for example the rendering module of the headset. Another patch culling module may be configured to determine which patches are decoded. A third patch culling module may be configured to determine which decoded patches are passed to rendering. Any combination of patch culling modules may be present or active in a volumetric image/video delivery or playback system. Patch culling may utilize the patch visibility information of patches, the current viewing position, the current viewing orientation, the expected future viewing positions, and/or the expected future viewing orientations.

In some cases, each volumetric patch may be projected to a two-dimensional colour (or other form of texture) image and to a corresponding depth image, also known as a depth map. This conversion enables each patch to be converted back to volumetric form at a client rendering module of the headset using both images.

In some cases, a source volume of a volumetric image, such as a point cloud frame, may be projected onto one or more projection surfaces. Patches on the projection surfaces may be determined, and those patches may be arranged onto one or more two-dimensional frames. As above, texture and depth patches may be formed similarly. shows a projection of a source volume to a projection surface, and inpainting of a sparse projection. In other words, a three-dimensional (3D) scene model, comprising geometry primitives such as mesh elements, points, and/or voxel, is projected onto one or more projection surfaces. These projection surface geometries may be "unfolded" onto 2D planes (typically two planes per projected source volume: one for texture, one for depth). The "unfolding" may include determination of patches. 2D planes may then be encoded using standard 2D image or video compression technologies. Relevant projection geometry information may be transmitted alongside the encoded video files to the decoder. The decoder may then decode the coded image/video sequence and perform the inverse projection to regenerate the 3D scene model object in any desired representation format, which may be different from the starting format e.g. reconstructing a point cloud from original mesh model data.

In some cases, multiple points of volumetric video or image (e.g. point cloud) are projected to the same pixel position. Such cases may be handled by creating more than one "layer". It is remarked that the concept of layer in volumetric video, such as point cloud compression, may differ from the concept of layer in scalable video coding. Thus, terms such as PCC layer or volumetric video layer may be used to make a distinction from a layer of scalable video coding. Each volumetric (3D) patch may be projected onto more than one 2D patch, representing different layers of visual data, such as points, projected onto the same 2D positions. The patches may be organized for example based on ascending distance to the projection plane. More precisely the following example process may be used to create two layers but could be generalized to other number of layers too: Let H(u,v) be the set of points of the current patch that get projected to the same pixel (u, v). The first layer, also called the near layer, stores the point of H(u,v) with the lowest depth D0. The second layer, referred to as the far layer, captures the point of H(u,v) with the highest depth within the interval [D0, D0+d], where d is a user-defined parameter that describes the surface thickness.

It should be understood that volumetric image/video can comprise, additionally or alternatively to texture and depth, other types of patches, such as reflectance, opacity or transparency (e.g. alpha channel patches), surface normal, albedo, and/or other material or surface attribute patches.

Two-dimensional form of patches may be packed into one or more atlases. Texture atlases are known in the art, comprising an image consisting of sub-images, the image being treated as a single unit by graphics hardware and which can be compressed and transmitted as a single image for subsequent identification and decompression. Geometry atlases may be constructed similarly to texture atlases. Texture and geometry atlases may be treated as separate pictures (and as separate picture sequences in case of volumetric video), or texture and geometry atlases may be packed onto the same frame, e.g. similarly to how frame packing is conventionally performed. Atlases may be encoded as frames with an image or video encoder.

The sub-image layout in an atlas may also be organized such that it is possible to encode a patch or a set of patches having similar visibility information into spatiotemporal units that can be decoded independently of other spatiotemporal units. For example, a tile grid, as understood in the context of High Efficiency Video Coding (HEVC), may be selected for encoding and an atlas may be organized in a manner such that a patch or a group of patches having similar visibility information can be encoded as a motion-constrained tile set (MCTS).

In some cases, one or more (but not the entire set of) spatiotemporal units may be provided and stored as a track, as is understood in the context of the ISO base media file format, or as any similar container file format structure. Such a track may be referred to as a patch track. Patch tracks may for example be sub-picture tracks, as understood in the context of OMAF, or tile tracks, as understood in the context of ISO/IEC 14496-15.

In some cases, several versions of the one or more atlases are encoded. Different versions may include, but are not limited to, one or more of the following: different bitrate versions of the one or more atlases at the same resolution; different spatial resolutions of the atlases; and different versions for different random access intervals; these may include one or more intra-coded atlases (where every picture can be randomly accessed).

In some cases, combinations of patches from different versions of the texture atlas may be prescribed and described as metadata, such as extractor tracks, as will be understood in the context of OMAF and/or ISO/IEC 14496-15.

When the total sample count of a texture atlas and, in some cases, of the respective geometry pictures and/or other auxiliary pictures (if any) exceeds a limit, such as a level limit of a video codec, a prescription may be authored in a manner so that the limit is obeyed. For example, patches may be selected from a lower-resolution texture atlas according to subjective importance. The selection may be performed in a manner that is not related to the viewing position. The prescription may be accompanied by metadata characterizing the obeyed limit(s), e.g. the codec Level that is obeyed.

A prescription may be made specific to a visibility cone (or generally to a specific visibility) and hence excludes the patches not visible in the visibility cone. The selection of visibility cones for which the prescriptions are generated may be limited to a reasonable number, such that switching from one prescription to another is not expected to occur frequently. The visibility cones of prescriptions may overlap to avoid switching back and forth between two prescriptions. The prescription may be accompanied by metadata indicative of the visibility cone (or generally visibility information).

A prescription may use a specific grid or pattern of independent spatiotemporal units. For example, a prescription may use a certain tile grid, wherein tile boundaries are also MCTS boundaries. The prescription may be accompanied by metadata indicating potential sources (e.g. track groups, tracks, or representations) that are suitable as spatiotemporal units.

In some cases, a patch track forms a Representation in the context of DASH. Consequently, the Representation element in DASH MPD may provide metadata on the patch, such as patch visibility metadata, related to the patch track. Clients may select patch Representations and request (Sub) segments from the selected Representations on the basis of patch visibility metadata.

A collector track may be defined as a track that extracts implicitly or explicitly coded video data, such as coded video data of MCTSs or sub-pictures, from other tracks. When resolved by a file reader or alike, a collector track may result into a bitstream that conforms to a video coding standard or format. A collector track may for example extract MCTSs or sub-pictures to form a coded picture sequence where MCTSs or sub-pictures are arranged to a grid. For example, when a collector track extracts two MCTSs or sub-pictures, they may be arranged into a 2×1 grid of MCTSs or sub-pictures. As discussed subsequently, an extractor track that extracts MCTSs or sub-pictures from other tracks may be regarded as a collector track. A tile base track as discussed subsequently is another example of a collector track. A collector track may also be called a collection track. A track that is a source for extracting to a collector track may be referred to as a collection item track.

Extractors specified in ISO/IEC 14496-15 for H.264/AVC and HEVC enable compact formation of tracks that extract NAL unit data by reference. An extractor is a NAL-unit-like structure. A NAL-unit-like structure may be specified to comprise a NAL unit header and NAL unit payload like any NAL units, but start code emulation prevention (that is required for a NAL unit) might not be followed in a NAL-unit-like structure. For HEVC, an extractor contains one or more constructors. A sample constructor extracts, by reference, NAL unit data from a sample of another track. An in-line constructor includes NAL unit data. The term in-line may be defined e.g. in relation to a data unit to indicate that a containing syntax structure contains or carries the data unit (as opposed to includes the data unit by reference or through a data pointer). When an extractor is processed by a file reader that requires it, the extractor is logically replaced by the bytes resulting when resolving the contained constructors in their appearance order. Nested extraction may be disallowed, e.g. the bytes referred to by a sample constructor shall not contain extractors; an extractor shall not reference, directly or indirectly, another extractor. An extractor may contain one or more constructors for extracting data from the current track or from another track that is linked to the track in which the extractor resides by means of a track reference of type 'scal'. The bytes of a resolved extractor may represent one or more entire NAL units. A resolved extractor starts with a valid length field and a NAL unit header. The bytes of a sample constructor are copied only from the single identified sample in the track referenced through the indicated 'scal' track reference. The alignment is on decoding time, i.e. using the time-to-sample table only, followed by a counted offset in sample number. Extractors are a media-level concept and hence apply to the destination track before any edit list is considered. (However, one would normally expect that the edit lists in the two tracks would be identical).

In viewport-dependent streaming, which may be also referred to as viewport-adaptive streaming (VAS) or viewport-specific streaming, a subset of 360-degree video content covering the viewport (i.e., the current view orientation) is transmitted at a better quality and/or higher resolution than the quality and/or resolution for the remaining of 360-degree video. There are several alternatives to achieve viewport-dependent omnidirectional video streaming. In tile-based viewport-dependent streaming, projected pictures are partitioned into tiles that are coded as motion-constrained tile sets (MCTSs) or alike. Several versions of the content are encoded at different bitrates or qualities using the same MCTS partitioning. Each MCTS sequence is made available for streaming as a DASH Representation or alike. The player selects on MCTS basis which bitrate or quality is received.

H.264/AVC does not include the concept of tiles, but the operation like MCTSs can be achieved by arranging regions vertically as slices and restricting the encoding similarly to encoding of MCTSs. For simplicity, the terms tile and MCTS are used in this document but should be understood to apply to H.264/AVC too in a limited manner. In general, the terms tile and MCTS should be understood to apply to similar concepts in any coding format or specification.

One possible subdivision of the tile-based viewport-dependent streaming schemes is the following:

Region-wise mixed quality (RWMQ) 360° video: Several versions of the content are coded with the same resolution, the same tile grid, and different bitrate/picture quality. Players choose high-quality MCTSs for the viewport.

Viewport+360° video: One or more bitrate and/or resolution versions of a complete low-resolution/low-quality omnidirectional video are encoded and made available for streaming. In addition, MCTS-based encoding is performed and MCTS sequences are made available for streaming. Players receive a complete low-resolution/low-quality omnidirectional video and select and receive the high-resolution MCTSs covering the viewport.

Region-wise mixed resolution (RWMR) 360° video: MCTSs are encoded at multiple resolutions. Players select a combination of high resolution MCTSs covering the viewport and low-resolution MCTSs for the remaining areas.

It needs to be understood that there may be other ways to subdivide tile-based viewport-dependent streaming methods to categories than the one described above. Moreover, the above-described subdivision may not be exhaustive, i.e. they may be tile-based viewport-dependent streaming methods that do not belong to any of the described categories.

All above-described viewport-dependent streaming approaches, tiles or MCTSs (or guard bands of tiles or MCTSs) may overlap in sphere coverage by an amount selected in the pre-processing or encoding.

All above-described viewport-dependent streaming approaches may be realized with client-driven bitstream rewriting (a.k.a. late binding) or with author-driven MCTS merging (a.k.a. early binding). In late binding, a player selects MCTS sequences to be received, selectively rewrites portions of the received video data as necessary (e.g. parameter sets and slice segment headers may need to be rewritten) for combining the received MCTSs into a single bitstream, and decodes the single bitstream. Early binding refers to the use of author-driven information for rewriting portions of the received video data as necessary, for merging of MCTSs into a single bitstream to be decoded, and in some cases for selection of MCTS sequences to be received. There may be approaches in between early and late binding: for example, it may be possible to let players select MCTS sequences to be received without author guidance, while an author-driven approach is used for MCTS merging and header rewriting. Early binding approaches include an extractor-driven approach and tile track approach, which are described subsequently.

In the tile track approach, one or more motion-constrained tile set sequences are extracted from a bitstream, and each extracted motion-constrained tile set sequence is stored as a tile track (e.g. an HEVC tile track) in a file. A tile base track (e.g. an HEVC tile base track) may be generated and stored in a file. The tile base track represents the bitstream by implicitly collecting motion-constrained tile sets from the tile tracks. At the receiver side the tile tracks to be streamed may be selected based on the viewing orientation. The client may receive tile tracks covering the entire omnidirectional content. Better quality or higher resolution tile tracks may be received for the current viewport compared to the quality or resolution covering the remaining 360-degree video. A tile base track may include track references to the tile tracks, and/or tile tracks may include track references to the tile base track. For example, in HEVC, the 'sabt' track reference is used used to refer to tile tracks from a tile base track, and the tile ordering is indicated by the order of the tile tracks contained by a 'sabt' track reference. Furthermore, in HEVC, a tile track has is a 'tbas' track reference to the tile base track.

In the extractor-driven approach, one or more motion-constrained tile set sequences are extracted from a bitstream, and each extracted motion-constrained tile set sequence is modified to become a compliant bitstream of its own (e.g. HEVC bitstream) and stored as a sub-picture track (e.g. with untransformed sample entry type 'hvc1' for HEVC) in a file. One or more extractor tracks (e.g. an HEVC extractor tracks) may be generated and stored in a file. The extractor track represents the bitstream by explicitly extracting (e.g. by HEVC extractors) motion-constrained tile sets from the sub-picture tracks. At the receiver side the sub-picture tracks to be streamed may be selected based on the viewing orientation. The client may receive sub-picture tracks covering the entire omnidirectional content. Better quality or higher resolution sub-picture tracks may be received for the current viewport compared to the quality or resolution covering the remaining 360-degree video.

In approaches that are based on author-driven MCTS merging but allow client-driven decision between bitrate versions, collocated motion-constrained tile sets can be offered as alternatives, out of which clients can choose the bitrate version that suits the prevailing network throughput and the viewport. When late binding is in use, clients can select any motion-constrained tile sets that can be merged to a decodable bitstream.

The number of independently coded picture regions can be relatively large. 96 regions (4×4 regions per cube face) is often mentioned as an example. In streaming applications, it is not uncommon to prepare the same content with several resolutions and bitrates; e.g. half a dozen of options could be provided from which streaming clients can dynamically choose from.

The targeted picture size for a merged bitstream may be selected e.g. according to a suitable video coding level. The partitioning of pictures to image segments or independently coded picture regions, such as the tile and brick partitioning, applying to a merged bitstream may be selected according to the width and height of the image segments or the independently coded picture regions in the available source bitstreams. To provide flexibility for different client strategies and viewing conditions (e.g. field of view), the width and height of the image segments and/or the independently coded picture regions can be selected to be identical in all the available source bitstreams.

Figures 11A, 11B, 11C, 11D:
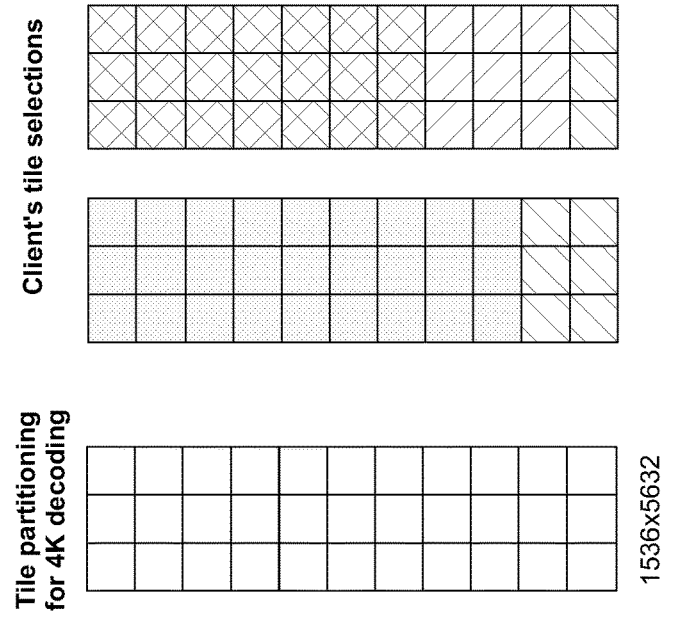
FIG. 11a illustrates an example where the cubemap content is encoded at "8K", "6K", "4K", and "2K" resolutions.
FIG. 11b illustrates an example where a tile grid of 3×11 is selected to be used for 4K decoding capability.
FIG. 11c illustrates an example where the client can select tiles from any resolution version using any strategy.
FIG. 11d illustrates an example where, in a presented "6K" strategy the client selects tiles covering more than two cube faces from the "6K" version, more than two cube faces from the "4K" version, and three cube faces from the "2K" version.

FIG. 11a illustrates an example where the cubemap content is encoded at "8K", "6K", "4K", and "2K" resolutions, for which the number of luma samples on the equator is 8192, 6144, 4096, and 2048, respectively. The width and height of the tiles in all versions are selected to be identical (512 luma samples). Each tile is encoded as an independently coded picture region.

FIG. 11b illustrates an example where a tile grid of 3×11 is selected to be used for 4K decoding capability.

FIG. 11c illustrates an example where the client can select tiles from any resolution version using any strategy. In this example the client chooses as many tiles from the "8K" cubemap as possible and keeps an entire "2K" cubemap as a backup for unexpected viewing orientation changes.

FIG. 11d illustrates an example where, in a presented "6K" strategy the client selects tiles covering more than two cube faces from the "6K" version, more than two cube faces from the "4K" version, and three cube faces from the "2K" version, thus targeting at gradual picture quality variations if the viewing orientation changes.

It needs to be understood that even though the tile track approach and extractor-driven approach are described in details, specifically in the context of HEVC, they apply to other codecs and similar concepts as tile tracks or extractors. Moreover, a combination or a mixture of tile track and extractor-driven approach is possible. For example, such a mixture could be based on the tile track approach, but where a tile base track could contain guidance for rewriting operations for the client, e.g. the tile base track could include rewritten slice or tile group headers.

As an alternative to MCTS-based content encoding, content authoring for tile-based viewport-dependent streaming may be realized with sub-picture-based content authoring, described as follows. The pre-processing (prior to encoding) comprises partitioning uncompressed pictures to sub-pictures. Several sub-picture bitstreams of the same uncompressed sub-picture sequence are encoded, e.g. at the same resolution but different qualities and bitrates. The encoding may be constrained in a manner that merging of coded sub-picture bitstream to a compliant bitstream representing omnidirectional video is enabled. For example, dependencies on samples outside the decoded picture boundaries may be avoided in the encoding by selecting motion vectors in a manner that sample locations outside the picture would not be referred in the inter prediction process. Each sub-picture bitstream may be encapsulated as a sub-picture track, and one or more extractor tracks merging the sub-picture tracks of different sub-picture locations may be additionally formed. If a tile track based approach is targeted, each sub-picture bitstream is modified to become an MCTS sequence and stored as a tile track in a file, and one or more tile base tracks are created for the tile tracks.

Tile-based viewport-dependent streaming approaches may be realized by executing a single decoder instance or one decoder instance per MCTS sequence (or in some cases, something in between, e.g. one decoder instance per MCTSs of the same resolution), e.g. depending on the capability of the device and operating system where the player runs. The use of single decoder instance may be enabled by late binding or early binding. To facilitate multiple decoder instances, the extractor-driven approach may use sub-picture tracks that are compliant with the coding format or standard without modifications. Other approaches may need either to rewrite image segment headers, parameter sets, and/or alike information in the client side to construct a conforming bitstream or to have a decoder implementation capable of decoding an MCTS sequence without the presence of other coded video data.

There may be at least two approaches for encapsulating and referencing tile tracks or sub-picture tracks in the tile track approach and the extractor-driven approach, respectively:

Referencing track identifiers from a tile base track or an extractor track.

Referencing tile group identifiers from a tile base track or an extractor track, wherein the tile group identified by a tile group identifier contains the collocated tile tracks or the sub-picture tracks that are alternatives for extraction.

In the RWMQ method, one extractor track per each picture size and each tile grid is sufficient. In 360°+viewport video and RWMR video, one extractor track may be needed for each distinct viewing orientation.

An approach similar to above-described tile-based viewport-dependent streaming approaches, which may be referred to as tile rectangle based encoding and streaming, is described next. This approach may be used with any video codec, even if tiles similar to HEVC were not available in the codec or even if motion-constrained tile sets or alike were not implemented in an encoder. In tile rectangle based encoding, the source content is split into tile rectangle sequences before encoding. Each tile rectangle sequence covers a subset of the spatial area of the source content, such as full panorama content, which may e.g. be of equirectangular projection format. Each tile rectangle sequence is then encoded independently from each other as a single-layer bitstream. Several bitstreams may be encoded from the same tile rectangle sequence, e.g. for different bitrates. Each tile rectangle bitstream may be encapsulated in a file as its own track (or alike) and made available for streaming. At the receiver side the tracks to be streamed may be selected based on the viewing orientation. The client may receive tracks covering the entire omnidirectional content. Better quality or higher resolution tracks may be received for the current viewport compared to the quality or resolution covering the remaining, currently non-visible viewports. In an example, each track may be decoded with a separate decoder instance.

In viewport-adaptive streaming, the primary viewport (i.e., the current viewing orientation) is transmitted at a good quality/resolution, while the remaining of 360-degree video is transmitted at a lower quality/resolution. When the viewing orientation changes, e.g. when the user turns his/her head when viewing the content with a head-mounted display, another version of the content needs to be streamed, matching the new viewing orientation. In general, the new version can be requested starting from a stream access point (SAP), which are typically aligned with (Sub)segments. In single-layer video bitstreams, SAPs correspond to random-access pictures, are intra-coded, and are hence costly in terms of rate-distortion performance. Conventionally, relatively long SAP intervals and consequently relatively long (Sub)segment durations in the order of seconds are hence typically used. Thus, the delay (here referred to as the viewport quality update delay) in upgrading the quality after a viewing orientation change (e.g. a head turn) is conventionally in the order of seconds and is therefore clearly noticeable and annoying.

Since the viewing orientation changes gradually in typical viewing situations, the picture quality changes in only a subset of the locations for independently coded picture regions. For example, when 4×2 MCTS grid is in used for equirectangular projection, it is likely that the picture quality changes in half of the MCTSs. Updating all MCTS locations with Segments starting with a random-access picture is inefficient in terms of streaming rate-distortion performance and causes a large fluctuation in bitrate, which might cause an interruption in the playback for rebuffering or could be compensated by a sufficiently long initial buffering delay.

It has been proposed to allow independently coded picture regions originating from different types of coded pictures (e.g. non-IRAP and IRAP pictures) in the same coded picture of the merged bitstream to enable handling a viewing orientation change in viewport-dependent 360° streaming so that only a subset of independently coded picture regions originates from an IRAP picture. To support this, VVC Draft 5 allows indicating reference picture lists in the slice headers of IDR pictures for enabling clients to change the IDR NAL unit type to TRAIL NAL unit type when for enabling the use case.

As explained above, viewport switching in viewport-dependent streaming, which may be compliant with MPEG OMAF, is enabled at stream access points, which involve intra coding and hence a greater bitrate compared to respective inter coded pictures at the same quality. A compromise between the stream access point interval and the rate-distortion performance is hence chosen in an encoding configuration.

Viewport-adaptive streaming of equal-resolution HEVC bitstreams with MCTSs is described in the following as an example. Several HEVC bitstreams of the same omnidirectional source content may be encoded at the same resolution but different qualities and bitrates using motion-constrained tile sets. The MCTS grid in all bitstreams is identical. In order to enable the client to use the same tile base track for reconstructing a bitstream from MCTSs received from different original bitstreams, each bitstream is encapsulated in its own file, and the same track identifier is used for each tile track of the same tile grid position in all these files. HEVC tile tracks are formed from each motion-constrained tile set sequence, and a tile base track is additionally formed. The client may parse tile base track to implicitly reconstruct a bitstream from the tile tracks. The reconstructed bitstream can be decoded with a conforming HEVC decoder.

Clients can choose which version of each MCTS is received. The same tile base track suffices for combining MCTSs from different bitstreams, since the same track identifiers are used in the respective tile tracks.

Figure 5:
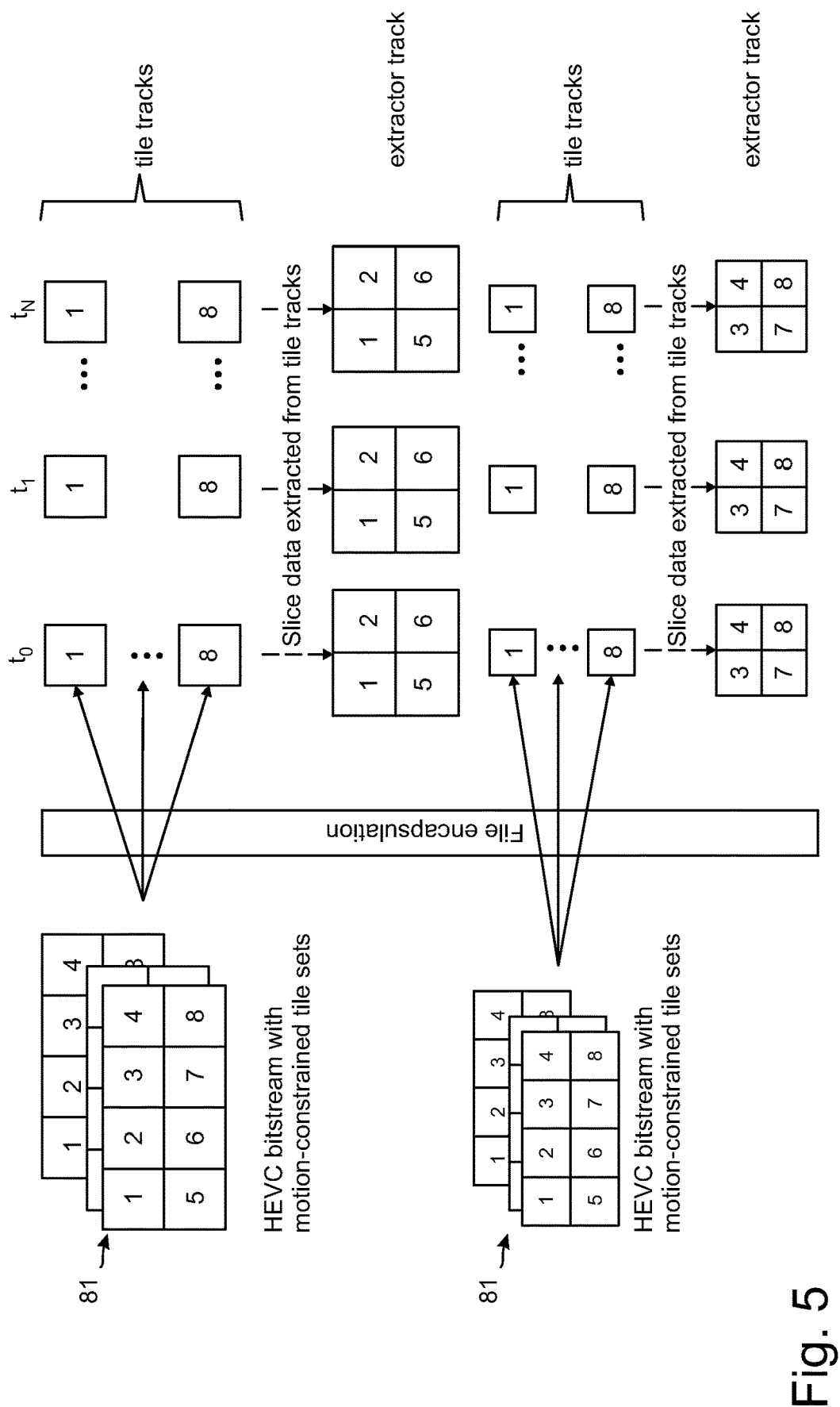
FIG. 5 shows an example of tile-based omnidirectional video streaming.

FIG. 5 illustrates an example how tile tracks of the same resolution can be used for tile-based omnidirectional video streaming. A 4×2 tile grid has been used in forming of the motion-constrained tile sets. Two HEVC bitstreams originating from the same source content are encoded at different picture qualities and bitrates. Each bitstream may be encapsulated in its own file wherein each motion-constrained tile set sequence may be included in one tile track and a tile base track is also included. The client may choose the quality at which each tile track is received based on the viewing orientation. In this example the client receives tile tracks 1, 2, 5, and 6 at a particular quality and tile tracks 3, 4, 7, and 8 at another quality. The tile base track is used to order the received tile track data into a bitstream that can be decoded with an HEVC decoder.

Merging of independently coded picture regions from one or more source bitstreams into a merged bitstream requires rewriting of parameter sets. In other words, the parameter sets in the source bitstream(s) are not applicable as such. For example, the picture width, the picture height, and/or the picture partitioning to tiles and bricks in the merged bitstream might differ from those of any of the source bitstreams. Consequences of parameter set rewriting may include the following:

An entity outside the decoder (e.g. player) must parse and/or rewrite complete parameter sets, including parts irrelevant to extraction and merging. The entity might take the parameter sets from a selected source bitstream as basis, parse them, modify values of selected syntax elements within the parameter sets, and rewrite the parameter sets with the modifications in or along the merged bitstream.

Furthermore, if the size of parameter sets changes in the merged bitstream, they could affect the HRD and could invalidate the HRD buffering parameters (in SPS and in buffering period SEI messages). Consequently, unless the parameter set rewriting is normatively specified, the implications of the merging on the HRD behaviour might be unpredictable.

When merging independently coded regions from IDR and non-IDR pictures, the decoder needs to conclude that such a "mixed picture" is treated like a non-IDR picture for reference picture marking. In one approach a "mixed picture indication" is provided in the PPS. However, when the PPS is used for other pictures than where the mixing happens, the approach requires creating a new PPS and rewriting PPS ID values in the slice header. In another approach, an externally controlled variable is used in the decoding process to indicate a "mixed picture". However, decoder API for such external variables might be non-existing or might differ depending on the operating environment.

Picture-synchronized metadata might be needed for rendering, e.g. for region-wise packed 360-degree video and/or for volumetric video (3DoF+, 6DoF, and point cloud video). E.g. patch metadata and/or region-wise packing may change on picture basis. In some operating systems and/or device architectures, the player might not be able to pass metadata to the rendering process in picture-synchronized manner but rather only the video decoder might be capable of doing that. This might apply to any video (both non-encrypted and encrypted) or only for encrypted video. However, generally it has not been determined and there are no controls which metadata (e.g. which SEI messages) video decoders should pass with the decoded pictures as output, in picture-synchronized manner Some of the metadata might not be specified with a first version of a video decoding specification, but yet a decoder according to the first version should be capable of passing the metadata along with the decoded pictures as output. Presently, the video coding standards specify the output of decoded pictures only. Output of metadata has not been normatively specified.

Visual content at specific time instances can be divided into several parts, where each part is represented using a sub-picture. Respective sub-pictures at different time instances form a sub-picture sequence, wherein the definition of "respective" may depend on the context, but can be, for example, the same spatial portion of a picture area in a sequence of pictures or the content acquired with the same settings, such as the same acquisition position, orientation, and projection surface. A picture at specific time instance may be defined as a collection of all the sub-pictures at the specific time instance. Each sub-picture is coded using a conventional video encoder, and reconstructed sub-picture is stored in a reconstructed sub-picture memory corresponding to the sub-picture sequence. For predicting a sub-picture at a particular sub-picture sequence, the encoder can use reconstructed sub-pictures of the same sub-picture sequence as reference for prediction. Coded sub-pictures are included as separate units (e.g. VCL NAL units) in the same bitstream.

A decoder receives coded video data (e.g. a bitstream). A sub-picture is decoded as a separate unit from other sub-pictures using a conventional video decoder. The decoded sub-picture may be buffered using a decoded picture buffering process. The decoded picture buffering process may provide the decoded sub-picture of a particular sub-picture sequence to the decoder, and the decoder may use the decoded sub-picture as reference for prediction for predicting a sub-picture at the same sub-picture sequence.

Sub-picture packing of one or more reference sub-pictures or regions therein may comprise but is not limited to one or more of the following (as indicated by the encoder as part of the information):

rotating e.g. by 0, 90, 180, or 270 degrees;
mirroring e.g. horizontally or vertically;
resampling (e.g. rescaling the width and/or height);
positioning within the area of the manipulated reference sub-picture;
overlaying over (i.e. overwriting) or blending with the samples already present within the indicated area of the manipulated reference sub-picture (e.g., occupied by sub-pictures or regions arranged previously onto the manipulated reference sub-picture). The overwriting may be useful e.g. in the case the one/some of the sub-pictures are coded with higher quality.

Geometry padding for 360° video may comprise, for example, cube face padding from neighboring cube faces projected onto the same plane as the cube face in the sub-picture.

In volumetric video coding (e.g. point cloud coding), a geometry image and/or a texture image may be padded by an image padding element. Padding aims at filling the empty space between patches in order to generate a piecewise smooth image suited for video compression. The image padding element may consider keeping the compression high as well as enabling estimating of occupancy map (EOM) with enough accuracy as compared to the original occupancy map (OOM).

According to an approach, a following padding strategy may be used:

Each block of T×T (e.g., 16×16) pixels is processed independently. If the block is empty (i.e., all its pixels belong to an empty space), then the pixels of the block are filled by copying either the last row or column of the previous T×T block in raster order. If the block is full (i.e., no empty pixels), nothing is done. If the block has both empty and filled pixels, then the empty pixels are iteratively filled with the average value of their non-empty neighbors.

The generated images/layers may be stored as video frames and compressed. For example, the padded geometry image and the padded texture image are provided to a video compression element for compressing the padded geometry image and the padded texture image, from which the compressed geometry and texture images are provided, for example, to a multiplexer which multiplexes the input data to a compressed bitstream(s).

The compressed geometry and texture images are also provided, for example, to an occupancy map estimator which generates an estimated occupancy map.

In this step, an algorithm may be used to find the borders of geometry and/or texture images. It is noted that the borders are aligned with each other in general and prior to encoding. However, maybe after encoding, the edges are a bit misaligned which can be corrected based on the original occupancy map and in the following steps.

The occupancy map may consist of a binary map that indicates for each cell of the grid whether it belongs to the empty space or to the point cloud. One cell of the 2D grid would produce a pixel during the image generation process.

In the estimated occupancy generation step, based on the embodiment used in the padding step, different processes between respective padded geometry, Y, U, and/or V components may be considered. Based on such processes, an estimation of edges (i.e. contours defining the occupancy map) will be created. Such estimation may be fine-tuned in the cases where more than one component/image are to be used for estimating the occupancy map.

An example of an edge detection algorithm is a multiscale edge detection algorithm, which is based on wavelet domain vector hidden Markov tree model. However, some other algorithm may be applied in this context.

In padding the content of the padding area of the manipulated reference sub-picture may be generated from other sub-pictures. For example, in region of interest coding, if a first sub-picture may represent a bigger area than a second sub-picture, the manipulated reference for the second sub-picture may be padded using the content in the first sub-picture.

In reference patch reprojection reference sub-picture(s) may be interpreted as 3D point cloud patches and the 3D point cloud patches may be re-projected onto a plane suitable for 2D inter prediction.

For the MPEG standard, there has been developed a test model for point cloud compression. MPEG W17248 discloses a test model for MPEG point cloud coding to provide a standardized way of dynamic point cloud compression. In MPEG W17248 test model, the 2D-projected 3D volume surfaces are determined in terms of three image data: motion images, texture images and depth/attribute images.

In a point cloud re-sampling block, the input 3D point cloud frame is resampled on the basis of a reference point cloud frame. A 3D motion compensation block is used during the inter-frame encoding/decoding processes. It computes the difference between the positions of the reference point cloud and its deformed version. The obtained motion fields consists of 3D motion vectors $\{MV\_i(dx, dy, dz)\}\_i$, associated with the point of the reference frame. The 3D to 2D mapping of the reference frame is used to convert the motion field into a 2D image by storing dx as Y, dy as U and dz as V, where this 2D image may be referred to as a motion image. A scale map providing the scaling factor for each block of the motion image is also encoded.

The image generation process exploits the 3D to 2D mapping computed during the packing process to store the geometry/texture/motion of the point cloud as images. These images are stored as video frames and compressed with a video encoder, such as an HEVC encoder. The generated videos may have the following characteristics:

Geometry: W×H YUV420-8 bit,

Texture: W×H YUV420-8 bit,

Motion: W×H YUV444-10 bit.

View synthesis (a.k.a. depth-image-based rendering) may be performed from sub-pictures representing one or more texture and depth views.

Depth-image-based rendering (DIBR) or view synthesis refers to generation of a novel view based on one or more existing/received views. Depth images may be used to assist in correct synthesis of the virtual views. Although differing in details, most of the view synthesis algorithms utilize 3D warping based on explicit geometry, i.e. depth images, where typically each texture pixel is associated with a depth pixel indicating the distance or the z-value from the camera to the physical object from which the texture pixel was sampled. One known approach uses a non-Euclidean formulation of the 3D warping, which is efficient under the condition that the camera parameters are unknown or the camera calibration is poor. Yet one other known approach, however, strictly follows Euclidean formulation, assuming the camera parameters for the acquisition and view interpolation are known. Yet in one other approach, the target of view synthesis is not to estimate a view as if a camera was used to shoot it but rather provide a subjectively pleasing representation of the content, which may include non-linear disparity adjustment for different objects.

Occlusions, pinholes and reconstruction errors are the most common artifacts introduced in the 3D warping process. These artifacts occur more frequently in the object edges, where pixels with different depth levels may be mapped to the same pixel location of the virtual image. When those pixels are averaged to reconstruct the final pixel value for the pixel location in the virtual image, an artifact might be generated, because pixels with different depth levels usually belong to different objects.

A number of approaches have been proposed for representing depth picture sequences, including the use of auxiliary depth map video streams. The depth map video stream for a single view can be regarded as a regular monochromatic video stream and coded with any video codec. Some characteristics of the depth map stream, such as the minimum and maximum depth in world coordinates, can be indicated in messages formatted according to the MPEG-C Part 3 standard, for example.

The detailed operation of view synthesis algorithms depend on which representation format has been used for texture views and depth picture sequences.

The resampling may be either upsampling (for switching to a higher resolution) or downsampling (for switching to a lower resolution). The resampling may be used for but are not limited to one or more of the following use cases:

Adaptive resolution change, where a picture would typically comprise one sub-picture only.

Mixed-resolution multiview video or image coding, where a sub-picture sequence corresponds to a view. Inter-view prediction may be performed by enabling prediction from a first sub-picture (of a first sub-picture sequence) to a second sub-picture (of a second sub-picture sequence), where the first and second sub-pictures may be of the same time instance. In some cases, it may be beneficial to rotate one of the views (e.g. for arranging the sub-pictures side-by-side or top-bottom in the output picture compositing). Hence, resampling may be accompanied by rotation (e.g. by 90, 180, or 270 degrees).

Color gamut conversion: For example, if one sub-picture used as a source is represented by a first color gamut or format, such as ITU-R BT.709, and the manipulated reference sub-picture is represented by a second color gamut or format, such as ITU-R BT.2020, the sub-picture used as a source may be converted to the second color gamut or format as part of the process.

Dynamic range conversion and/or color mapping conversion: Color mapping may refer to the mapping of sample values to linear light representation. The reconstructed sub-picture(s) used as a source for generating the manipulated reference sub-picture may be converted to the target dynamic range and color mapping.

In bit depth conversion the reconstructed sub-picture(s) used as source for generating the manipulated reference sub-picture may be converted to the bit-depth of the manipulated reference sub-picture.

Chroma format conversion: For example, a manipulated reference sub-picture may have YUV 4:4:4 chroma format while at least some reconstructed sub-pictures used as source for generating the manipulated reference sub-picture may have chroma format 4:2:0. The sub-pictures used as source may be upsampled to YUV 4:4:4 as part of the process, in this example.

Projection conversion: For example, if one sub-picture is in a first projection, such as ERP, and the manipulated sub-picture is in a second projection, such as CMP, the sub-picture is used as reference may be converted to the second projection. As a use case, the whole 360-degree content may be coded in lower resolution in ERP format, and the viewport content may be coded in higher resolution in CMP format.

Frame rate conversion: For example, if one sub-picture is coded with a first frame rate, and a second sub-picture may be coded with a second frame rate, the sub-picture is used as reference may be interpolated in temporal domain to the time instance of the second sub-picture. As a use case, in stereoscopic streaming the dominant view may be transmitted in higher frame rate, and the auxiliary view may be transmitted in lower frame rate.

The following definitions may be made regarding the High Efficiency Video Coding standard but may also apply for other codecs. An independent layer is a layer that does not have direct reference layers, i.e. is not inter-layer predicted. A non-base layer is a layer in which all VCL NAL units have the same nuh_layer_id value greater than 0. An independent non-base layer is both an independent layer and a non-base layer.

In the following, an example of a sub-bitstream extraction process will be shortly explained. A bitstream outBitstream can be generated from an independent non-base layer of the bitstream inBitstream as follows. The bitstream outBitstream is set to be identical to the bitstream inBitstream. NAL units with nal_unit_type not equal to SPS_NUT, PPS_NUT, and EOB_NUT and with nuh_layer_id not equal to the assignedBaseLayerId are removed from outBitstream. NAL units with nal_unit_type equal to SPS_NUT or PPS_NUT with nuh_layer_id not equal to 0 or assignedBaseLayerId are removed from outBitstream. NAL units with nal_unit_type equal to VPS NUT are removed from outBitstream. All NAL units with TemporalId greater than tIdTarget are removed from outBitstream. nuh_layer_id is set equal to 0 in each NAL unit of outBitstream. The bitstream outBitstream can be decoded with the HEVC decoding process.

In the following, an example of a video parameter set (VPS) of HEVC for indicating layer properties will be shortly explained. The video parameter set contains an extension part, a part of which is presented below:

| | Descriptor |
|---|---|
| vps_extension( ) { | |
|   if( vps_max_layers_minus1 > 0 && vps_base_layer_internal_flag ) | |
|     profile_tier_level( 0, vps_max_sub_layers_minus1 ) | |
|   splitting_flag | u(1) |
|   for( i = 0, NumScalabilityTypes = 0; i < 16; i++ ) { | |
|     scalability_mask_flag[ i ] | u(1) |
|     NumScalabilityTypes += scalability_mask_flag[ i ] | |
|   } | |
|   for( j = 0; j < ( NumScalabilityTypes − splitting_flag ); j++ ) | |
|     dimension_id_len_minus1[ j ] | u(3) |
|   vps_nuh_layer_id_present_flag | u(1) |
|   for( i = 1; i <= MaxLayersMinus1; i++) { | |
|     if( vps_nuh_layer_id_present_flag ) | |
|       layer_id_in_nuh[ i ] | u(6) |
|     if( !splitting_flag) | |
|       for( j = 0; j < NumScalabilityTypes; j++ ) | |
|         dimension_id[ i ][ j ] | u(v) |
|   } | |
| . . . | |

The video parameter set of HEVC specifies a scalability mask, which indicates the type(s) of scalability that are in use for a layer:

scalability_mask_flag[i] equal to 1 indicates that dimension_id syntax elements corresponding to the i-th scalability dimension in Table F.1 are present. scalability_mask_flag[i] equal to 0 indicates that dimension_id syntax elements corresponding to the i-th scalability dimension are not present.

Table F1

| Mapping of ScalabiltyId to scalability dimensions | | |
|---|---|---|
| Scalability mask index dimension | Scalability mapping | ScalabilityId |
| 0 | Texture or depth | DepthLayerFlag |
| 1 | Multiview | ViewOrderIdx |
| 2 | Spatial/quality scalability | DependencyId |
| 3 | Auxiliary | AuxId |
| 4-15 | Reserved | | layer_id_in_nuh[i] specifies the value of the nuh_layer_id syntax element in VCL NAL units of the i-th layer. When i is greater than 0, layer_id_in_nuh[i] shall be greater than layer_id_in_nuh[i−1]. For any value of i in the range of 0 to MaxLayersMinus1, inclusive, when not present, the value of layer_id_in_nuh[i] is inferred to be equal to i.

For i from 0 to MaxLayersMinus1, inclusive, the variable LayerIdxInVps[layer_id_in_nuh[i]] is set equal to i.

dimension_id[i][j] specifies the identifier of the j-th present scalability dimension type of the i-th layer. The number of bits used for the representation of dimension_id[i][j] is dimension_id_len_minus1[j+] bits.

Depending on splitting_flag, the following applies. If splitting_flag is equal to 1, for i from 0 to MaxLayersMinus1, inclusive, and j from 0 to NumScalabilityTypes−1, inclusive, dimension_id[i][j] is inferred to be equal to ((layer_id_in_nuh[i] & ((1<<dimBitOffset[j+1])−1))>>dimBitOffset[j]). If splitting_flag is not equal to 1, (splitting_flag is equal to 0), for j from 0 to NumScalabilityTypes−1, inclusive, dimension_id[0][j] is inferred to be equal to 0.

The variable ScalabilityId[i][smIdx] specifying the identifier of the smIdx-th scalability dimension type of the i-th layer, and the variables DepthLayerFlag[lId], ViewOrderIdx[lId], DependencyId[lId], and AuxId[lId] specifying the depth flag, the view order index, the spatial/quality scalability identifier and the auxiliary identifier, respectively, of the layer with nuh_layer_id equal to lId may be derived as follows:

```
NumViews = 1
for( i = 0; i <= MaxLayersMinus1; i++ ) {
  lId = layer_id_in_nuh[ i ]
  for( smIdx= 0, j = 0; smIdx < 16; smIdx++ ) {
    if( scalability_mask_flag[ smIdx ] )
      ScalabilityId[ i ][ smIdx ] = dimension_id[ i ][ j++ ]
    else
      ScalabilityId[ i ][ smIdx ] = 0
  }
  DepthLayerFlag[ lId ] = ScalabilityId[ i ][ 0 ]
  ViewOrderIdx[ lId ] = ScalabilityId[ i ][ 1 ]
  DependencyId[ lId ] = ScalabilityId[ i ][ 2 ]
    (F-3)
  AuxId[ lId ] = ScalabilityId[ i ][ 3 ]
  if( i > 0 ) {
    newViewFlag = 1
    for( j = 0; j < i; j++ )
      if( ViewOrderId[ lId ] = = ViewOrderIdx[ layer_id_in_
        nuh[ j ] ] )
          newViewFlag = 0
      NumViews += newViewFlag
  }
}
```

An output layer set (OLS) may be defined as a set of layers for which one or more layers are specified as the output layers. An output layer (of an output layer set) may be specified as a layer that is output when that output layer set is decoded. A picture of an output layer is output by the decoder when an output flag indicted or inferred for it is equal to 1. Otherwise, a picture may not be output by the decoder. Output layer sets may be specified in a VPS.

A sub-bitstream extraction process may be defined as a specified process by which NAL units in a bitstream that do not belong to a target set, e.g. determined by a target OLS index and a target highest TemporalId, are removed from the bitstream, with the output sub-bitstream consisting of the NAL units in the bitstream that belong to the target set.

Visual content at specific time instances is divided into several parts, where each part is represented using a sub-picture. Respective sub-pictures at different time instances form a sub-picture sequence, wherein the definition of "respective" may depend on the context, but can be for example the same spatial portion of a picture area in a sequence of pictures or the content acquired with the same settings, such as the same acquisition position, orientation, and projection surface. A picture at specific time instance may be defined as a collection of all the sub-pictures at the specific time instance. Each sub-picture is coded using a conventional video encoder, and reconstructed sub-picture is stored in a reconstructed sub-picture memory corresponding to the sub-picture sequence. For predicting a sub-picture at a particular sub-picture sequence, the encoder can use reconstructed sub-pictures of the same sub-picture sequence as reference for prediction. Coded sub-pictures are included as separate units (e.g. VCL NAL units) in the same bitstream.

A decoder receives coded video data (e.g. a bitstream). A sub-picture is decoded as a separate unit from other sub-pictures using a conventional video decoder. The decoded sub-picture may be buffered using a decoded picture buffering process. The decoded picture buffering process may provide the decoded sub-picture of a particular sub-picture sequence to the decoder, and the decoder may use the decoded sub-picture as reference for prediction for predicting a sub-picture at the same sub-picture sequence.

Figure 6:
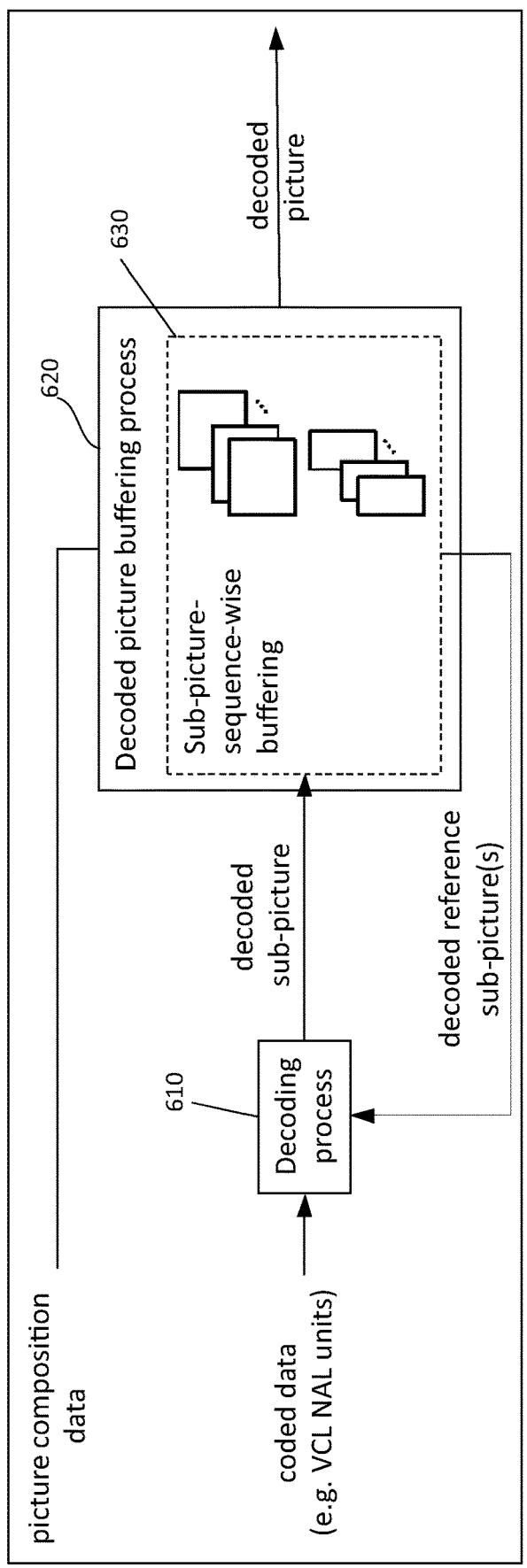
FIG. 6 shows a sub-picture-sequence-wise buffering according to an embodiment.

FIG. 6 illustrates an example of a decoder. The decoder receives coded video data (e.g. a bitstream). A sub-picture is decoded in a decoding process 610 as a separate unit from other sub-pictures using a conventional video decoder. The decoded sub-picture may be buffered using a decoded picture buffering process 620. The decoded picture buffering process may provide the decoded sub-picture of a particular sub-picture sequence to the decoding process 610, and the decoder may use the decoded sub-picture as a reference for prediction for predicting a sub-picture at the same sub-picture sequence.

The decoded picture buffering process 620 may comprise a sub-picture-sequence-wise buffering 630, which may comprise marking of reconstructed sub-pictures as "used for reference" and "unused for reference" as well as keeping track of whether reconstructed sub-pictures have been output from the decoder. The buffering of sub-picture sequences may be independent from each other, or may be synchronized in one or both of the following ways:

the output of all reconstructed sub-pictures of the same time instance may be performed synchronously.

the reference picture marking of reconstructed sub-pictures of the same time instance may be performed synchronously.

The decoded picture buffering process may comprise an output picture compositing process that takes the picture composition data as input and arranges reconstructed sub-pictures into output pictures. FIG. 6 continues a previous example of two sub-picture sequences and arranges time-aligned reconstructed sub-pictures side-by-side into an output picture. The example illustrates decoding of two sub-picture sequences, which have the same height but different width. It needs to be understood that the number of sub-picture sequences and/or the sub-picture dimensions could have been chosen differently and these choices are only meant as possible examples.

According to an example, output from a decoder comprises a collection of the different and separate decoded sub-pictures.

Figure 7:
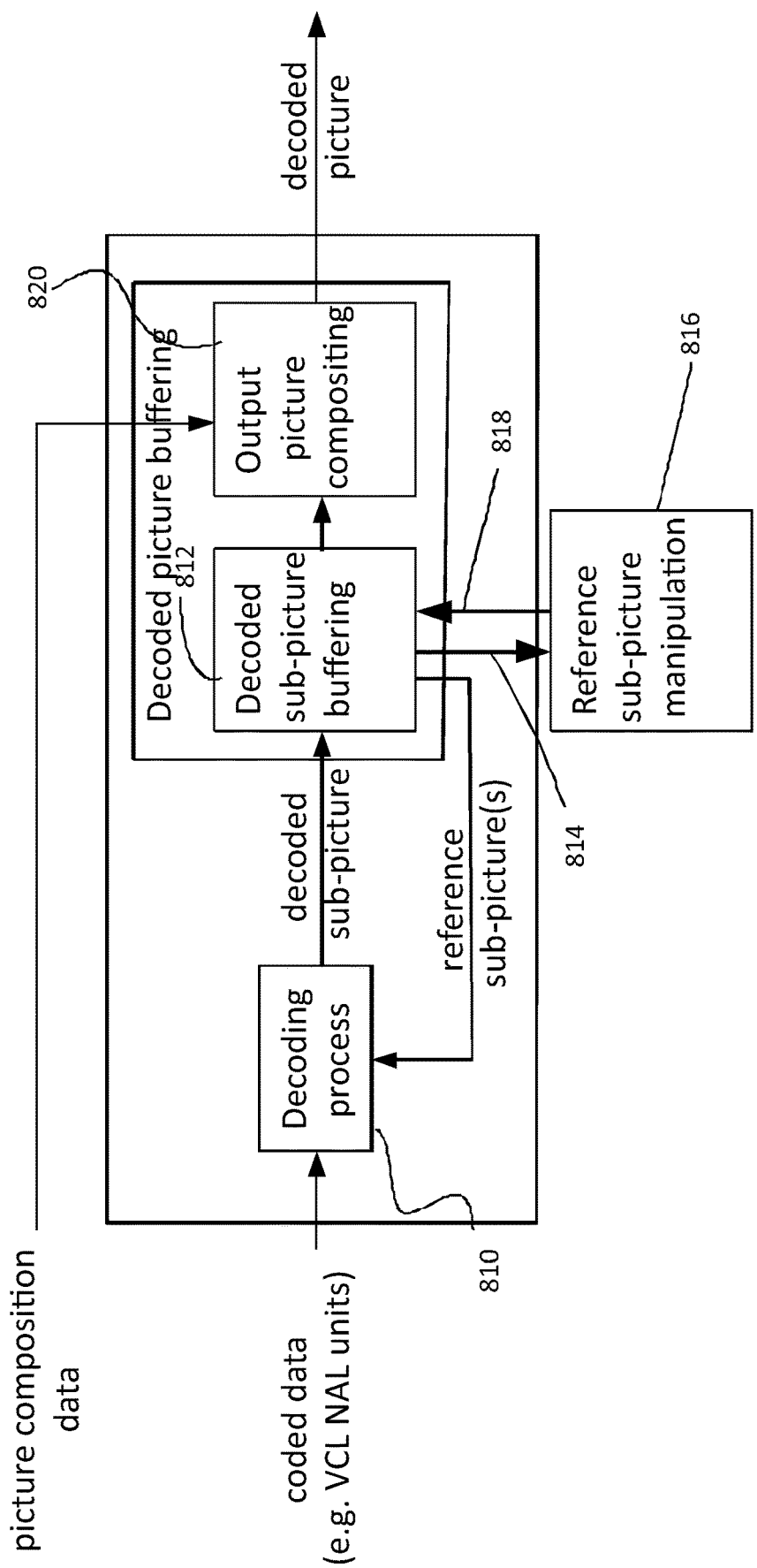
FIG. 7 shows a decoding process with a reference sub-picture manipulation process, in accordance with an embodiment.

According to another example shown in FIG. 7, an output picture, which may also or alternatively be referred to as a decoded picture, from a decoding process 810 is a collection of the different and separate sub-pictures. According to another example, the output picture is composed by arranging reconstructed sub-pictures into a two-dimensional (2D) picture. This example keeps a conventional design of a single output picture (per time instance) as the output of a video decoder and hence can be straightforward for integrating to systems. The decoded sub-pictures are provided to a decoded sub-picture buffering 812. The decoding process 810 may then use buffered sub-picture(s) as a reference for decoding succeeding pictures. The decoding process may obtain an indication or infer which of the decoded sub-picture(s) are to be used as a source for generating manipulated sub-picture(s). Those sub-pictures are provided 814 to a reference sub-picture manipulation process 816. Manipulated reference sub-pictures are then provided 818 to the decoded sub-picture buffering 812, where the manipulated reference sub-pictures are buffered. The sub-pictures and the manipulated reference sub-pictures may then be used by the output picture compositing process 820 that takes the picture composition data as input and arranges reconstructed sub-pictures into output pictures. An encoder encodes picture composition data into or along the bitstream, wherein the picture composition data is indicative of how reconstructed sub-pictures are to be arranged into 2D picture(s) forming output picture(s). A decoder decodes picture composition data from or along the bitstream and forms 820 an output picture from reconstructed sub-pictures and/or manipulated reference sub-pictures according to the decoded picture composition data. The decoding or picture composition data may happen as a part of or operationally connected with the output picture compositing process 820. Thus, a conventional video decoding process decodes the picture composition data.

According to an example, the picture composition data is encoded in or along the bitstream and/or decoded from or along the bitstream using the bitstream or decoding order of sub-pictures and the dimensions of sub-pictures. An algorithm for positioning sub-pictures within a picture area is followed in an encoder and/or in a decoder, wherein sub-pictures are input to the algorithm in their bitstream or decoding order. According to an example, the algorithm for positioning sub-pictures within a picture area is the following: When a picture comprises multiple sub-pictures and when encoding of a picture and/or decoding of a coded picture is started, each CTU location in the reconstructed or decoded picture is marked as unoccupied. For each sub-picture in bitstream or decoding order, the sub-picture takes the next such unoccupied location in CTU raster scan order within a picture that is large enough to fit the sub-picture within the picture boundaries.

According to an example, an encoder indicates in or along the bitstream if the decoder is intended to output a collection of the different and separate decoded sub-pictures; or the decoder is intended to generate output pictures according to the picture composition data; or the decoder is allowed to perform either of the options above.

According to an example, a decoder decodes from or along the bitstream if the decoder is intended to output a collection of the different and separate decoded sub-pictures; or the decoder is intended to generate output pictures according to the picture composition data; or the decoder is allowed to perform either of the options above.

The decoder adapts its operation to conform to the decoded intent or allowance.

According to an example, a decoder includes an interface for selecting at least among outputting a collection of the different and separate decoded sub-pictures or generating output pictures according to the picture composition data. The decoder adapts its operation to conform to what has been indicated through the interface.

According to an example, pictures are divided into sub-pictures, tile groups and tiles. A tile may be defined similarly to an HEVC tile, thus a tile may be defined as a sequence of CTUs that cover a rectangular region of a picture. As discussed earlier, several types of tile groups, such as raster-scan-order tile groups and rectangular tile groups, may be available in a coding format, and an encoder may select which type is in use. A raster-scan-order tile group may be defined as a sequence of tiles in tile raster scan within a sub-picture. A rectangular tile group may be defined as a rectangular group of tiles within a sub-picture. It may be specified that A VCL NAL unit contains exactly one tile group, i.e. a tile group is contained in exactly one VCL NAL unit. A sub-picture may be defined as a rectangular set of one or more entire tile groups. According to an example, a picture is partitioned to sub-pictures, i.e. the entire picture is occupied by sub-pictures and there are no unoccupied areas within a picture. According to another example, a picture comprises sub-pictures and one or more unoccupied areas.

Figure 10:
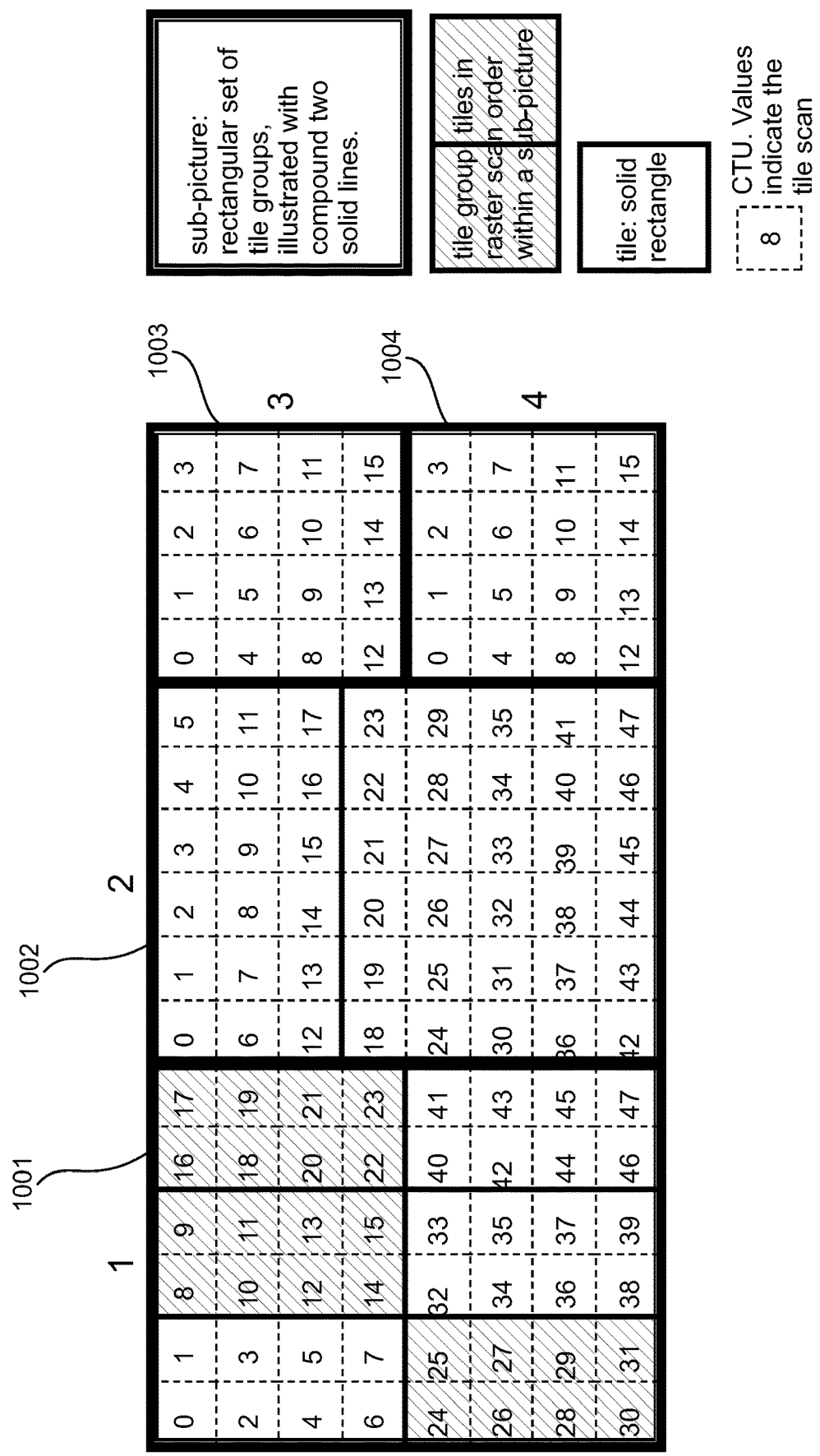
FIG. 10 shows an example of a picture that has been divided into four sub-pictures.

According to an example, an encoder encodes in or along the bitstream and/or a decoder decodes from or along the bitstream information indicative of one or more tile partitionings for sub-pictures. A tile partitioning may for example be a tile grid specified as widths and heights of tile columns and tile rows, respectively. An encoder encodes in or along a bitstream and/or a decoder decodes from or along the bitstream which tile partitioning applies for a particular sub-picture or sub-picture sequence. According to an example, syntax elements describing a tile partitioning are encoded in and/or decoded from a picture parameter set, and a PPS is activated for a sub-picture e.g. through a PPS identifier in a tile group header. Each sub-picture may refer to its own PPS and may hence have its own tile partitioning. For example, FIG. 10 illustrates a picture that is divided into 4 sub-pictures. Each sub-picture may have its own tile grid.

In this example sub-picture 1 is divided into a grid of 3×2 tiles of equal width and equal height, sub-picture 2 is divided into 2×1 tiles of 3 and 5 CTUs high. Each of sub-pictures 3 and 4 has only one tile. Sub-picture 1 has 3 tile groups containing 1, 3, and 2 tiles, respectively. Each of sub-pictures 2, 3, and 4 has one tile group.

FIG. 10 also illustrates the above-discussed algorithm for positioning sub-pictures within a picture area. Sub-picture 1 is the first in decoding order and thus placed in the top-left corner of the picture area. Sub-picture 2 is the second in decoding order and thus placed to the next unoccupied location in raster scan order. The algorithm also operates the same way for the third and fourth sub-pictures in decoding order, i.e. sub-pictures 3 and 4, respectively. The sub-picture decoding order is indicated with the number (1, 2, 3, 4) outside the picture boundaries.

According to an example, an encoder encodes in the bitstream and/or a decoder decodes from the bitstream, e.g. in an image segment header such as a tile group header, information indicative of one or more tile positions within a sub-picture. For example, a tile position of the first tile, in decoding order, of the image segment or tile group may be encoded and/or decoded. According to an example, a decoder concludes that the current image segment or tile group is the first image segment or tile group of a sub-picture, when the first tile of an image segment or tile group is the top-left tile of a sub-picture (e.g. having a tile address or tile index equal to 0 in raster scan order of tiles). According to an example, in relation to concluding a first image segment or tile group, a decoder concludes if a new access unit is started. According to an example, it is concluded that a new access is started when the picture order count value or syntax element value(s) related to picture order count (such as least significant bits of picture order count) differ from that of the previous sub-picture.

According to an example, decoded picture buffering is performed on picture-basis rather than on sub-picture basis. An encoder and/or a decoder generates a reference picture from decoded sub-pictures of the same access unit or time instance using the picture composition data. The generation of a reference picture is performed identically or similarly to what is described in other examples for generating output pictures. When a reference picture is referenced in encoding and/or decoding of a sub-picture, reference sub-pictures for encoding and/or decoding the sub-picture are generated by extracting the area collocating with the current sub-picture from the reference pictures in the decoded picture buffer. Thus, the decoding process gets reference sub-picture(s) from the decoded picture buffering process similarly to other examples, and the decoding process may operate similarly to other examples.

According to an example, an encoder selects reference pictures for predicting a current sub-picture in a manner that the reference pictures contain a sub-picture that has the same location as the current sub-picture (within the picture) and the same dimensions (width and height) as the current sub-picture. An encoder avoids selecting reference pictures for predicting a current sub-picture if the reference pictures do not contain a sub-picture that has the same location as the current sub-picture (within the picture) or the same dimensions as the current sub-picture. According to an example, sub-pictures of the same access unit or time instance are allowed to have different types, such as random-access sub-picture and non-random-access sub-picture, defined similarly to what has been described earlier in relation to NAL unit types and/or picture types. An encoder encodes a first access unit with both a random-access sub-picture in a first location and size and a non-random-access sub-picture in a second location and size, and a subsequent access unit in decoding order including a sub-picture in the first location and size constrained in a manner that reference pictures preceding the first access unit in decoding order are avoided, and including another sub-picture in the second location and size using a reference picture preceding the first access unit decoding order as a reference for prediction.

According to an example, for encoding and/or decoding a current sub-picture, an encoder and/or a decoder includes only such reference pictures into the initial reference picture list that contain a sub-picture that has the same location as the current sub-picture (within the picture) and the same dimensions (width and height) as the current sub-picture. Reference pictures that do not contain a sub-picture that has the same location as the current sub-picture (within the picture) or the same dimensions (width and height) as the current sub-picture are skipped or excluded for generating an initial reference picture list for encoding and/or decoding the current sub-picture. According to an example, sub-pictures of the same access unit or time instance are allowed to have different types, such as random-access sub-picture and non-random-access sub-picture, defined similarly to what has been described earlier in relation to NAL unit types and/or picture types. Reference picture list initialization process or algorithm in an encoder and/or a decoder only includes the previous random-access sub-picture and subsequent sub-pictures, in decoding order, in an initial reference picture list and skips or excludes sub-pictures preceding, in decoding order, the previous random-access sub-picture.

According to an example, a sub-picture at a second sub-picture sequence is predicted from one or more sub-pictures of a first sub-picture sequence. Spatial relationship of the sub-picture in relation to the one or more sub-pictures of the first sub-picture sequence is either inferred or indicated by an encoder in or along the bitstream and/or decoded by a decoder from or along the bitstream. In the absence of such spatial relationship information in or along the bitstream, an encoder and/or a decoder may infer that the sub-pictures are collocated, i.e. exactly overlapping for spatial correspondence in prediction. The spatial relationship information is independent of the picture composition data. For example, sub-pictures may be composed to be above each other in an output picture (in a top-bottom packing arrangement) while they are considered to be collocated for prediction.

According to an example, an encoder indicates a sub-picture sequence identifier or alike in or along the bitstream in a manner that the sub-picture sequence identifier is associated with coded video data units, such as VCL NAL units. According to an example, a decoder decodes a sub-picture sequence identifier or alike from or along the bitstream in a manner that the sub-picture sequence identifier is associated with coded video data units and/or the respective reconstructed sub-pictures. The syntax structure containing the sub-picture sequence identifier and the association mechanism may include but are not limited to one or more of the following:

A sub-picture sequence identifier included in a NAL unit header and associated with the NAL unit.

A sub-picture sequence identifier included in a header included in a VCL NAL unit, such as a tile group header or a slice header and associated with the respective image segment (e.g. tile group or slice).

A sub-picture sequence identifier included in a sub-picture delimiter, a picture header, or alike syntax structure, which is implicitly referenced by coded video data. A sub-picture delimiter may for example be a specific NAL unit that starts a new sub-picture. Implicit referencing may for example mean that the previous syntax structure (e.g. sub-picture delimiter or picture header) in decoding or bitstream order may be referenced.

A sub-picture sequence identifier included in a header parameter set, a picture parameter set or alike syntax structure, which is explicitly referenced by coded video data. Explicit referencing may for example mean that the identifier of the reference parameter set is included in the coded video data, such as in a tile group header or in a slice header.

According to an example, sub-picture sequence identifier values are valid within a pre-defined subset of a bitstream (which may be called "validity period" or "validity subset"), which may be but is not limited to one of the following:

A single access unit, i.e. coded video data for a single time instance.

A coded video sequence.

From a closed random-access access unit (inclusive) until the next closed random-access access unit (exclusive) or the end of the bitstream. A closed random-access access unit may be defined as an access unit within and after which all present sub-picture sequences start with a closed random-access sub-picture. A closed random-access sub-picture may be defined as an intra-coded sub-picture, which is followed, in decoding order, by no such sub-pictures in the same sub-picture sequence that reference any sub-picture preceding the intra-coded sub-picture, in decoding order, in the same sub-picture sequence. According to an example, a closed random-access sub-picture may either be an intra-coded sub-picture or a sub-picture associated with and predicted only from external reference sub-picture(s) (see an example described further below) and is otherwise constrained as described above.

The entire bitstream.

According to an example, sub-picture sequence identifier values are valid within an indicated subset of a bitstream. An encoder may for example include a specific NAL unit in the bitstream, where the NAL unit indicates a new period for sub-picture sequence identifiers that is unrelated to earlier period(s) of sub-picture sequence identifiers.

According to an example, a sub-picture with a particular sub-picture sequence identifier value is concluded to be within the same sub-picture sequence as a preceding sub-picture in decoding order that has the same sub-picture sequence identifier value, when both sub-pictures are within the same validity period of sub-picture sequence identifiers. When two pictures are on different validity periods of sub-picture sequence identifiers or have different sub-picture sequence identifiers, they are concluded to be in different sub-picture sequences.

According to an example, a sub-picture sequence identifier is a fixed-length codeword. The number of bits in the fixed-length codeword may be encoded into or along the bitstream, e.g. in a video parameter set or a sequence parameter set, and/or may be decoded from or along the bitstream, e.g. from a video parameter set or a sequence parameter set.

According to an example, a sub-picture sequence identifier is a variable-length codeword, such as an exponential-Golomb code or alike.

According to an example, an encoder indicates a mapping of VCL NAL units or image segments, in decoding order, to sub-pictures or sub-picture sequences in or along the bitstream, e.g. in a video parameter set, a sequence parameter set, or a picture parameter set. Likewise, according to an example, a decoder decodes a mapping of VCL NAL units or image segments, in decoding order, to sub-pictures or sub-picture sequence from or along the bitstream. The mapping may concern a single time instance or access unit at a time.

According to an example, several mappings are provided e.g. in a single container syntax structure and each mapping is indexed or explicitly identified e.g. with an identifier value.

According to an example, an encoder indicates in the bitstream, e.g. in an access unit header or delimiter, a picture parameter set, a header parameter set, a picture header, a header of an image segment (e.g. tile group or slice), which mapping applies to a particular access unit or time instance. Likewise, according to an example, a decoder decodes form the bitstream which mapping applies to a particular access unit or time instance. According to an example, the indication which mapping applies is an index to a list of several mappings (specified e.g. in a sequence parameter set) or an identifier to a set of several mappings (specified e.g. in a sequence parameter set). In another example, the indication which mapping applies comprises the mapping itself e.g. as a list of sub-picture sequence identifiers for VCL NAL units in decoding order included in the access unit associated with the mapping.

According to an example, the decoder concludes the sub-picture or sub-picture sequence for a VCL NAL unit or image segment as follows:

The start of an access unit is concluded e.g. as specified in a coding specification, or the start of a new time instance is concluded as specified in a packetization or container file specification.

The mapping applied to the access unit or time instance is concluded according to any earlier example.

For each VCL NAL unit or image segment in decoding order, the respective sub-picture sequence or sub-picture is concluded from the mapping.

An example is provided below with the following design decisions:

The mappings are specified in a sequence parameter set.

The mappings are specified to map VCL NAL units to sub-picture sequences.

Indicating which mapping applies for a particular access unit or time instance takes place in a tile group header.

It should be understood that other examples could be similarly realized with other design decisions, e.g. container syntax structures, mapping for image segments rather than VCL NAL units, and mapping for sub-pictures rather than sub-picture sequences.

In accordance with an example, a sub-picture may be a whole picture of a normal single view 2D video, wherein each picture has only one sub-picture, each part of a video (which may be known as a tile), each view of a (asymmetric) multiview or stereoscopic video, each layer of a multi-layer (scalable) video, each face of a multi-face 360-degree projection (e.g. cubemap), each part of a multi-resolution packing of a video (for example multi-resolution ERP or CMP), or each part of a point cloud projected onto a surface (texture or depth).

It may happen that identifier values clash when merging sub-picture sequences. This may happen because different encoders may be used to encode different parts of the content. For example, different encoders may be used to code the texture and geometry bitstreams of PCC content, or overlay and background video. The encoders might not provide sufficient configuration interfaces to control the use of sub-picture sequence identifiers or the use of the bitstreams as a sub-picture sequence(s) might not be even known at the time of encoding. Thus, bitstreams to be used as sub-picture sequences might use the same sub-picture sequence identifiers or the encoding of sub-picture sequence identifiers might have been disabled altogether. It may also be possible that bitstreams to be used as sub-picture sequences might use the same parameter set identifiers to reference parameter sets of different content.

Sub-picture sequences might need to use different sequence level parameters. For example, a texture bitstream might use 4:2:0 chroma format, whereas a corresponding depth bitstream might use 4:0:0 chroma format. The chroma format in use is coded in a sequence parameter set. Only one sequence parameter set is activated per a coded video sequence in H.264/AVC and per coded layer-wise video sequence (CLVS) in HEVC. A CLVS may be defined as a sequence of coded pictures with the same layer identifier value (i.e. the same nuh_layer_id value in HEVC), that consists, in decoding order, of a random-access picture of particular type(s) (in HEVC, an IRAP picture with NoRaslOutputFlag equal to 1) followed by all coded pictures, if any, up to but excluding the next random-access picture of particular type(s) (in HEVC, the next IRAP picture with NoRaslOutputFlag equal to 1).

Identifier value clashes could be avoided by rewriting identifier values when merging sub-picture sequences. However, such rewriting may be vulnerable particularly when the identifier is coded with codewords of variable length, such as ue(v) exp-Golomb code, the identifier appears in a bit location that might be affected by start code emulation prevention bytes, the identifier is preceded by variable-length-coded syntax elements, the identifier itself might cause start code emulation prevention byte inference (e.g. value 0), and/or the content is encrypted, and the identifier is a part of the encrypted part of the content.

Value range and bitrate for layer identifiers and/or sub-picture sequence identifiers might need to be relatively large. Some examples of a variety of use cases which could utilize sub-sequence merging are shortly listed in the following:

- The number of sub-pictures for viewport-dependent streaming of 3DoF 360-degree video might have to be relatively large. For example, it may be advantageous to use as much as 96 sub-pictures for achieving viewport-dependent delivery of 3DoF 360-degree video.
- A large number of sub-pictures might be beneficial also in volumetric video coding, such as video-based point cloud coding or 3DoF+ video coding. In volumetric video coding, the 3D content may be projected onto 2D patches, which may be arranged onto sub-pictures e.g. based on similar viewing cone. Moreover, in volumetric video coding several types of video, such as texture, geometry, occupancy, and different types attributes may be coded.
- Plenoptic or sub-aperture image/video coding, wherein one sub-picture may be coded per sub-aperture image.
- Super-multiview or windowed 6DoF video coding where the content is captured with tens of cameras.
- One or more 2D, 360-degree or volumetric video clips that overlay 360-degree background, which may be coded using sub-pictures for viewport-dependent delivery.
- Different versions of the content might be coded, e.g. for different bitrate, spatial resolution, picture rate, bit-depth, dynamic range, and/or color gamut. Since merging of sub-picture sequences from different versions might be preferred e.g. for viewport-dependent delivery and/or rate adaptation, they should potentially be associated with different sub-picture sequence identifiers.
- Enhancement layers of scalable video coding might be beneficial e.g. to provide selective enhancement capability for selected sub-picture sequences.

In H.264/AVC and HEVC, layer identifiers or alike are encoded in the NAL unit header. The relatively large value range of layer identifiers and/or sub-picture sequence identifiers is relatively costly for bitrate. Fixed-length codewords have been used in H.264/AVC and HEVC. To support a large variety of use cases e.g. 8 to 12 bits might be reserved for sub-picture sequence identifiers, and e.g. 4 to 6 bits for layer identifiers. It might be possible to combine both into a single identifier value, e.g. of 10 to 16 bits of length. However, when included in a NAL unit header, the identifier value(s) might require 2 bytes per NAL unit of additional storage compared to a coding system without sub-picture and layer support. E.g. for 96 sub-pictures at 60 Hz rate this would correspond to more than 90 kbps.

HEVC uses a 6-bit nuh_layer_id value, and layers may be independent non-base layers. While not specifically mentioned in the HEVC standard, it seems to be allowed to mark all scalability dimension identifiers equal to 0 for any layers, i.e. indicate that the layers are coded texture of the same view, are not auxiliary layers, and are not quality or spatial enhancement layers. This could be used to indicate that layers are used for sub-picture sequences. However, since only a 6-bit nuh_layer_id is used, sub-picture sequences cannot be mapped uniquely to nuh_layer_id values in many use cases (e.g. 96 sub-pictures for viewport-dependent 360-degree streaming). The number of simultaneously decoded sub-picture sequences is anyhow likely to be less than what the 6-bit nuh_layer_id value allows.

In an example, a delimiter is a delimiter NAL unit, which may be e.g. called a sub-picture sequence delimiter NAL unit or a decoding control NAL unit. It needs to be understood that embodiments apply regardless of the naming of the delimiter. The sub-picture sequence delimiter NAL unit may be specific but is not necessarily limited to carrying sub-picture related indications or controls, whereas more generic naming, such a delimiter NAL unit or a decoding control NAL unit may be used for any purposes, also including sub-picture related indications or controls. A delimiter may be a NAL unit when a basic unit in the bitstream syntax is a NAL unit. Embodiments are not limited to a delimiter being a NAL unit, but it could be any syntax structure in a video bitstream, such as an access unit header or alike or a part thereof. Terms delimiter, delimiter NAL unit, sub-picture sequence delimiter, and decoding control NAL unit are used interchangeably.

An access unit delimiter NAL unit is an example of a delimiter NAL unit. A draft version of the VVC standard specifies an access unit delimiter (AUD) RBSP that is contained in an access unit delimiter (AUD) NAL unit with the following syntax:

|  | Descriptor |
|---|---|
| access_unit_delimiter_rbsp( ) { |  |
|     aud_irap_or_gdr_au_flag | u(1) |
|     aud_pic_type | u(3) |
|     rbsp_trailing_bits( ) |  |
| } |  |

In a draft version of the VVC standard, the AU delimiter (AUD) is used to indicate the start of an access unit (AU), whether the AU is an IRAP or gradual decoding refresh (GDR) AU, and the type of slices present in the coded pictures in the AU containing the AU delimiter NAL unit. audirap_or_gdr_au_flag equal to 1 specifies that the AU containing the AU delimiter is an IRAP or GDR AU. aud_irap_or_gdr_au_flag equal to 0 specifies that the AU containing the AU delimiter is not an IRAP or GDR AU. It may be required that a coded video sequence starts with an IRAP or GDR AU. An IRAP AU may be defined as an AU where all layers are present and contain an IRAP picture. A GDR AU may be defined as an AU where all layers are present and contain a GDR picture. aud_pic_type indicates allowed slice types among I (intra-coded), P (inter-coded with uni-prediction), and B (inter-coded with bi-prediction) slices.

In accordance with an example, a pre-defined sub-picture sequence identifier value (e.g. 0) is specified to pertain to all sub-picture sequences. A sub-picture sequence delimiter with sub-picture sequence identifier equal to 0 may be used e.g. to precede a parameter set NAL unit that applies to all sub-picture sequences. For example, when encoding is done with the same encoder with the same encoding configuration and all sub-pictures have the same width and height, they may share the same sequence parameter sets (SPSs) and picture parameter sets (PPSs).

According to an embodiment, which may be used together with or independently of other embodiments, a specific layer identifier value is reserved for information not specific to any particular layer, applying to the entire bitstream or across all layers, and/or for NAL units (or alike) for which assignment to any particular layer is not meaningful. VCL NAL units (or such coded video data) is not assigned to this layer identifier. For example, an end of bitstream NAL unit and/or an access unit delimiter NAL unit could be assigned to the specific layer identifier. A decoding control NAL unit, as described in other embodiments, could be assigned to the specific layer identifier or when the controls carried in the decoding control NAL unit are not specific to any particular layer, applying to the entire bitstream or across all layers. Parameter set NAL units that are shared across layers and/or across bitstreams (from which parts, such as independently coded picture region sequences, can be merged to a single bitstream) may be assigned to the specific layer identifier, e.g. to avoid identifier value clashes.

In accordance with an embodiment, the sub-picture sequence delimiter is used to pass other information to the decoder, wherein the other information may comprise but is not limited to one or more of the following:

information inherently carried in the systems (e.g. file format, media presentation, and/or communication protocol), information controlled or caused by the client device, player application, or alike entity, which may affect the decoding process.

The information controlled or caused by the client device, player application, or alike entity, which may affect the decoding process, may comprise but is not limited to the following:

Indication to treat the associated NAL unit(s) or coded picture as a start of a coded video sequence. This may be used for example with open-GOP intra pictures (e.g. CRA pictures of HEVC), when decoding is (re-)started from the open-GOP intra picture. For example, the HEVC decoding process inputs an externally controlled flag HandleCraAsBlaFlag, which could be included in the delimiter NAL unit.

Indication to treat the associated NAL unit(s) or coded picture as a start of a new constituent bitstream.

Indication to treat the associated NAL unit(s) or coded picture as a start of decoding of a predicted layer after layer up-switching.

Indication of an end of a coded video sequence. In this case, the delimiter NAL unit need not pertain to any subsequent NAL units.

Indication of an end of a constituent bitstream. In this case, the delimiter NAL unit need not pertain to any subsequent NAL units.

Indication of an end of a predicted layer (e.g. caused by layer down-switching). In this case, the delimiter NAL unit need not pertain to any subsequent NAL units.

Indication that pictures (of the sub-picture sequence) whose output time is subsequent to the decoding of a picture with which the information is associated are not output. This functionality is similar to what no_output_of_prior_pics_flag equal to 1 achieves in HEVC.

Some approaches are based on adding new data units (e.g. delimiter NAL units) into the merged bitstream after encoding of the constituent bitstreams. Buffering parameters (e.g. HRD parameters) may be authored for the constituent bitstreams and hence do not take the added data units into account. In an example, it is specified that the buffering model checks the type of a data unit. If the data unit is among those that are or may be added to the merged bitstream (e.g. delimiter NAL unit), the buffering model does not include it in the coded picture buffer or alike. Otherwise, if the data unit is not among those that are or may be added to the merged bitstream, the buffering model adds the data unit in the coded picture buffer or alike.

According to an embodiment, the operation of a client device, a player application, or similar entity (for example, an entity on the edge network) comprises the following steps.

Figure 8A:
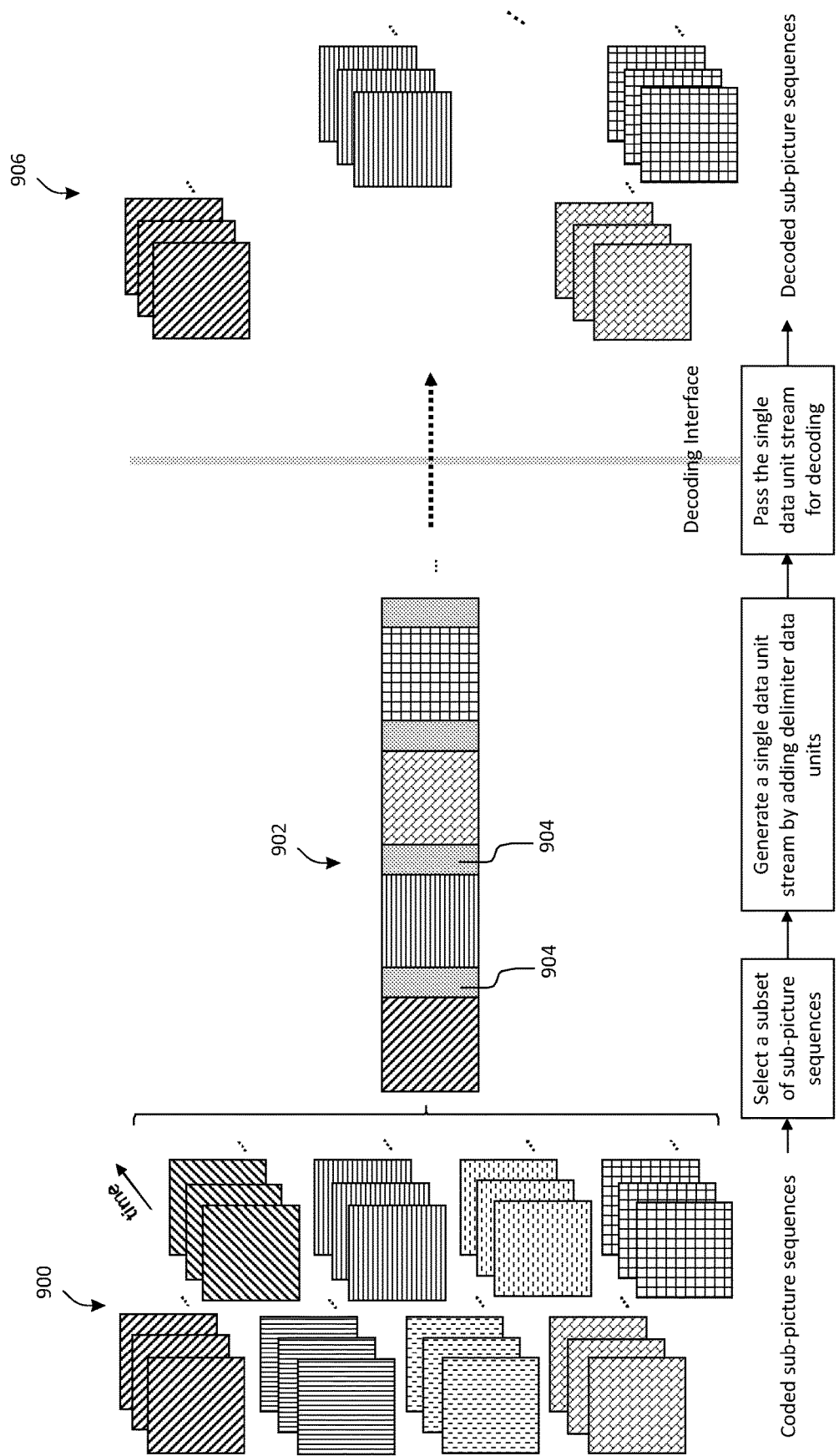
FIG. 8a illustrates an example of using delimiters according to an example.

Two or more bitstreams are selected among a multitude of bitstreams 900 (FIG. 8*a*). The bitstreams may be sub-picture sequences. The selected bitstreams may be referred to as constituent bitstreams. The selection of a bitstream may, for example, comprise selecting and parsing a track (within a container file) that carries the bitstream. Instead or additionally, the selection may comprise selecting a Representation of a Media Description, the Representation corresponding to the track carrying the bitstream, and requesting data, such as (Sub)segments or data units, of the Representation from a server and receiving requested data.

Figure 8B:
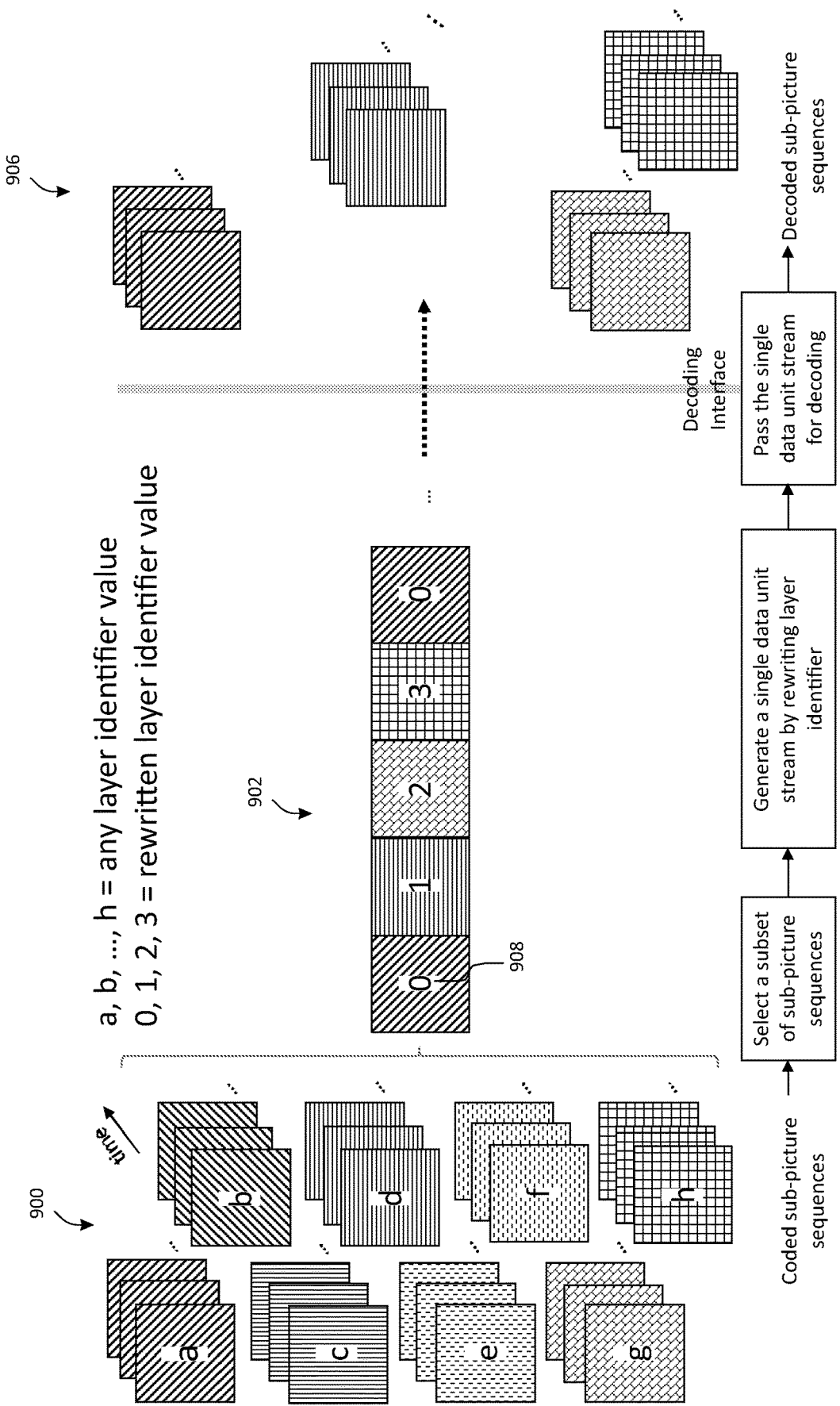
FIG. 8b illustrates an example of rewriting layer identifier values according to an example.

The bitstreams are combined into a single merged bitstream 902 or merged data unit stream. As a part of the combining process, delimiters 904 may be written into the merged bitstream 902, wherein the delimiters 904 indicate the bitstream to which the data units associated with the delimiter are assigned. A delimiter may be, for example, a delimiter data unit, such as a delimiter NAL unit or a sub-picture header, or a layer identifier 908 (FIG. 8*b*). The delimiter data unit approach may be used e.g. when the coding system does not inherently enable the use of layers or sub-picture sequences. In the layer identifier approach the layer identifier may be present e.g. in the NAL unit header. This approach may be used e.g. when the coding system enables the use of independent non-base layers similarly to HEVC.

When an entity on the edge network performs the above-described steps, that entity may act as an endpoint of a session, such as a client of DASH streaming session. Another session may be present between the decoder entity and the entity on the edge network, wherein a different set of communication protocols may be in use.

A data unit in a data unit stream may be but is not limited to be one of the following: a NAL unit, a coded picture, a group of pictures.

Figure 9:
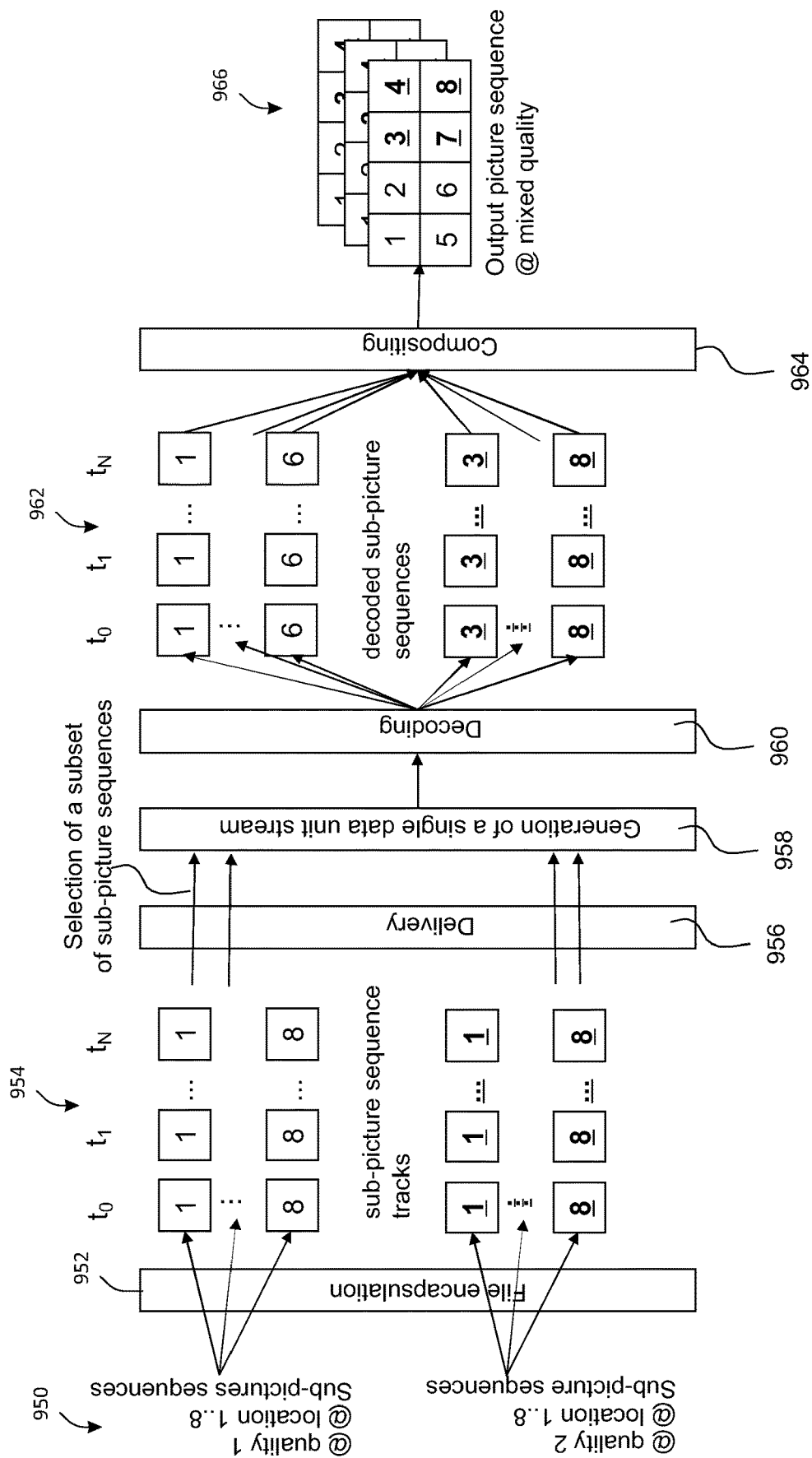
FIG. 9 shows an example of tile-based omnidirectional video streaming, where two sub-picture sequences having different quality are encapsulated into sub-picture sequence tracks, in accordance with an example.

FIG. 9 illustrates an arrangement where two sub-picture sequences 950 having different quality are encapsulated 952 into sub-picture sequence tracks 954 and delivered 956 to a client device or to a cloud service, for example. The sub-pictures of the second sub-picture sequence track (depicted at the bottom of the figure as squares with bolded and underlined numbers) have different quality (quality 2) than sub-pictures of the first sub-picture sequence track (depicted at the top of the figure as squares with numbers without bolding and underlining). The client device generates 958 a single data unit stream from selected sub-picture sequences and includes delimiters into appropriate places. Data units of the single data unit stream are decoded 960 to a plurality of decoded sub-picture sequences 962. The decoded sub-picture sequences 962 are composited 964 to output picture sequences 966 having mixed quality. In the illustration of these output picture sequences 966 in FIG. 9 the sub-picture sequences originating from the second sub-picture sequence track are depicted as squares with bolded and underlined numbers.

In accordance with an embodiment, an encoder generates a delimiter data unit into a constituent bitstream. In accordance with another embodiment, another entity, such as a receiver, rewrites the content of the delimiter data unit as described in other embodiments.

In the following, an example embodiment is provided for indicating that independently coded picture regions originating from different types of coded pictures (e.g. non-IRAP and IRAP pictures) in the same coded picture of the merged bitstream.

In an embodiment, the player includes in a separate data unit of the merged bitstream, such as in a decoding control NAL unit, an indication whether the associated coded picture comprises independently coded picture regions originating from different types of coded pictures (e.g. non-IRAP and IRAP pictures) or whether the associated coded picture comprises VCL NAL units of different types, such as TRAIL and any IRAP NAL unit types. The indication may be referred to as a mixed picture type indication, and the coded picture associated with mixed picture type indication indicative of independently coded picture regions originating from different types of pictures or of a coded picture having VCL NAL units of different types may be considered to having or being associated with the mixed picture type property.

In an embodiment, a decoder decodes from said separate data unit the indication and uses the information provided by the indication to control further decoding of said separate data unit e.g. as follows.

In an embodiment, when the indication indicates that the coded picture has the mixed picture type property, the decoder decodes that the coded picture is decoded like a trailing picture. Hence, the decoder subsequently may decode the coded picture like a trailing picture.

In an embodiment, when the indication indicates that the coded picture has the mixed picture type property, the decoder decodes that a picture order count (POC) for the coded picture is decoded like a trailing picture, the POC for the coded picture is derived with a pre-defined algorithm relative to the POC of the previous reference picture at temporal sub-layer 0. Hence, the decoder subsequently may decode the coded picture like a trailing picture and derives the POC with the pre-defined algorithm relative to the POC of the previous reference picture at temporal sub-layer 0.

In an embodiment, when the indication indicates that the coded picture does not have the mixed picture type property, the decoder decodes from said separate data unit that reference picture marking is performed according to the reference picture list structure(s) and/or reference picture set structure(s) included in or referenced by any image segment, such as slice, of the coded picture. It is remarked that this also applies to image segments of types that would conventionally cause specific marking of reference pictures, such as marking all reference pictures as "unused for reference" caused by the IDR NAL unit type(s).

In accordance with an embodiment, a delimiter, such as a sub-picture sequence delimiter or an access unit delimiter, or a decoding control NAL unit is used to pass bitstream scalability properties to the decoder, which may comprise, but need not be limited to, one or more of the following:

Indication of the highest temporal sublayer of the pictures within the scope of the delimiter.

Indication whether all pictures within the scope of the delimiter are IRAP and/or GDR pictures.

Indication which layers are or may be present within the scope of the delimiter.

Indication which output layer set the bitstream represents. Layers that are not present in the indicated output layer set are not present in the bitstream.

In an embodiment, the scope of an access unit delimiter in an IRAP or GDR AU is defined to be the coded video sequence that starts with the AUD.

Advantages of passing bitstream scalability properties within a delimiter or a decoding control NAL unit to the decoder include but are not limited to one or more of the following:

Decoder interfaces might not provide specific means to pass bitstream scalability properties from the application to the decoder but only provide an interface for passing the video bitstream. Thus, including the bitstream scalability properties within the bitstream might be the only means to pass them to the decoder.

A network entity, such as a media mixer, may prune layers or sublayers from the bitstream before forwarding it to a receiver. The network entity might not have an out-of-band interface with the receiving decoder to indicate the bitstream scalability properties of the forwarded bitstream. Thus, including the bitstream scalability properties within the bitstream might be the only means to pass them from the network entity to the decoder.

When a decoder is capable of decoding some but not all sublayers, layers, and/or OLSs, which may be indicated in the VPS, the knowledge of the sublayers, layers, and/or OLSs represented by the bitstream would enable an application to conclude whether sub-bitstream extraction is required before passing the bitstream to the decoder. Some decoders may require the bitstream given as input to represent exactly the indicated OLS and the indicated highest temporal sublayer.

A sub-bitstream extraction process may take a target OLS as input and remove those pictures from non-output layers that are not needed for decoding the pictures at output layers of the target OLS. A subsequent sub-bitstream extraction might no longer be possible (since some layers are no longer present in the bitstream) or might not result into a desirable bitstream (since many temporal sublayers were removed in the previous sub-bitstream extraction). Thus, the knowledge of the OLS and highest temporal sublayer represented by a bitstream would enable concluding whether sub-bitstream extraction with certain target OLS and highest temporal sublayer as inputs is possible and reasonable.

Decoder operation may benefit from knowing the layers or OLS represented by the bitstream and/or the highest sublayer present in the bitstream. Passing respective bitstream scalability properties within a delimiter or a decoding control NAL unit to the decoder may consequently have one or more of the following advantages. Similarly, embodiments are specified for decoding the bitstream scalability properties and inferring respective decoder actions as discussed in any one or more of the following bullets.

- With the knowledge of the OLS represented by the bitstream, the decoding process can conclude which layers are output layers and thus output the correct pictures.
- A picture storage buffer may be defined as a memory space that is used to store one decoded picture in the DPB. It may be specified that all picture storage buffers have the same width and height (in terms of samples), the same bit depth, and/or the same chroma format. If pictures in different layers have different width in samples, height in samples, bit depth, or chroma format, it may be specified that the picture storage buffers are reserved with the maximum values among the layers in an OLS. With the knowledge of the OLS represented by the bitstream, the decoder can conclude the width, the height, the bit depth and/or the chroma format to be reserved for the picture storage buffers of the DPB.
- HRD parameters, such as initial buffering delays, may depend on which OLS is represented by the bitstream and/or which sublayers are present. With the knowledge of the OLS represented by the bitstream and/or sublayers present in the bitstream, a decoder can select the HRD parameters applicable to the bitstream. The decoder may consequently use the indicated HRD parameters, such as the initial buffering delay, to control the CPB and/or DPB used in the decoder.

In the following, an example embodiment for an access unit delimiter NAL unit is provided. The following syntax may be used:

|  | Descriptor |
|---|---|
| access_unit_delimiter_rbsp( ) { |  |
|   aud_irap_or_gdr_au_flag | u(1) |
|   aud_pic_type | u(3) |
|   if( aud_irap_or_gdr_au_flag ) { |  |
|     aud_htid_info_present_flag | u(1) |
|     aud_ols_info_present_flag | u(1) |
|     if( aud_htid_info_present_flag ) |  |
|       aud_cvs_htid_plus1 | u(3) |
|     if( aud_ols_info_present_flag ) |  |
|       aud_cvs_ols_idx | ue(v) |
|   } |  |
|   rbsp_trailing_bits( ) |  |
| } |  |

The semantics of aud_irap_or_gdr_au_flag and aud_pic_type are described earlier. The semantics of other syntax elements may be specified as follows.

aud_htid_info_present_flag equal to 0 specifies that aud_cvs_htid_plus1 is not present in the AUD NAL unit. aud_htid_info_present_flag equal to 1 specifies that aud_cvs_htid_plus1 is present in the AUD NAL unit.

aud_ols_info_present_flag equal to 0 specifies that aud_cvs_ols_idx is not present in the AUD NAL unit. aud_ols_info_present_flag equal to 1 specifies that aud_cvs_ols_idx is present in the AUD NAL unit.

aud_cvs_htid_plus1 equal to 0 specifies that all the pictures in the CVS starting with the AUD NAL unit are IRAP pictures or GDR pictures with ph_recoverypoc_cnt equal to 0. aud_cvs_htid_plus1 greater than 0 specifies that all the pictures in the CVS starting with the AUD NAL unit have TemporalId less than aud_cvs_htid_plus1.

aud_cvs_ols_idx specifies that the CVS starting with the AUD NAL unit does not contain any other layers than those included in the OLS with OLS index equal to aud_cvs_ols_idx.

It needs to be understood that other example embodiments could be similarly derived. For example, the two gating flags (aud_htid_info_present_flag and aud_ols_info_present_flag) may be replaced by a single gating flag (gating both aud_cvs_htid_plus1 and aud_cvs_ols_idx) or may be removed altogether (causing aud_cvs_htid_plus1 and aud_cvs_ols_idx be present when aud_irap_or_gdr_au_flag is equal to 1). In another example, only highest temporal sublayer or OLS signalling but not both are included in the syntax. In yet another example, a syntax element aud_cvs_htid is used instead of aud_cvs_htid_plus1 and specifies that all the pictures in the CVS starting with the AUD NAL unit have TemporalId less than or equal to aud_cvs_htid. It also needs to be noticed that data types for syntax elements need not be those presented in the example embodiment; for example, u(8) could be used instead of ue(v) for aud_cvs_ols_idx. Furthermore, it needs to be understood that the semantics of the syntax elements are provided as examples and embodiments similarly apply to other similar semantics. For example, aud_cvs_ols_idx may be specified to be the OLS index that was used to create the bitstream from the input bitstream using a specified sub-bitstream extraction process.

In an embodiment, a sub-bitstream extraction process may have inputs a bitstream inBitstream as well as a target OLS index targetOlsIdx and/or a target highest TemporalId value tIdTarget, and outputs a sub-bitstream outBitstream. The sub-bitstream extraction process inserts the targetOlsIdx and/or the highest TemporalId given as input to the process in the delimiter(s), such as access unit delimiter(s), or decoding control NAL units in outBitstream.

In an embodiment, a sub-bitstream extraction process may have inputs a bitstream inBitstream, a target OLS index targetOlsIdx, and a target highest TemporalId value tIdTarget, and outputs a sub-bitstream outBitstream, and comprises one or more of the following steps to derive the output sub-bitstream OutBitstream:

The bitstream outBitstream is set to be identical to the bitstream inBitstream.

Remove from outBitstream all NAL units with TemporalId greater than tIdTarget.

Remove from outBitstream all NAL units with nal_unit_type not equal to any of VPS_NUT, DCI NUT, AUD NUT, and EOBNUT and with nuh_layer_id not included the target OLS.

Remove from outBitstream all VCL NAL units that are not in output layers of the target OLS and are either non-IRAP pictures (when only IRAP pictures are used as inter-layer reference pictures for other layers in the OLS) or are in sublayers that are not used as reference for inter-layer prediction (when only up to a certain sublayer is used as reference for inter-layer prediction).

When all VCL NAL units of an AU are removed by any derivation step above and an AUD NAL unit is present in the AU, remove the AUD NAL unit from outBitstream.

When all the picture units (PUs) of an AU in outBitstream are GDR PUs or all the PUs of an AU in outBitstream are IRAP PUs, the following applies:

If multiple layers are or may be present (e.g. if vps_max_layers_minus1 is greater than 0) and the AU in outBitstream does not contain an AUD NAL unit, an AUD NAL unit is added in outBitstream as the first NAL unit of the AU, with aud_i-rap_or_gdr_au_flag equal to 1.

Otherwise, if the AU in outBitstream contains an AUD NAL unit, the value of aud_irap_or_gdr_au_flag is set equal to 1 in the AUD NAL unit.

Set the syntax element values of each AUD NAL unit with aud_irap_or_gdr_au_flag equal to 1 as follows (or similarly, depending on which syntax option is in use):
aud_htid_info_present_flag is set equal to 1.
aud_ols_info_present_flag is set equal to 1.
aud_cvs_htid_plus1 is set equal to tIdTarget+1.
aud_cvs_ols_idx is set equal to targetOlsIdx.

In the following, an example embodiment for decoding control NAL unit is provided.

In an embodiment, the syntax of the decoding control NAL unit contains at least gating flags for the presence of respective control syntax elements in the same decoding control NAL unit and/or control syntax elements. The control syntax elements may include but are not limited to one or more of target_layer_id, highest_temporal_id, handle_as_cvs_start_flag, no_output_of_prior_pics_flag and/or signalled_slice_id_flag.

The semantics of these control syntax elements may be as follows, in accordance with an embodiment:

The target_layer_id is the identifier of the layer that is to be decoded.

The output layer set index of the OLS that is to be decoded.

The highest_temporal_id is the identifier of the highest sub-layer that is to be decoded.

The handle_as_cvs_start_flag indicates if the associated picture (e.g. a CRA or GRA picture) is treated as a picture that starts a CLVS.

The no_output_of_prior_pics_flag, when equal to 1, specifies that the pictures whose output time precedes the decoding time of the associated IDR picture are not output.

The signalled_slice_id_flag, when equal to 0, specifies that the slice_address syntax element (or any similar syntax elements specifying an identifier for a slice within a slice header or an identifier for an independently coded picture region within its header, such as slice header) starts from 0 and increments by 1 for each slice within a coded picture in decoding order. When the signalled_slice_id_flag is equal to 1, it specifies the values of the slice_address syntax elements in decoding order. When the signalled_slice_id_flag is equal to 1, the following syntax elements are additionally present: deco_slice_id_length_minus1, deco_slices_in_pic_minus1 and slice_id[i].

The semantics of these additional control syntax elements may be as follows, in accordance with an embodiment:

The deco_slice_id_length_minus1 is indicative of the length of the slice_id[i] fixed-length-coded syntax element.

The deco_slices_in_pic_minus1 is indicative of the number of rectangular slices within a picture.

The slice_id[i], which is present for each rectangular slice of a picture, indexed with I, comprises the value of the slice_address syntax element in decoding order.

The following syntax may be used in this embodiment. It needs to be understood that the syntax may be tailored similarly depending on which control syntax elements are included in the embodiment. It also needs to be understood that the order of gating flags and control syntax elements could be selected differently. For example, a gating flag could immediately precede the respective control syntax element in the syntax. It needs to be understood that the embodiment may be realized with only a subset of the presented syntax and semantics, for example the subset related to slices. It also needs to be understood that while the example embodiment is described in relation to rectangular slices (with boundaries treated like picture boundaries) as a means to achieve independently decodable picture regions, the syntax and semantics could be similarly applied to other means, such as sub-pictures. For example, the sub-picture identifier values in a certain order (e.g. picture raster scan order of the top-left location of sub-pictures) could be indicated in the decoding control NAL unit.

|  | Descriptor |
|---|---|
| decoding_control_rbsp( ) { |  |
|   target_lid_present_flag | u(1) |
|   highest_tid_present_flag | u(1) |
|   handle_as_cvs_start_present_flag | u(1) |
|   no_output_of_prior_pics_present_flag | u(1) |
|   slice_id_signalling_present_flag | u(1) |
|   vcl_nal_unit_info_present_flag | u(1) |
|   control_extension_flag | u(1) |
|   if( target_lid_present_flag ) |  |
|     target_layer_id | u(7) |
|   if( highest_tid_present_flag ) |  |
|     highest_temporal_id | u(3) |
|   if( handle_as_cvs_start_present_flag ) |  |
|     handle_as_cvs_start_flag | u(1) |
|   if( no_output_of_prior_pics_present_flag ) |  |
|     no_output_of_prior_pics_flag | u(1) |
|   if( slice_id_signalling_present_flag ) { |  |
|     signalled_slice_id_flag | u(1) |
|   if( signalled_slice_id_flag ) { |  |
|     deco_slice_id_length_minus1 | ue(v) |
|     deco_slices_in_pic_minus1 | ue(v) |
|     for( i = 0; i <= deco_slices_in_pic_minus1; i++ ) |  |
|       slice_id[ i ] | u(v) |
|     } |  |
|   } |  |
|   if( vcl_nal_unit_info_present_flag ) |  |
|     mixed_vcl_nal_unit_types_flag | u(1) |
|   if( control_extension_flag ) |  |
|     while(more_rbsp_data( ) ) |  |
|       control_extension_data_flag | u(1) |
|   rbsp_trailing_bits( ) |  |
| } |  |

The gating flags specify the presence of the respective control syntax elements. The semantics of the gating flags may be specified as follows:

target_lid_present_flag equal to 0 specifies that target_layer_id is not present, and target_lid_present_flag equal to 1 specifies that target_layer_id is present.

highest_tid_present_flag equal to 0 specifies that highest_temporal_id is not present, and highest_tid_present_flag equal to 1 specifies that highest_temporal_id is present.

handle_as_cvs_start_present_flag equal to 0 specifies that handle_as_cvs_start_flag is not present, and handle_as_cvs_start_present_flag equal to 1 specifies that handle_as_cvs_start_flag is present.

no_output_of_prior_pics_present_flag equal to 0 specifies that no_output_of_prior_pics_flag is not present, and no_output_of_prior_pics_present_flag equal to 1 specifies that no_output_of_prior_pics_flag is present.

slice_id_signalling_present_flag equal to 0 specifies that signalled_slice_id_flag is not present, and slice_id_signalling_present_flag equal to 1 specifies that signalled_slice_id_flag is present.

vcl_nal_unit_info_present_flag equal to 0 specifies that mixed_vcl_nal_unit_types_flag is not present, and vcl_nal_unit_info_present_flag equal to 1 specifies that mixed_vcl_nal_unit_types_flag is present.

control_extension_flag equal to 0 specifies that no control_extension_data_flag syntax elements are present in the decoding control RBSP syntax structure. When control_extension_flag equals to 1, it specifies that there are control_extension_data_flag syntax elements present in the decoding control RBSP syntax structure.

The semantics of the control syntax elements may be specified as follows. In the semantics, the coded picture associated with this decoding control NAL unit is the coded picture that is contained in the access unit that contains this decoding control NAL unit and has the same NuhLayerId value as this decoding control NAL unit.

target_layer_id, when present, specifies the value of TargetLayerId that applies from the access unit containing this decoding control RBSP up to but excluding the next access unit, in decoding order, containing a decoding control NAL unit with target_layer_id. When no decoding control NAL unit with target_layer_id is present in the first access unit of the bitstream, TargetLayerId is set equal to vps_included_layer_id[0] from the beginning of the bitstream up to but excluding the first access unit, in decoding order, containing a decoding control NAL unit with target_layer_id. When present in multiple decoding control NAL units in an access unit, all target_layer_id values in the access unit shall be the same. A decoding control NAL unit with target_layer_id shall not be present in an access unit that is not a CVSS access unit.

highest_temporal_id, when present, specifies the value of HighestTid that applies from the access unit containing this decoding control RBSP up to but excluding the next access unit, in decoding order, containing a decoding control NAL unit with highest_temporal_id. When no decoding control NAL unit with highest_temporal_id is present in the first access unit of the bitstream, HighestTid is set equal to sps_max_sub_layers_minus1 from the beginning of the bitstream up to but excluding the first access unit, in decoding order, containing a decoding control NAL unit with highest_temporal_id. When present in multiple decoding control NAL units in an access unit, all highest_temporal_id values in the access unit shall be the same. A decoding control NAL unit with highest_temporal_id shall not be present in an access unit that is not a CVSS access unit.

handle_as_cvs_start_flag, when present, specifies the value of HandleAsCvsStartFlag for the coded picture associated with this decoding control NAL unit. When the coded picture associated with this decoding control NAL unit is not an IRAP picture and is not a GRA picture, handle_as_cvs_start_flag shall not be present. When multiple decoding control NAL units containing handle_as_cvs_start_flag and having the same value of NuhLayerId are present in an access unit, all handle_as_cvs_start_flag values in these decoding control NAL units shall be the same. When no decoding control NAL unit with handle_as_cvs_start_flag equal to 1 is associated with a coded picture, HandleAsCvsStartFlag is set equal to 0 for the coded picture.

no_output_of_prior_pics_flag, when present, specifies the value of NoOutputOfPriorPicsFlag for coded picture associated with this decoding control NAL unit. When the coded picture associated with this decoding control NAL unit is not an IDR picture, no_output_of_prior_pics_flag shall not be present. When multiple decoding control NAL units containing no_output_of_prior_pics_flag and having the same value of NuhLayerId are present in an access unit, all no_output_of_prior_pics_flag values in these decoding control NAL units shall be the same.

When slice_id_signalling_present_flag is equal to 1 in a decoding control NAL unit with a particular NuhLayerId value, signalled_slice_id_flag, deco_slice_id_length_minus1 (when present), deco_slices_in_pic_minus1 (when present), and slice_id[i] (when present) apply to the coded pictures with that particular NuhLayerId value from the access unit containing this decoding control NAL unit up to but excluding the next access unit, in decoding order, containing a decoding control NAL unit with the same particular NuhLayerId value and with slice_id_signalling_present_flag equal to 1 or the end of the CLVS, whichever is earlier in decoding order. The following semantics apply:

signalled_slice_id_flag equal to 0 specifies that deco_slice_id_length_minus1, deco_slices_in_pic_minus1, and slice_id[i] are not present. signalled_slice_id_flag equal to 1 specifies that deco_slice_id_length_minus1, deco_slices_in_pic_minus1, and slice_id[i] are present.

deco_slice_id_length_minus1 plus 1 specifies the number of bits used to represent the syntax element slice_id[i]. The value of deco_slice_id_length_minus1 shall be in the range of 0 to 15, inclusive. The value of deco_slice_id_length_minus1 associated with a coded picture shall be equal to signalled_slice_id_length_minus1 in the active SPS or PPS for the same coded picture.

deco_slices_in_pic_minus1 plus 1 specifies the number of slice_id[i] syntax elements. The value of deco_slices_in_pic_minus1 associated with a coded picture shall be equal to num_slices_in_pic_minus1 in the active SPS or PPS for the same coded picture.

slice_id[i] specifies the slice ID of the i-th slice. The length of the slice_id[i] syntax element is deco_slice_id_length_minus1+1 bits. When not present, the value of slice_id[i] is inferred to be equal to i, for each i in the range of 0 to num_slices_in_pic_minus1, inclusive.

mixed_vcl_nal_unit_types_flag is used to derive the variable mixedVclNalUnitTypesFlag. The variable mixedVclNalUnitTypesFlag, which identifies that all the VCL NAL units of CurrPic have the same NalUnitType value (when equal to 0) or that VCL NAL units of the associated coded picture may have different NalUnitType values, is specified as follows:

If a decoding control NAL unit with vcl_nal_unit_info_present_flag equal to 1 is present in the access unit containing CurrPic, the variable mixedVclNalUnitTypesFlag is set equal to the value of mixed_vcl_nal_unit_types_flag of the decoding control NAL unit. Otherwise, mixedVclNalUnitTypesFlag is set equal to 0.

mixedVclNalUnitTypesFlag may be treated as follows in the decoding process:

When mixedVclNalUnitTypesFlag is equal to 1, variables and functions relating to picture order count are derived by treating the current picture as a TRAIL picture regardless of the NalUnitType value. This needs to be invoked only for the first slice of a picture.

When mixedVclNalUnitTypesFlag is equal to 0, the decoding process for reference picture marking is invoked, wherein reference pictures may be marked as "unused for reference" or "used for long-term reference". This needs to be invoked only for the first slice of a picture. The reference picture marking process may keep all pictures included in reference picture lists included in or referenced by the slice header as "used for reference" and mark all the other pictures (not included in the reference picture lists) as "unused for reference".

control_extension_data_flag may have any value. Decoders may ignore all control_extension_data_flag syntax elements.

Embodiments have been presented above for access unit delimiter and decoding control NAL units containing different syntax elements. It needs to be understood that embodiments can be similarly realized with any combinations of syntax elements from any of the above example embodiments.

In an embodiment, the syntax of the decoding control NAL unit contains one or more of the following:

A type syntax element (e.g. called control_type), which has specified values, wherein each specified value specifies which type of decoding control is included in this NAL unit.

A syntax element carrying the value(s) of the control of the indicated type, e.g. called control_value. The data type of the syntax element may be specified according to the type value.

Extension bits, which may be used e.g. to extend the pre-defined length of the control_value syntax element.

The following syntax may be used in this embodiment:

|  | Descriptor |
| --- | --- |
| decoding_control_rbsp( ) { |  |
|    control_type | u(8) |
|    control_value | u(7) |
|    control_extension_flag | u(1) |
|    if( control_extension_flag ) |  |
|      while( more_rbsp_data( ) ) |  |
|         control_extension_data_flag | u(1) |
|    rbsp_trailing_bits( ) |  |
| } |  |

The encoding of all source bitstreams may be done in a manner that enables extraction of independently coded picture regions from source bitstream and merging to the same merged bitstream. As a consequence, the encoding may result into SPS(s) and PPS(s) of all source bitstreams to be identical except for:

level (e.g. in SPS),
picture width and height (e.g. in SPS),
partitioning of pictures to image segments, such as tile/brick partitioning (e.g. in PPS),
positioning and size of independently coded picture regions, such as the rectangular slice position and size information, when rectangular slices are used as independently coded picture regions (e.g. in PPS),
assignment of independently coded picture regions e.g. using their IDs to the indicated positions, e.g. the slice ID assignment when rectangular slices are used as independently coded picture regions (e.g. in PPS).

The slice ID assignment to rectangular slices (in PPS) is regarded as one valid option that could be used as the positioning information for independently coded picture regions. However, the contribution generally applies to any kinds of positioning information that enables indicating spatial locations of independently coded picture regions and/or association of values of slice ID, sub-picture ID or any similar syntax element with spatial locations.

In the following, some details of partitioning a picture to tiles, bricks, and rectangular slices in SPS or PPS will be provided, in accordance with some embodiments.

In an embodiment, SPS syntax includes syntax elements for partitioning a picture to tiles, bricks, and rectangular slices, conditioned by a gating flag. When the partitioning is specified in SPS, it is not present in the PPS. When the partitioning is not specified in SPS, it is present in the PPS.

The syntax and semantics shown in Tables 1, 2 and 3 above, or alike, may be used in this embodiment.

In the following, an example of encoding, making content available for streaming, and merging of independently decodable picture regions will be provided.

The presented example continues the example presented earlier in this specification.

In this example, independently coded picture regions are rectangular slices whose boundaries are treated like picture boundaries in encoding and decoding. It needs to be understood that the example could be similarly implemented with other realizations of independently coded picture regions.

An encoder may perform the encoding so that the independently coded picture regions in each source bitstream (i.e., in each resolution and bitrate version of the content) are encoded as rectangular slices the boundaries of which are treated like picture boundaries.

The encoding of all bitrate and resolution versions is done in a manner that enables merging independently coded picture regions from any source bitstream to the same merged bitstream. The SPS(s) and PPS(s) of all source bitstreams (e.g. different resolution versions) may be identical except for syntax elements for the picture width and height, partitioning of a picture to tiles and/or bricks, position and size of rectangular slices, and assignment of slice ID values to a scan order or positions of rectangular slices.

The encoding of the source bitstreams (i.e. all the bitrate and resolution versions) is carried out so that the slice_address values of bitstreams are non-overlapping and that the length of the slice_address syntax element is the same in all the source bitstreams.

The sequences of independently coded picture regions are made available for streaming in a manner that the client can select which ones of them are received. For example, each independently coded picture region sequence may be encapsulated as a sub-picture track as specified in OMAF.

To create a merged bitstream from the available sequences of independently coded picture regions, the client (or the player within the client) carries out the following steps:

The player creates or receives one or more parameter sets suitable for its decoding capacity. For example, the player creates one or more parameter sets suitable for "4K" decoding capacity, which may limit the maximum picture size to "4K", such as to 8 912 896 luma samples, and/or limit the maximum sample rate e.g. to correspond to "4K" decoding at a particular picture rate (e.g. 60 Hz), which in this example would correspond to 60×8 912 896 luma samples per second. For "4K" decoding capability, the tile partitioning like described in FIG. 11b may be encoded in a parameter set, and each tile is enclosed in its own rectangular slice. In this example, the player is assumed to have 4K decoding capacity. In general, the targeted decoding capacity can be used to select the picture width and height, the tile/brick partitioning, the rectangular slice position and size information for the merged bitstream.

The player selects which subset of independently decodable picture region sequences is received and obtains identifier values of the independently decodable picture region sequences of the subset. In this example the identifier values are slice_id (or equivalently slice_address) values of rectangular slices, wherein an identifier value is included in the slice header syntax.

The player creates a decoding control NAL unit containing the slice_id values of the selected independently coded picture regions.

The player receives VCL NAL units of the selected independently coded picture regions and arranges them in a decoding order, subsequent to the decoding control NAL unit.

The above steps from selecting the subsets to the receiving of VCL NAL units can be repeated whenever a new selection of the independently coded picture regions is needed e.g. as a response to a viewing orientation change.

Figure 12A:
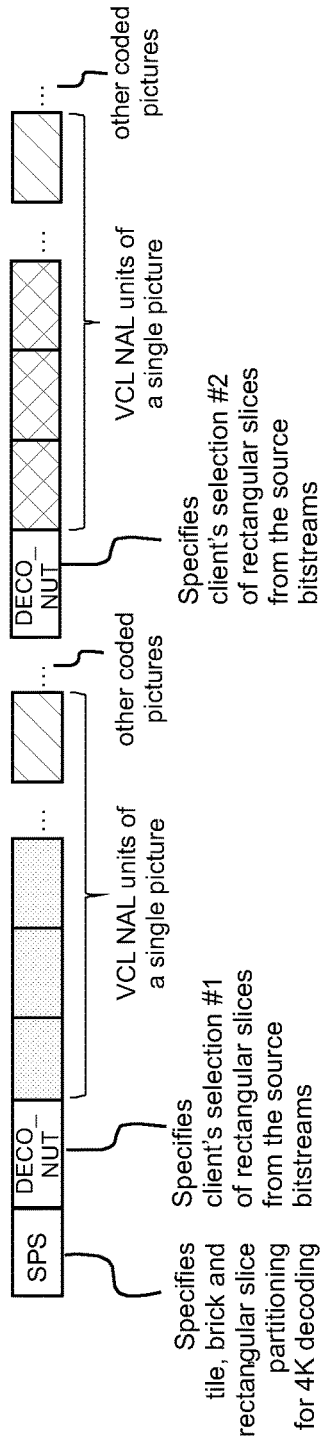
FIG. 12a illustrates an example of a merged bitstream with dynamically changing selections of independently coded picture regions, in accordance with an embodiment.

The merged bitstream as well as the steps the player carries out are illustrated in FIG. 12a.

According to an embodiment, which may be used together with or independently of other embodiments, a decoder:
- decodes an order of independently coded picture regions on pictures of a coded picture sequence from a separate data unit, such as a decoding control NAL unit, from or along the bitstream; receives independently coded picture regions in decoding order;
- examines if a next received independently coded picture region complies with the order;
- in response to the next received independently coded picture region not complying with the order, decoding an uncoded independently coded picture region collocating with the independently coded picture region that is next in the order.

In an embodiment, the decoding or reconstruction of an uncoded independently coded picture region is pre-defined e.g. in a coding standard. The decoding may for example use a certain pre-defined mode, such as inter prediction with zero motion vectors from the closest reference picture (in POC difference) marked as used for reference without prediction error.

In an embodiment, an uncoded independently coded picture region is decoded by reconstructing the entire picture region with a pre-defined constant sample value. Decoding or reconstructing an uncoded independently coded picture region might enable avoiding interruptions in playback, when the uncoded independently coded picture region does not appear on the viewport (for 360-degree video) or is otherwise not needed for displaying.

In an embodiment, a decoder may insert and/or decode a collocated uncoded independently coded picture region in subsequent pictures until a collocated independently coded picture region originating from an IRAP picture is received.

In the following, an example of indicating whether synchronized metadata should be provided as output of a video decoder will be provided.

According to an embodiment, which may be used together with or independently of other embodiments, an entity such as an encoder indicates in a first syntax structure contained in a bitstream whether the metadata contained in the first syntax structure is to be output by a decoder. The metadata contained in the first syntax structure may be output e.g. by outputting the entire first syntax structure or outputting a second syntax structure contained in the first syntax structure. The first syntax structure may be but is not limited to any of the following:
- An SEI message
- An SEI NAL unit
- A decoding control NAL unit
- Video usability information or a syntax structure contained therein The indication in the first syntax structure may be but is not limited to a flag controlling the output and/or a specific range of type values.

The flag controlling the output may indicate, for example, when equal to 0 that the metadata contained in the first syntax structure might not be output; and when equal to 1, that the metadata contained in the first syntax structure is to be output by the decoder.

The specific range of type values may be implemented, for example, so that a certain range of SEI message payload type values specified e.g. in a coding standard to be such that the decoder outputs.

In an example embodiment for an SEI message with a flag controlling the output, the following syntax may be used:

|  | Descriptor |
|---|---|
| sei_message( ) { | |
|   payloadType = 0 | |
|   do { | |
|     payload_type_byte | u(8) |
|     payloadType += payload_type_byte | |
|   } while (payload_type_byte = = 0xFF ) | |
|   sei_output_flag | u(1) |
|   payload_size_7bits | u(7) |
|   payloadSize = 0payload_size_7bits | |
|   if( payload_size_7bits = = 0x7F ) | |
|     do { | |
|       payload_size_byte | u(8) |
|       payloadSize += payload_size_byte | |
|     } while (payload_size_byte = = 0xFF | |
|   ) | |
|   sei_payload( payloadType, payloadSize) | |
| } | |

In accordance with an embodiment, sei_output_flag equal to 1 specifies that the SEI message is output together with the decoded and cropped picture resulting from decoding the coded picture with which the SEI message is associated. sei_output_flag equal to 0 specifies that the SEI message may or may not be output together with the decoded and cropped picture resulting from decoding the coded picture with which the SEI message is associated.

In an embodiment, an entity such as a decoder decodes from a first syntax structure contained in a bitstream whether the metadata contained in the first syntax structure is to be output by the decoder.

In an embodiment, when a picture is output, the entity such as a decoder outputs (along the picture) the SEI messages that have sei_output_flag equal to 1 and are associated with the picture.

It may be pre-defined e.g. in a coding standard, or indicated in or decoded from the syntax element, whether the metadata contained in the first syntax structure is passed along the decoded picture resulting from the decoding of the coded picture that contained the first syntax structure, or whether the metadata contained in the first syntax structure is passed along all decoded picture(s) in the scope of the first syntax structure.

In an embodiment, an entity encodes a temporal scope into the first syntax structure. In an embodiment, an entity decodes a temporal scope from the first syntax structure. The temporal scope may be but is not limited to a single VCL NAL unit, a single coded picture, an access unit (potentially with multiple coded pictures), until the next delimiter NAL unit with the same type of content or the end of the coded video sequence (whichever is earlier), a coded video sequence, a bitstream.

In an embodiment, an entity encodes a layer-wise scope into the first syntax structure. In an embodiment, an entity decodes a layer-wise scope from the first syntax structure. The layer-wise scope is indicative of the layers that are in the scope of the metadata contained in the first syntax structure.

In an embodiment, an entity, such as a player creating a merged bitstream, creates into the merged bitstream a first syntax structure that is indicative of the rendering of the subset of the independently coded picture region sequences. The first syntax structure may additionally be indicative of the spatial positioning of the independently coded picture region sequences. For example, the entity may generate a region-wise packing SEI message of HEVC, or a similar syntax structure, indicating the location of independently coded picture regions on a projected picture. The entity may indicate, e.g. with sei_output_flag equal to 1 or a similar indication, that the metadata in the first syntax structure is to be output with the decoded pictures in the scope of the first syntax structure.

According to an embodiment, it is indicated if a NAL unit is included in CPB for HRD management. For example, a decoding control NAL unit and/or an SEI NAL unit syntax may include a syntax element that specifies whether the NAL unit is included in the CPB. In an embodiment, a player or alike creates a decoding control NAL unit and/or an SEI NAL unit into the bitstream, and sets the syntax element to indicate that the NAL unit is not included in the CPB.

It should be understood that the invention is not limited to any particular types of constituent bitstreams. For example, constituent bitstreams may represent any of the following:
- partitions of a spatiotemporal partitioning of a video (i.e. sub-picture sequences)
- views of stereoscopic or multiview video
- surfaces of a projection structure of 360-degree projection, such as faces of a multi-face 360-degree projection (e.g. cubemap)
- packed regions as indicated by region-wise packing information
- spatially contiguous single-resolution parts of a multi-resolution packing of a video (for example multi-resolution ERP or CMP)
- parts or patches of a point cloud projected onto a surface (texture or depth); a sub-picture sequence may comprise respective patches in subsequent time instances; several patches may be gathered in a single sub-picture
- one or more regions of interest coded as sub-pictures
- coded videos from different sources (e.g. different cameras) as sub-picture sequences; this may be used for multi-point video conferencing, for example It should be understood that other embodiments could be similarly realized with other design decisions, e.g. container syntax structures, mapping for image segments rather than VCL NAL units, and mapping for sub-pictures rather than sub-picture sequences.

In the following some example embodiments using sub-picture-based (de)coding are discussed, e.g. from a point of view of Viewport-dependent 360-degree video streaming; coding of scalable, multiview and stereoscopic video; coding of multi-face content with overlapping; coding of point cloud content.

Viewport-Dependent 360-Degree Video Streaming:

According to an example, a coded sub-picture sequence may be encapsulated in a track of a container file, the track may be partitioned into Segments and/or Subsegments, and a Representation may be created in a streaming manifest (e.g. MPEG-DASH MPD) to make the (Sub)segments available through requests and to announce properties of the coded sub-picture sequence. The process of the previous sentence may be performed for each of the coded sub-picture sequences.

According to an example, a client apparatus may be configured to parse from a manifest information of a plurality of Representations and to parse from the manifest a spherical region for each of the plurality of Representations. The client apparatus may also parse from the manifest values indicative of the quality of the spherical regions and/or resolution information for the spherical regions or their 2D projections. The client apparatus determines which Representations are suitable for its use. For example, the client apparatus may include means to detect head orientation when using a head-mounted display and select a Representation with a higher quality to cover the viewport than in Representations selected for other regions. As a consequence of the selection, the client apparatus may request (Sub)Segments of the selected Representations.

According to an example, a decoding order of coded pictures or file format samples is resolved. Time-aligned coded pictures or file format samples are parsed from received (Sub)Segments of the selected Representations. A merge base track may be used to determine the decoding order of time-aligned coded pictures or file format samples. Delimiters are written into the merged bitstream, wherein the delimiters indicate the Representation to which the data units associated with the delimiter originate from. The merged bitstream is passed for decoding.

According to an example, the same content is coded at multiple resolutions and/or bitrates using sub-picture sequences. For example, different parts of a 360-degree content may be projected to different surfaces, and the projected faces may be downsampled to different resolutions. For example, the faces that are not in the current viewport may be downsampled to lower resolution. Each face may be coded as a sub-picture.

According to an example, the same content is coded at different random-access intervals using sub-picture sequences.

According to an example, which complements and could be used within embodiments presented earlier, a change in viewing orientation causes a partly different selection of Representations to be requested than earlier. If sub-picture sequences are represented as separate layers, an EOS NAL unit preceded by a delimiter may be written specifically to an appropriate layer carrying the sub-picture sequence to indicate that reception and/or decoding of a Representation is selected to be discontinued. The new Representations to be requested may be requested or their decoding may be started from the next random-access position within the sub-picture sequences carried in the Representations. When sub-picture sequences are made available at several random-access intervals, Representations having more frequent random-access positions may be requested as a response to a viewing orientation change until a next (Sub)segment with random-access position and of similar quality is available from respective Representations having less frequent random-access positions. Representations that need not be changed as a response to a viewing orientation change need not have random-access positions. As discussed already earlier, sub-pictures may be allowed to have different sub-picture types or NAL unit types. For example, a sub-picture of a particular access unit or time instance may be of a random-access type while another sub-picture of the same particular access unit or time instance may be of a non-random-access type. Thus, sub-pictures of bitstreams having different random-access intervals can be combined.

The benefits of using the invention in viewport-dependent 360-degree streaming include the following:

- Extractor track(s) or tile base track(s) or alike are not needed for merging of MCTSs in viewport-dependent streaming, since sub-picture sequences can be decoded without modifications regardless of which set of sub-picture sequences are received or passed to decoding. This reduces content authoring burden and simplifies client operation.
- No changes in VCL NAL units are needed in late-binding-based viewport-dependent streaming, since sub-picture sequences can be decoded without modifications regardless of which set of sub-picture sequences are received or passed to decoding. This reduces client implementation complexity.
- Picture size in terms of pixels needs not be constant. This advantage becomes apparent when shared coded sub-pictures are used, where a greater number of pixels may be decoded in the time instances including shared coded sub-pictures than other time instances.
- Flexibility in choosing the number of sub-pictures according to the viewport size and head motion margin. In some prior-art methods, the number of sub-picture tracks was pre-defined when creating an extractor track for merging of the content of the sub-picture tracks into a single bitstream.
- Flexibility in choosing the number of sub-pictures according to the decoding capacity and/or availability of received data. The number of decoded sub-pictures can be dynamically chosen depending on available decoding capacity, e.g. on a multi-process or multi-tasking system with resource sharing. The coded data for a particular time instance can be passed to decoding even if some requested sub-pictures for it have not been received. Thus, delivery delays concerning only a subset of sub-picture sequences do not stall the decoding and playback of other sub-picture sequences.
- Switching between bitrates and received sub-pictures can take place at any shared coded sub-picture and/or random-access sub-picture. Several versions of the content can be encoded at different intervals of shared coded sub-pictures and/or random-access sub-pictures. In the decoded bitstreams shared coded sub-pictures and/or random-access sub-pictures need not be aligned in all sub-picture sequences, thus better rate-distortion efficiency can be achieved when switching and/or random-access property is only in those sub-picture sequences where it is needed.

As discussed above, depending on the use case, the term "sub-picture" can refer to various use cases and/or types of projections. Examples relating to the coding of sub-pictures in the context of few of these use cases are discussed next.

Coding of Multi-Face Content with Overlapping

Figure 12B:
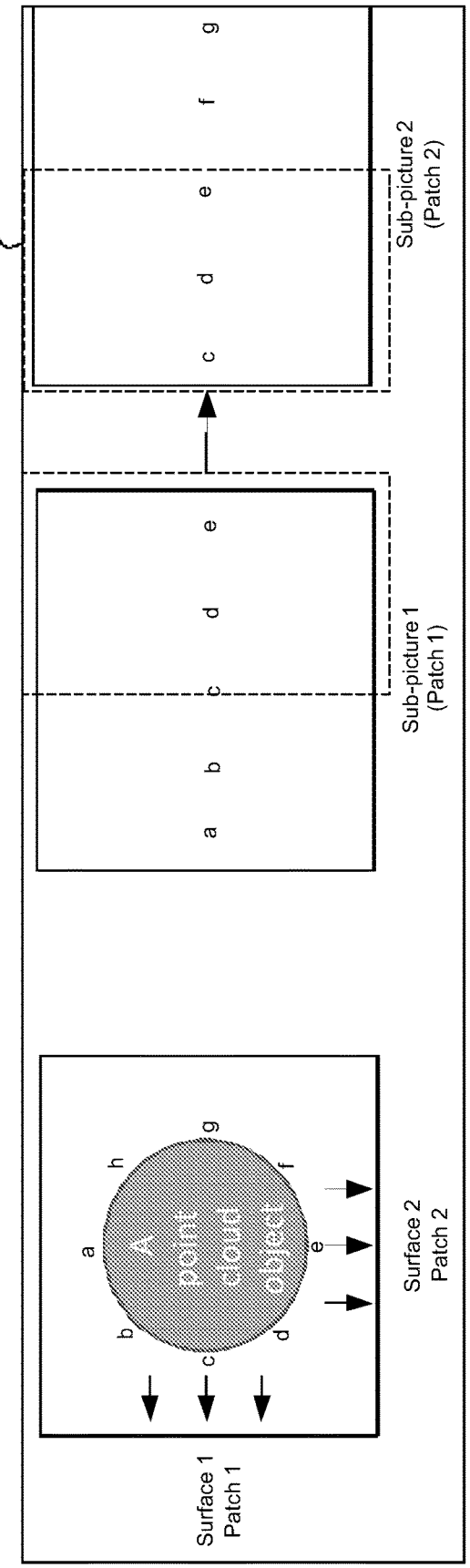
FIG. 12b shows an example of a patch generation according to an embodiment.

According to an example, different parts of a 360-degree content may be projected to different surfaces, and the projected faces may have overlapped content. In another embodiment a content may be divided to several regions (e.g. tiles) with overlapped content. Each face or region may be coded as a sub-picture. Each sub-picture may use a part of the other sub-picture as a reference frame as is shown in FIGS. 12a and 12b for two examples, where the non-overlapped contents have been shown in white box, the overlapped areas have been shown in gray color, and the corresponding parts in sub-pictures have been indicated by a dashed rectangle. Spatial relationship information could be used to indicate how a sub-picture spatially relate to other sub-pictures.

Coding of Point Cloud Content

According to an example, each part of a point cloud content is projected to a surface to generate a patch. Each patch may be coded as a sub-picture. Different patches may have redundant data. Each sub-picture may use other sub-picture to compensate this redundancy. In example in FIG. 12b different parts of a point cloud have been projected to surface 1 and surface 2 to generate patch 1 and patch 2, respectively. Each patch is coded as a sub-picture. In this example, a part of the point cloud content which is indicated by c,d,e is redundantly projected to two surfaces, so the corresponding content in redundant in patch 1 and patch 2. In FIG. 12b, that part of the sub-picture 2 which may be predicted from sub-picture 1 is indicated by dashed box. The collection of reconstructed sub-pictures may form the output picture. Alternatively, reconstructed sub-pictures may be arranged into a 2D output picture.

According to an encoding example, a patch of a second PCC layer is coded as a second sub-picture and is predicted the reconstructed sub-picture of the respective patch of a first PCC layer. Similarly, according to a decoding embodiment, a second sub-picture is decoded, wherein the second sub-picture represents a patch of a second PCC layer, and wherein the decoding comprises prediction from the reconstructed sub-picture that represents the respective patch of a first PCC layer.

According to an example sub-picture sequences are intentionally encoded, requested, transmitted, received, and/or decoded at different picture rates and/or at different number of sub-layers. This embodiment is applicable e.g. when only a part of the content is needed for rendering at a particular time. For example, in 360-degree video only the viewport is needed for rendering at a particular time, and in point cloud coding and volumetric video the part needed for rendering may depend on the viewing position and viewing orientation. The picture rate and/or the number of sub-layers for sub-picture sequences that are needed for rendering may be selected (in encoding, requesting, transmitting, receiving, and/or decoding) to be higher than for those sub-picture sequences that are not needed for rendering and/or not likely to be needed for rendering soon (e.g. for responding to a viewing orientation change). With the described arrangement, the needed decoding capacity and power consumption may be reduced. Alternatively, delivery and/or decoding speedup may be achieved e.g. for faster than real-time playback. When decoding of a sub-picture sequence at a greater number of sub-layers is desired (e.g. for responding to a viewing orientation change), sub-layer access pictures, such as TSA and/or STSA pictures of HEVC, may be used to restart encoding, requesting, transmitting, receiving, and/or decoding sub-layers.

According to an example, a TSA sub-picture or alike can be encoded into the lowest sub-layer of a sub-picture sequence not predicted from other sub-picture sequences. This TSA sub-picture indicates that all sub-layers of this sub-picture sequence can be predicted starting from this TSA picture. According to an embodiment, a TSA sub-picture or alike is decoded from the lowest sub-layer of a sub-picture sequence not predicted from other sub-picture sequences. In an embodiment, it is concluded that requesting, transmission, reception, and/or decoding of any sub-layers above the lowest sub-layer can start starting from this TSA sub-picture, and consequently such requesting, transmission, reception, and/or decoding takes place.

The present embodiments may provide some advantages. No rewriting of slice headers of the independently coded picture regions is needed when generating the merged bitstream. Only a single set of parameter sets for the merged bitstream are needed, matching the parameter sets of the source bitstreams one-to-one. A content author can provide parameter sets of potential merged bitstream(s) in a media presentation description; thus, the client would neither need to create nor rewrite of parameter sets. The positioning information of independently coded picture regions could be included in parameter set syntax rather than in a separate data unit (such as decoding control NAL unit). However, such as approaches are suboptimal as analyzed in the following:

If the positioning information of independently coded picture regions resides in the SPS, it is generally not possible to merge different VCL NAL unit types into the same coded picture to enable handling a viewing orientation change in viewport-dependent 360° streaming so that only a subset of independently coded picture regions originates from an IRAP picture. If the positioning information of independently coded picture regions resides in the SPS, a new selection of independently coded picture regions can be activated only at an IRAP picture in the merged bitstream.

If the positioning information of independently coded picture regions resides in the PPS, clients need to rewrite the PPS each time a new selection of independently coded picture region(s) is made. The rewriting requires parsing of the entire PPS from a source bitstream, including parsing syntax elements not related to the positioning information, variable-length codewords, and codewords conditionally present depending on syntax element values in or variables derived from the active SPS.

Generalizations

The above described embodiments provide a mechanism and an architecture to use core video (de)coding process and bitstream format in a versatile manner for many video-based purposes, including video-based point cloud coding, patch-based volumetric video coding, and 360-degree video coding with multiple projection surfaces.

The above described embodiments are suitable for interfacing a single-layer 2D video codec with additional functionality.

Figure 14B:
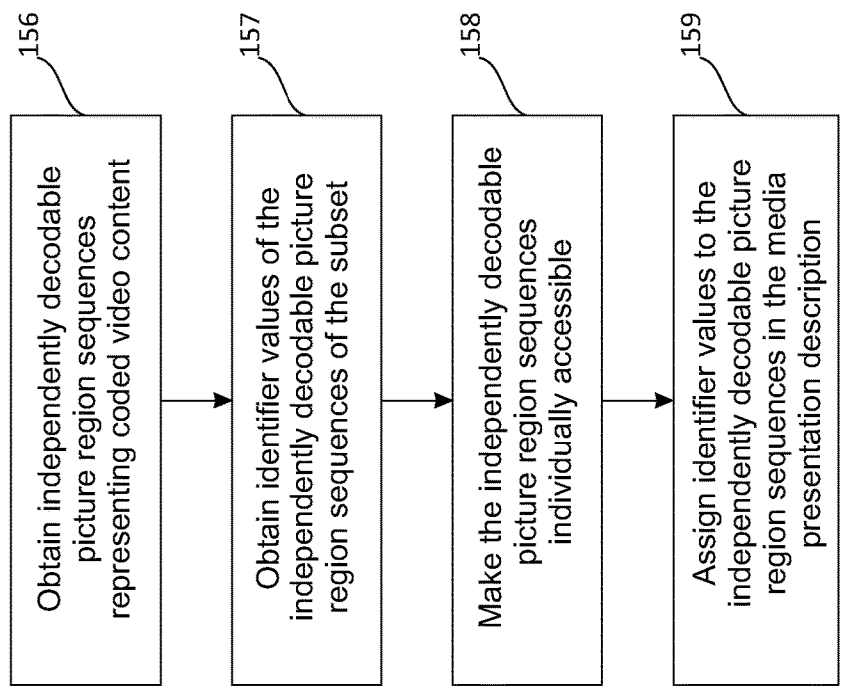
FIG. 14b is a flowchart illustrating a method according to another embodiment.
Figure 14A:
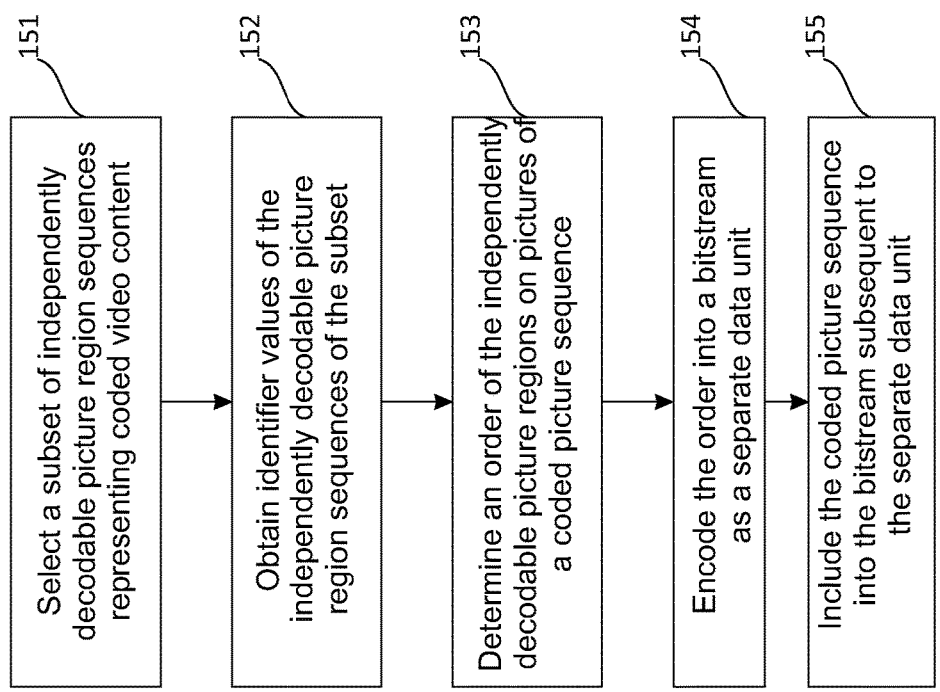
FIG. 14a is a flowchart illustrating a method according to an embodiment.

FIG. 14a is a flowchart illustrating a method according to an embodiment. The method comprises selecting a subset of independently decodable picture region sequences representing coded video content (block 151 in FIG. 14a). Identifier values of the independently decodable picture region sequences of the subset are then obtained (152). An order of the independently decodable picture regions on pictures of a coded picture sequence are determined (153). The order is encoded into a bitstream as a separate data unit (154). The data unit comprises a list of the identifier values of the independently decodable picture region sequences of the subset. The coded picture sequence is included into the bitstream (155), subsequent to the separate data unit.

FIG. 14b is a flowchart illustrating a method according to another embodiment. The method comprises obtaining independently decodable picture region sequences representing coded video content (block 156 in FIG. 14b). Identifier values of the independently decodable picture region sequences are obtained (157). Then, a media presentation description is authored by making the independently decodable picture region sequences are accessible individually (158) and assigning identifier values to the independently decodable picture region sequences in the media presentation description (159).

An apparatus according to an embodiment comprises at least one processor and at least one memory including computer program code, the memory and the computer program code configured to, with the at least one processor, cause the apparatus to perform at least the following:

select a subset of independently decodable picture region sequences representing coded video content;

obtain identifier values of the independently decodable picture region sequences of the subset;

determine an order of the independently decodable picture regions on pictures of a coded picture sequence;

encode the order into a bitstream as a separate data unit, the data unit comprising a list of the identifier values of the independently decodable picture region sequences of the subset;

include the coded picture sequence into the bitstream, subsequent to the separate data unit.

Figure 15:
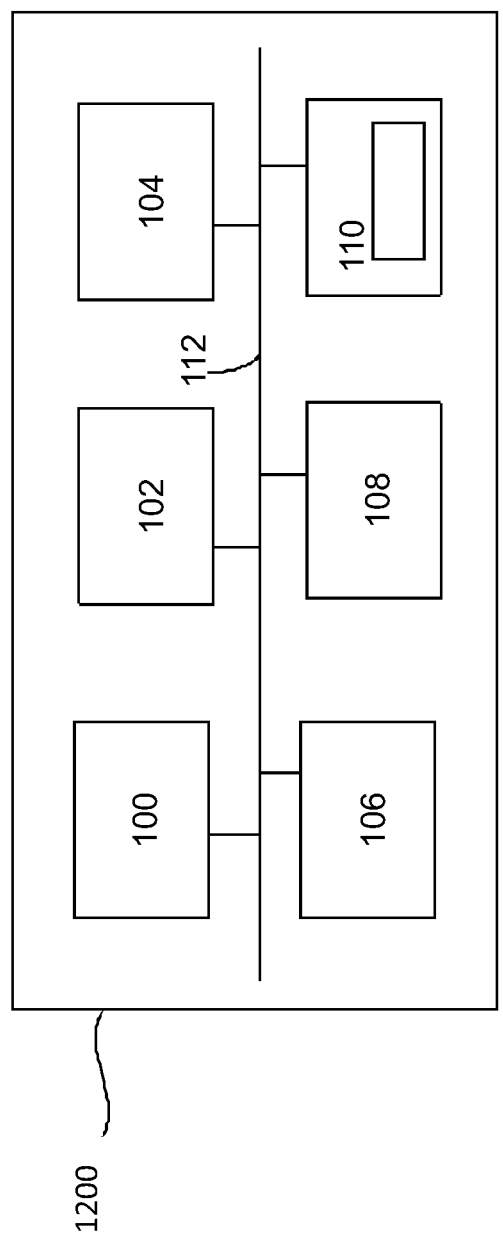
FIG. 15 shows an apparatus according to an embodiment.

An example of an apparatus 1200, e.g. an apparatus for encoding and/or decoding, is illustrated in FIG. 15. The generalized structure of the apparatus will be explained in accordance with the functional blocks of the system. Several functionalities can be carried out with a single physical device, e.g. all calculation procedures can be performed in a single processor if desired. A data processing system of an apparatus according to an example of FIG. 15 comprises a main processing unit 100, a memory 102, a storage device 104, an input device 106, an output device 108, and a graphics subsystem 110, which are all connected to each other via a data bus 112.

The main processing unit 100 may be a conventional processing unit arranged to process data within the data processing system. The main processing unit 100 may comprise or be implemented as one or more processors or processor circuitry. The memory 102, the storage device 104, the input device 106, and the output device 108 may include conventional components as recognized by those skilled in the art. The memory 102 and storage device 104 store data in the data processing system 100. Computer program code resides in the memory 102 for implementing, for example, the methods according to embodiments. The input device 106 inputs data into the system while the output device 108 receives data from the data processing system and forwards the data, for example to a display. The data bus 112 is a conventional data bus and while shown as a single line it may be any combination of the following: a processor bus, a PCI bus, a graphical bus, an ISA bus. Accordingly, a skilled person readily recognizes that the apparatus may be any data processing device, such as a computer device, a personal computer, a server computer, a mobile phone, a smart phone or an Internet access device, for example Internet tablet computer.

In accordance with some embodiments, encoding of a sub-picture sequence can be done conventionally like encoding of a bitstream, i.e. without consideration of merging with other sub-picture sequences.

In embodiments using delimiter data unit, sub-picture sequence identifiers (or layer identifiers) need not be encoded. This may provide at least the following benefits. First, there is no danger of clashes of using the same sub-sequence identifiers even when different encoders are used for encoding, and second, the bitrate for transmitting sub-picture sequence identifier is saved.

In embodiments that rewrite layer identifiers, the number of sub-picture sequences can exceed the number of layers allowed by the limited value range of layer identifiers. For example, 96 sub-picture sequences could be used for viewport-dependent 360-degree video streaming with 6-bit nuh_layer_id of HEVC.

Furthermore, rewriting of payloads of VCL NAL units and most or all non-VCL NAL units is not needed when merging coded sub-picture sequences into a single bitstream.

It is remarked that sub-picture sequences or independent layers or alike can be used together with MCTSs or alike. Decoder implementations and/or coding profiles or levels may have limits on the number of sub-picture sequences or independent layers or alike. If a greater amount of independently decodable spatiotemporal units are needed in the application or use case, it may be reasonable to include more than one MCTS within a sub-picture sequence or independent layer or alike.

The various embodiments can be implemented with the help of computer program code that resides in a memory and causes the relevant apparatuses to carry out the method. For example, a device may comprise circuitry and electronics for handling, receiving and transmitting data, computer program code in a memory, and a processor that, when running the computer program code, causes the device to carry out the features of an embodiment. Yet further, a network device like a server may comprise circuitry and electronics for handling, receiving and transmitting data, computer program code in a memory, and a processor that, when running the computer program code, causes the network device to carry out the features of an embodiment. The computer program code comprises one or more operational characteristics. Said operational characteristics are being defined through configuration by said computer based on the type of said processor, wherein a system is connectable to said processor by a bus, wherein a programmable operational characteristic of the system comprises receiving data units, the data units being logically separated to a first bitstream and a second bitstream, combining the first bitstream and the second bitstream into a merged bitstream, wherein the combining comprises, writing a delimiter into the merged bitstream, the delimiter indicating which of the first or second bitstream one or more data units associated with the delimiter in the merged bitstream are assigned.

If desired, the different functions discussed herein may be performed in a different order and/or concurrently with other. Furthermore, if desired, one or more of the above-described functions and embodiments may be optional or may be combined.

In the above, where the example embodiments have been described with reference to an encoder, it needs to be understood that the resulting bitstream and the decoder may have corresponding elements in them.

Likewise, where the example embodiments have been described with reference to a decoder, it needs to be understood that the encoder may have structure and/or computer program for generating the bitstream to be decoded by the decoder.

In the above, where the example embodiments have been described with reference to syntax and semantics, it needs to be understood that the embodiments likewise cover an encoder that outputs a bitstream portion according to the syntax and semantics. Likewise, the embodiments likewise cover a decoder that decodes a bitstream portion according to the syntax and semantics.

The embodiments of the invention described above describe the codec in terms of separate encoder and decoder apparatus in order to assist the understanding of the processes involved. However, it would be appreciated that the apparatus, structures and operations may be implemented as a single encoder-decoder apparatus/structure/operation. Furthermore, it is possible that the coder and decoder may share some or all common elements.

Although some embodiments of the invention describe codec operation within an apparatus, it would be appreciated that the invention as defined in the claims may be implemented as part of any video codec within any system or environment. Thus, for example, embodiments of the invention may be implemented in a video codec which may implement video coding over fixed or wired communication paths.

Although various aspects of the embodiments are set out in the independent claims, other aspects comprise other combinations of features from the described embodiments and/or the dependent claims with the features of the independent claims, and not solely the combinations explicitly set out in the claims.

The invention claimed is:

1. An apparatus comprising at least one processor and at least one non-transitory memory including computer program code, the memory and the computer program code configured to, with the at least one processor, cause the apparatus to perform at least the following:
   indicate with an indication in a syntax structure, in a video bitstream comprising access units, a highest temporal sublayer of a coded video sequence, wherein the coded video sequence is a sequence of coded pictures in decoding order that is independently decodable and is followed by another coded video sequence or an end of the video bitstream, wherein the indication of the highest temporal sublayer specifies the highest temporal sublayer that applies from an access unit containing the syntax structure up to but excluding a next access unit, in decoding order, containing another syntax structure with the indication of the highest temporal sublayer.

2. The apparatus according to claim 1, wherein the apparatus is further caused to:
   indicate in the syntax structure an output layer set represented with the coded video sequence, wherein the output layer set comprises a set of layers for which one or more layers are specified as output layers intended to be output with a decoder, and wherein the video bitstream defines any number of output layer sets.

3. An apparatus comprising at least one processor and at least one non-transitory memory including computer program code, the memory and the computer program code configured to, with the at least one processor, cause the apparatus to perform at least the following:
   decode from a syntax structure, in a video bitstream comprising access units, an indication of a highest temporal sublayer of a coded video sequence, wherein the coded video sequence is a sequence of coded pictures in decoding order that is independently decodable and is followed by another coded video sequence or an end of the video bitstream, wherein the indication of the highest temporal sublayer specifies the highest temporal sublayer that applies from an access unit containing the syntax structure up to but excluding a next access unit, in decoding order, containing another syntax structure with the indication of the highest temporal sublayer.

4. The apparatus according to claim 3, wherein the apparatus is further caused to:
   decode from the syntax structure an output layer set represented with the coded video sequence, wherein the output layer set comprises a set of layers for which one or more layers are specified as output layers intended to be output with a decoder, and wherein the video bitstream defines any number of output layer sets.

5. The apparatus according to claim 4, wherein the apparatus is further caused to:
   conclude, based on the one or more specified output layers intended to be output, output layers from the decoded output layer set represented with the coded video sequence; and
   output decoded pictures from the concluded output layers.

6. The apparatus according to claim 4, wherein the apparatus is further caused to:
   conclude one or more of picture width, picture height, bit depth, or chroma format for picture storage buffers used for storing decoded pictures.

7. The apparatus according to claim 3, wherein the apparatus is further caused to:
   select hypothetical reference decoder parameters to be used based on the highest temporal sublayer.

8. The apparatus according to claim 4, wherein the apparatus is further caused to:
   select hypothetical reference decoder parameters to be used based on the decoded output layer set.

9. A method comprising:
   indicating with an indication in a syntax structure, in a video bitstream comprising access units, a highest temporal sublayer of a coded video sequence, wherein the coded video sequence is a sequence of coded pictures in decoding order that is independently decodable and is followed by another coded video sequence or an end of the video bitstream, wherein the indication of the highest temporal sublayer specifies the highest temporal sublayer that applies from an access unit containing the syntax structure up to but excluding a next access unit, in decoding order, containing another syntax structure with the indication of the highest temporal sublayer.

10. The method according to claim 9 further comprising:
   indicating in the syntax structure an output layer set represented with the coded video sequence, wherein the output layer set comprises a set of layers for which one or more layers are specified as output layers intended to be output with a decoder, and wherein the video bitstream defines any number of output layer sets.

11. A method comprising:
   decoding from a syntax structure, in a video bitstream comprising access units, an indication of a highest temporal sublayer of a coded video sequence, wherein the coded video sequence is a sequence of coded pictures in decoding order that is independently decodable and is followed by another coded video sequence or an end of the video bitstream, wherein the indication of the highest temporal sublayer specifies the highest temporal sublayer that applies from an access unit containing the syntax structure up to but excluding a next access unit, in decoding order, containing another syntax structure with the indication of the highest temporal sublayer.

12. The method according to claim 11 further comprising:
   decoding from the syntax structure an output layer set represented with the coded video sequence, wherein the output layer set comprises a set of layers for which one or more layers are specified as output layers intended to be output with a decoder, and wherein the video bitstream defines any number of output layer sets.

13. The method according to claim 12, comprising:
   concluding, based on the one or more specified output layers intended to be output, output layers from the decoded output layer set represented with the coded video sequence; and
   outputting decoded pictures from the concluded output layers.

14. The method according to claim 12, comprising:
   concluding one or more of picture width, picture height, bit depth, or chroma format for picture storage buffers used for storing decoded pictures.

15. The method according to claim 11, comprising:
   selecting hypothetical reference decoder parameters to be used based on the highest temporal sublayer.

16. A computer program product comprises at least one non-transitory computer-readable storage medium having computer executable program code instructions stored therein, the computer executable program code instructions comprising program code instructions configured, upon execution, to:
   decode from a syntax structure, in a video bitstream comprising access units, an indication of a highest temporal sublayer of a coded video sequence, wherein the coded video sequence is a sequence of coded pictures in decoding order that is independently decodable and is followed by another coded video sequence or an end of the video bitstream, wherein the indication of the highest temporal sublayer specifies the highest temporal sublayer that applies from an access unit containing the syntax structure up to but excluding a next access unit, in decoding order, containing another syntax structure with the indication of the highest temporal sublayer.

17. The computer program product according to claim 16, wherein the program code instructions are further configured, upon execution, to:
   decode from the syntax structure an output layer set represented with the coded video sequence, wherein the output layer set comprises a set of layers for which one or more layers are specified as output layers intended to be output with a decoder, and wherein the video bitstream defines any number of output layer sets.

18. The computer program product according to claim 17, wherein the program code instructions are further configured, upon execution, to:
   conclude, based on the one or more specified output layers intended to be output, output layers from the decoded output layer set represented with the coded video sequence; and
   output decoded pictures from the concluded output layers.

19. The computer program product according to claim 17, wherein the program code instructions are further configured, upon execution, to:
   conclude one or more of picture width, picture height, bit depth, or chroma format for picture storage buffers used for storing decoded pictures.

20. The computer program product according to claim 16, wherein the program code instructions are further configured, upon execution, to:
   select hypothetical reference decoder parameters to be used based on the highest temporal sublayer.

* * * * *